United States Patent
Katzman et al.

(10) Patent No.: US 11,246,687 B2
(45) Date of Patent: Feb. 15, 2022

(54) DENTAL IMPRESSION RETAKE KIT AND METHODS THEREFOR

(71) Applicant: SDC U.S. SmilePay SPV, Nashville, TN (US)

(72) Inventors: Jordan Katzman, Nashville, TN (US); Alex Fenkell, Nashville, TN (US); David Katzman, Nashville, TN (US); Christopher Yancey, Nashville, TN (US); Josh Chapman, Nashville, TN (US)

(73) Assignee: SDC U.S. SmilePay SPV, Nashville, TN (US)

(*) Notice: Subject to any disclaimer, the term of this patent is extended or adjusted under 35 U.S.C. 154(b) by 0 days.

(21) Appl. No.: 16/391,482

(22) Filed: Apr. 23, 2019

(65) Prior Publication Data
US 2019/0247158 A1      Aug. 15, 2019

Related U.S. Application Data

(63) Continuation of application No. 16/047,694, filed on Jul. 27, 2018, which is a continuation-in-part of application No. 15/725,430, filed on Oct. 5, 2017.
(Continued)

(51) Int. Cl.
*A61C 9/00* (2006.01)
*A61C 7/00* (2006.01)
(Continued)

(52) U.S. Cl.
CPC ............ *A61C 9/0006* (2013.01); *A61C 7/002* (2013.01); *A61C 7/08* (2013.01); *A61C 19/02* (2013.01);
(Continued)

(58) Field of Classification Search
CPC ......... A61C 19/02; A61C 19/05; A61C 19/06; A61C 7/00; A61C 7/02; A61C 7/08; A61C 9/00; A61C 9/004; A61C 9/006
(Continued)

(56) References Cited

U.S. PATENT DOCUMENTS

| | | |
|---|---|---|
| 4,003,132 A | 1/1977 | Beck |
| 4,763,791 A | 8/1988 | Halverson et al. |

(Continued)

FOREIGN PATENT DOCUMENTS

| | | |
|---|---|---|
| AU | 2015100268 | 5/2015 |
| BE | 1016074 | 2/2006 |

(Continued)

OTHER PUBLICATIONS

Albert et al. (Smile Care Club Review—My experience straightening my teeth with smile care. https://smilecareclubreview.wordpress.com/page/1/ relevant web posts published from Jan. 9, 2015-Mar. 4, 2015) accessed on line Dec. 30, 2019 (Year: 2015).*

(Continued)

*Primary Examiner* — Edward Moran
*Assistant Examiner* — Matthew P Saunders
(74) *Attorney, Agent, or Firm* — Foley & Lardner LLP

(57) ABSTRACT

A method of administering a dental impression kit includes receiving, from a user, a first set of dental impressions of an upper dental arch and a lower dental arch of the user and identifying, based on the first set of dental impressions, one or more defects in at least one dental impression of the first set of dental impressions. The method includes sending a dental impression kit to the user and receiving a second set of dental impressions, the second set of dental impressions replacing the at least one dental impression having the one or more defects. The method includes manufacturing dental (Continued)

aligners specific to the user and being configured to reposition one or more teeth of the user.

21 Claims, 52 Drawing Sheets

Related U.S. Application Data

(60) Provisional application No. 62/663,725, filed on Apr. 27, 2018, provisional application No. 62/648,229, filed on Mar. 26, 2018, provisional application No. 62/522,847, filed on Jun. 21, 2017.

(51) Int. Cl.
 *A61C 19/02* (2006.01)
 *A61C 7/08* (2006.01)
 *A61C 7/02* (2006.01)

(52) U.S. Cl.
 CPC .............. *A61C 7/02* (2013.01); *A61C 9/0026* (2013.01); *A61C 9/0053* (2013.01)

(58) Field of Classification Search
 USPC .................................................. 433/24, 214
 See application file for complete search history.

(56) References Cited

U.S. PATENT DOCUMENTS

| | | | |
|---|---|---|---|
| 5,190,168 A | 3/1993 | French et al. | |
| 5,385,155 A | 1/1995 | Kittelsen et al. | |
| 5,816,255 A * | 10/1998 | Fishman | A61C 9/0006 128/861 |
| 5,882,192 A | 3/1999 | Bergersen | |
| 5,975,893 A | 11/1999 | Chishti et al. | |
| 6,121,565 A | 9/2000 | Allott, III | |
| 6,227,851 B1 | 5/2001 | Chishti et al. | |
| 6,394,801 B2 | 5/2002 | Chishti et al. | |
| 6,450,807 B1 | 9/2002 | Chishti et al. | |
| 6,488,499 B1 | 12/2002 | Miller | |
| 6,582,225 B1 | 6/2003 | Bergersen | |
| 6,632,089 B2 | 10/2003 | Rubbert et al. | |
| 6,699,037 B2 | 3/2004 | Chishti et al. | |
| 6,761,560 B2 | 7/2004 | Miller | |
| 7,037,108 B2 | 5/2006 | Chishti et al. | |
| 7,077,647 B2 | 7/2006 | Choi et al. | |
| 7,156,661 B2 | 1/2007 | Choi et al. | |
| 7,188,073 B1 | 3/2007 | Tam et al. | |
| 7,192,275 B2 | 3/2007 | Miller | |
| 7,225,170 B1 | 5/2007 | Ryan, Jr. | |
| 7,383,198 B1 | 6/2008 | Sepe | |
| 7,467,022 B2 | 12/2008 | Bhagwat et al. | |
| 7,523,044 B2 | 4/2009 | Rosenblood | |
| 7,578,674 B2 | 8/2009 | Chishti et al. | |
| 7,597,245 B1 | 10/2009 | Tillery | |
| 7,716,062 B2 | 5/2010 | Bergersen | |
| 7,738,989 B2 | 6/2010 | Taub et al. | |
| 7,904,307 B2 | 3/2011 | Abolfathi et al. | |
| 7,916,900 B2 | 3/2011 | Lanier | |
| 7,967,145 B2 | 6/2011 | Tchouangang | |
| 8,015,049 B1 | 9/2011 | Tam et al. | |
| 8,075,306 B2 | 12/2011 | Kitching et al. | |
| 8,087,932 B2 | 1/2012 | Liu | |
| 8,092,215 B2 | 1/2012 | Stone-Collonge et al. | |
| 8,145,340 B2 | 3/2012 | Taub et al. | |
| 8,287,275 B2 | 10/2012 | Knutson | |
| 8,303,301 B2 | 11/2012 | Bergersen | |
| 8,562,338 B2 | 10/2013 | Kitching et al. | |
| 8,577,493 B2 | 11/2013 | Taub et al. | |
| 8,591,225 B2 | 11/2013 | Wu et al. | |
| 8,636,510 B2 | 1/2014 | Kitching et al. | |
| 8,651,859 B2 | 2/2014 | Chishti et al. | |
| 8,731,280 B2 | 5/2014 | Kuo et al. | |
| 8,740,614 B2 | 6/2014 | Wen et al. | |
| 8,765,031 B2 | 7/2014 | Li et al. | |
| 8,899,978 B2 | 12/2014 | Kitching et al. | |
| 9,017,072 B2 | 4/2015 | Kitching et al. | |
| 9,107,722 B2 | 8/2015 | Matov et al. | |
| 9,168,113 B2 | 10/2015 | Wu et al. | |
| 9,256,962 B2 | 2/2016 | Berry et al. | |
| 9,364,297 B2 | 6/2016 | Kitching et al. | |
| D764,061 S | 8/2016 | Furdui-Carr | |
| 9,655,693 B2 | 5/2017 | Li et al. | |
| 9,715,753 B2 | 7/2017 | Berry et al. | |
| 9,757,065 B1 | 9/2017 | Suri et al. | |
| 9,855,123 B2 | 1/2018 | Wolgin | |
| 9,922,170 B2 | 3/2018 | Trosien et al. | |
| 10,052,174 B2 | 8/2018 | Kitching et al. | |
| 10,085,823 B2 | 10/2018 | Cao et al. | |
| 10,136,972 B2 | 11/2018 | Sabina et al. | |
| 10,231,801 B2 | 3/2019 | Korytov et al. | |
| 10,342,638 B2 | 7/2019 | Kitching et al. | |
| 10,383,705 B2 | 8/2019 | Shanjani et al. | |
| 10,504,386 B2 | 12/2019 | Levin et al. | |
| 10,595,966 B2 | 3/2020 | Carrier et al. | |
| 10,636,105 B2 | 4/2020 | Pumphrey | |
| 2001/0027481 A1 | 10/2001 | Whyel | |
| 2002/0007290 A1 | 1/2002 | Gottlieb | |
| 2002/0014357 A1 | 2/2002 | Hammonds | |
| 2002/0028418 A1 | 3/2002 | Farag et al. | |
| 2002/0116232 A1 | 8/2002 | Rapp et al. | |
| 2002/0143574 A1 | 10/2002 | Karras et al. | |
| 2002/0188478 A1 | 12/2002 | Breeland et al. | |
| 2003/0138752 A1 | 7/2003 | Bergersen | |
| 2003/0207227 A1 | 11/2003 | Abolfathi | |
| 2003/0225594 A1 | 12/2003 | Bergersen | |
| 2004/0073611 A1 | 4/2004 | Atwood | |
| 2004/0091835 A1 | 5/2004 | Roetzer | |
| 2004/0152036 A1 | 8/2004 | Abolfathi | |
| 2004/0185415 A1 | 9/2004 | Ghim | |
| 2004/0197728 A1 | 10/2004 | Abolfathi et al. | |
| 2004/0250359 A1 | 12/2004 | Spivey | |
| 2005/0159986 A1 | 7/2005 | Breeland et al. | |
| 2005/0182654 A1 | 8/2005 | Abolfathi et al. | |
| 2006/0019216 A1 | 1/2006 | Priluck et al. | |
| 2006/0026051 A1 | 2/2006 | Rose | |
| 2006/0040230 A1 | 2/2006 | Blanding et al. | |
| 2006/0057541 A1 | 3/2006 | Kahwaty | |
| 2006/0064329 A1 | 3/2006 | Abolfathi et al. | |
| 2006/0093982 A1 | 5/2006 | Wen | |
| 2006/0141416 A1 | 6/2006 | Knutson | |
| 2006/0154198 A1 | 7/2006 | Durbin et al. | |
| 2006/0167724 A1 | 7/2006 | Petersen et al. | |
| 2006/0173708 A1 | 8/2006 | Vining et al. | |
| 2006/0275731 A1 | 12/2006 | Wen et al. | |
| 2006/0275736 A1 * | 12/2006 | Wen | A61C 9/00 433/213 |
| 2007/0037116 A1 | 2/2007 | Knutson | |
| 2007/0061166 A1 | 3/2007 | Ramasubramanian et al. | |
| 2007/0102946 A1 | 5/2007 | Blackwell et al. | |
| 2007/0128574 A1 | 6/2007 | Kuo et al. | |
| 2007/0134613 A1 | 6/2007 | Kuo et al. | |
| 2007/0238065 A1 * | 10/2007 | Sherwood | A61C 7/00 433/24 |
| 2008/0059227 A1 | 3/2008 | Clapp | |
| 2008/0159798 A1 * | 7/2008 | Culp | G06K 13/07 400/247 |
| 2008/0206705 A1 | 8/2008 | Kaza et al. | |
| 2008/0305454 A1 | 12/2008 | Kitching et al. | |
| 2008/0306724 A1 | 12/2008 | Kitching et al. | |
| 2008/0308450 A1 * | 12/2008 | Tchouangang | A61C 19/02 206/570 |
| 2009/0061381 A1 | 3/2009 | Durbin et al. | |
| 2009/0081604 A1 | 3/2009 | Fisher | |
| 2009/0081611 A1 | 3/2009 | Hines et al. | |
| 2009/0136893 A1 | 5/2009 | Zegarelli | |
| 2009/0215003 A1 * | 8/2009 | Swain | A61C 7/00 433/24 |
| 2010/0036682 A1 | 2/2010 | Trosien et al. | |
| 2010/0068676 A1 | 3/2010 | Mason et al. | |
| 2010/0082391 A1 | 4/2010 | Soerensen et al. | |
| 2010/0105011 A1 | 4/2010 | Karkar et al. | |
| 2010/0145754 A1 | 6/2010 | Rahman | |

(56) References Cited

U.S. PATENT DOCUMENTS

| | | |
|---|---|---|
| 2010/0153162 A1 | 6/2010 | Tam et al. |
| 2010/0179854 A1 | 7/2010 | Shafer et al. |
| 2011/0084093 A1 | 4/2011 | Nehren et al. |
| 2011/0106557 A1 | 5/2011 | Gazula |
| 2011/0161249 A1 | 6/2011 | Whitehouse |
| 2011/0183293 A1 | 7/2011 | Tchouangang |
| 2011/0215933 A1 | 9/2011 | Darling et al. |
| 2012/0065985 A1 | 3/2012 | Royal et al. |
| 2012/0083549 A1 | 4/2012 | Kamohara et al. |
| 2012/0267811 A1 | 10/2012 | Weitzman |
| 2012/0330677 A1 | 12/2012 | Velimesis |
| 2013/0028617 A1 | 1/2013 | Fukuoka et al. |
| 2013/0035955 A1 | 2/2013 | Torres |
| 2013/0087157 A1 | 4/2013 | Hawkins et al. |
| 2013/0089828 A1 | 4/2013 | Borovinskih et al. |
| 2013/0122448 A1 | 5/2013 | Kitching |
| 2013/0230300 A1 | 9/2013 | Saleh et al. |
| 2013/0286174 A1 | 10/2013 | Urakabe |
| 2014/0052661 A1 | 2/2014 | Shakes et al. |
| 2014/0122100 A1 | 5/2014 | Fillmore |
| 2014/0199653 A1 | 7/2014 | Kurthy |
| 2014/0249878 A1 | 9/2014 | Kaufman |
| 2014/0278679 A1 | 9/2014 | Navani et al. |
| 2014/0315153 A1 | 10/2014 | Kitching et al. |
| 2014/0330577 A1 | 11/2014 | Herman et al. |
| 2014/0356798 A1 | 12/2014 | Parker |
| 2014/0379356 A1* | 12/2014 | Sachdeva ............... A61C 7/002 705/2 |
| 2015/0010879 A1 | 1/2015 | Kurthy |
| 2015/0202025 A1 | 7/2015 | Kaza et al. |
| 2015/0205921 A1 | 7/2015 | Dick et al. |
| 2015/0220887 A1 | 8/2015 | Peres et al. |
| 2015/0238283 A1 | 8/2015 | Tanugula et al. |
| 2015/0257859 A1 | 9/2015 | Akl |
| 2015/0310387 A1 | 10/2015 | Friedman et al. |
| 2016/0012182 A1 | 1/2016 | Golay |
| 2016/0034871 A1 | 2/2016 | Vargas et al. |
| 2016/0132893 A1 | 5/2016 | Bisges et al. |
| 2016/0158627 A1 | 6/2016 | Layzell |
| 2016/0253464 A1 | 9/2016 | Balwani et al. |
| 2016/0256240 A1 | 9/2016 | Shivapuja et al. |
| 2016/0263732 A1 | 9/2016 | Lourenco et al. |
| 2016/0287198 A1 | 10/2016 | Abramovich et al. |
| 2016/0317264 A1 | 11/2016 | Derraugh et al. |
| 2017/0010252 A1 | 1/2017 | Bearup et al. |
| 2017/0020642 A1 | 1/2017 | Mah |
| 2017/0039423 A1 | 2/2017 | Cork et al. |
| 2017/0046486 A1 | 2/2017 | Cunningham |
| 2017/0156830 A1 | 6/2017 | Wallace |
| 2017/0165040 A1 | 6/2017 | Wolgin |
| 2017/0231721 A1 | 8/2017 | Akeel et al. |
| 2017/0239018 A1 | 8/2017 | Kim |
| 2017/0281313 A1 | 10/2017 | Kim |
| 2017/0340414 A1 | 11/2017 | Janzadeh et al. |
| 2017/0347953 A1 | 12/2017 | Suri et al. |
| 2017/0365025 A1 | 12/2017 | Pumphrey |
| 2018/0014914 A1 | 1/2018 | Raghavan et al. |
| 2018/0110589 A1 | 4/2018 | Gao |
| 2018/0121875 A1 | 5/2018 | Satyanarayana Rao et al. |
| 2018/0125610 A1* | 5/2018 | Carrier, Jr ............. A61C 7/002 |
| 2018/0206940 A1 | 7/2018 | Kopelman et al. |
| 2018/0228359 A1 | 8/2018 | Meyer et al. |
| 2018/0263731 A1 | 9/2018 | Pokotilov et al. |
| 2018/0263733 A1 | 9/2018 | Pokotilov et al. |
| 2018/0285801 A1 | 10/2018 | Alde et al. |
| 2018/0303580 A1 | 10/2018 | Salah et al. |
| 2018/0368943 A1 | 12/2018 | Katzman et al. |
| 2018/0368953 A1 | 12/2018 | Katzman et al. |
| 2018/0368954 A1 | 12/2018 | Katzman et al. |
| 2019/0013098 A1 | 1/2019 | Katzman et al. |
| 2019/0019187 A1 | 1/2019 | Miller et al. |
| 2019/0026598 A1 | 1/2019 | Salah et al. |
| 2019/0038383 A1 | 2/2019 | Webber et al. |
| 2019/0083219 A1* | 3/2019 | Sharer ................ A61C 13/0004 |
| 2019/0175303 A1 | 6/2019 | Akopov et al. |
| 2019/0223983 A1 | 7/2019 | Mah |
| 2019/0252066 A1 | 8/2019 | Katzman et al. |
| 2019/0333622 A1 | 10/2019 | Levin et al. |
| 2019/0388188 A1* | 12/2019 | Kaza ................. A61C 7/08 |
| 2020/0035353 A1 | 1/2020 | Katzman et al. |
| 2020/0066391 A1 | 2/2020 | Sachdeva et al. |
| 2020/0081413 A1 | 3/2020 | Georg et al. |
| 2020/0113650 A1 | 4/2020 | Lemchen et al. |
| 2020/0289238 A1 | 9/2020 | Levine |
| 2020/0306011 A1 | 10/2020 | Chekhonin et al. |
| 2020/0401976 A1 | 12/2020 | Nelson et al. |
| 2021/0196434 A1 | 7/2021 | Cramer et al. |

FOREIGN PATENT DOCUMENTS

| | | |
|---|---|---|
| CN | 201370648 | 12/2009 |
| CN | 204472650 | 7/2015 |
| CN | 106326681 | 1/2017 |
| EP | 0 278 626 | 8/1988 |
| EP | 2 425 734 | 3/2012 |
| EP | 3 595 572 | 1/2020 |
| GB | 0 338 822 | 11/1930 |
| JP | 09-038117 | 2/1997 |
| WO | WO-2006/118771 | 11/2006 |
| WO | WO-2009/085752 | 7/2009 |
| WO | WO-2015/054746 | 4/2015 |
| WO | WO-2019/036677 | 2/2019 |

OTHER PUBLICATIONS

Hoabie et al. (https://smilecareclub.wordpress.com/Mar. 27, 2015). Accessed online Jan. 2, 2020 (Year: 2015).*

Smile Direct Club Evaluation Kit (Evaluation Kit instruction guide, Smile Direct Club. https://s3.amazonaws.com/static.smiledirectclub.com/evaluation_kit_instructions_5_2_2016.email.pdf.) Accessed online Dec. 2, 2019 (Year: 2016).*

Smile Direct Club Impression Guide (available online Nov. 14, 2016, https://www.sharperimage.com/si/pdf/manuals/203221 .pdf accessed Sep. 3, 2019 (Year: 2016).*

SmileDirectClubFAQ (https://web.archive.org/web/20170409175711/https://smiledirectclub.com/faq/ published online Apr. 9, 2017, accessed Mar. 23, 2021) (Year: 2017).*

SmileDirectClubgluesticksblog.pdf(https://gluesticksblog.com/smiledirectclub-review/, pulished online Aug. 26, 2015, comments updated on Apr. 13, 2016, accessed Mar. 21, 2021) (Year: 2015).*

"203221—SmileCareClub" video, uploaded to YouTube on Jun. 10, 2014, https://www.youtube.com/watch?v=B43vT_1GnR0.

"Affordable Clear Braces—Smile Care Club" video, uploaded to YouTube on Mar. 30, 2015, https://www.youtube.com/watch?v=Qk-VhbH1RVM.

"Clear Draces . . . At Home??! Review—Before & After—Cost" video, uploaded to YouTube on Oct. 7, 2014, https://www.youtube.com/watch?v=9wrwhRTPjtk&t.

"Smile Care Club Unboxing, Review, Tutorial" video, uploaded to YouTube on May 1, 2015, https://www.youtube.com/watch?v=p7Y5fMRnJWE.

"Speak Out Game—Ellen Show with Khloe Kardashian and Kevin Hart", uploaded to YouTube on Oct. 11, 2016, https://www.youtube.com/watch?v=RDILAiBFRLY.

"Step 1! Working on my Smile . . . Smile Care Club" video, uploaded to YouTube on Jan. 4, 2015, https://www.youtube.com/watch?v=T_F3Xt4Og7w.

International Search Report and Written Opinion for International Application No. PCT/US2018/038459, dated Oct. 22, 2018, 13 pages.

Kravitz et al., "Teledentistry, Do-It-Yourself Orthodontics, and Remove Treatment Monitoring", JCO, Dec. 2016, 9 pages.

Smile Care Club, "Impression Kit", Jul. 21, 2014, available for retrieval at URL https://vimeo.eom/wmvproductions/review/115725718/28854a7f49.

Smile Care Club, "Impressions—New Box", 2015,available for retrieval at URL https://vimeo.eom/wmvproductions/review/137176701/d45be82d56.

(56) References Cited

OTHER PUBLICATIONS

Smile Care Club, "Impressions—Old Box", 2015,available for retrieval at URL https://vimeo.eom/wmvproductions/review/137176599/0b8020929d.
Smile Care Club, "Impressions ReEdit", 2016,available for retrieval at URL https://vimeo.eom/wmvproductions/review/168249998/0b75310374.
Smile Care Club, "Impressions", 2015,available for retrieval at URL https://vimeo.eom/wmvproductions/review/136533463/1a8515abf5.
Smile Care Club, "Promo", 2014, available for retrieval at URL https://vimeo.eom/wmvproductions/review/115725719/9c8235cdf2.
"Invisalign Manufacturing Process English" video, uploaded to YouTube on Apr. 7, 2014, https://www.youtube.com/watch?v=vsR0_wTR2a8.
International Search Report in International Patent Application PCT/US2018/065133 dated Apr. 22, 2019 (2 pages).
Smile Care Club, "Making Dental Impressions" video, Mar. 2016, 74 pages of screenshots.
Smile Direct Club "smile evaluation kit instruction guide" https://s3.amazonaws.com/static.smiledirectclub.com/evaluation_kit_instructions_5_2_16_email .pdf.
Smile Direct Club Impression Guide (available online Nov. 14, 2016, https://www.sharperimage.com/si/pdf/manuals/203221.pdf accessed Sep. 3, 2019 (Year: 2016), 24 pages.
SmileCareClub promo video uploaded on Jun. 6, 2014 https://www.youtube.com/watch?v=h7x8BwWXUsk.
"Startup Story and Hiring Help from Smile Direct Club Founder Doug Hudson" on relode.com, published Aug. 11, 2015, available at https://www.relode.com/blog/startup-story-and-hiring-help-from-smilecareclub-founder-doug-hudson, 2 pages.
Grindguard, "How to use your dental impression kit", http://www.grindguardpm.com/support/how-to-use-your-dental-impression-kit/ Feb. 9, 2017, accessed online Jan. 3, 2020 (Year: 2017), 5 pages.
International Search Report and Written Opinion for International Application No. PCT/US2019/054958, dated Dec. 17, 2019, 8 pages.
ITero Element Orthodontic Patient Video, Uploaded to YouTube Apr. 4, 2016, https://www.youtube.com/watch?v=Ca69CuWqHCw.
SwankySmiles advertisement from Feb. 8, 2019; located at www.swankysmiles.com (click on Watch the Video). (Year: 2019).
Candid Care Co., https:/www.candidco.com/how-it-works/, webpage printed as existed on Sep. 2, 2018, located using the Internet Archive WayBack Machine, 10 pages.
Mouthpiece Guy et al.: "Mouthpiece Guy vs. The Competition: Impression Kits", www.youtube.com/watch?v=tYOjMtYWQOQ&feature=youtu.be, Feb. 23, 2018, 20 pages of screenshots.
Buschang et al., "Comparative Time Efficiency of Aligner Therapy and Conventional Edgewise Braces", Angle Orthodontist, vol. 84, No. 3, 2014, 6 pages.
From Home Dental, Web page: https://web.archive.org/web/20161021220200/https://fromhomedental.com, Oct. 21, 2016, 4 Pages.
Beers et al., "Computer-assisted treatment planning and analysis", Orthod Caniofacial Res 6(Suppl. 1), 2003; 117-125.
Bhambal et al., "Teledentistry: potentials unexplored!", J. Int Oral Health, Oct. 2010, vol. 2 (Issue 3).
Cooper et al.,"Knowledge, attitudes, and confidence levels of dental hygiene students regarding teledentistry: A pilot study." The Internet Journal of Allied Health Sciences and Practice. Oct. 2007, vol. 5 No. 4.
Ercoli et al., "A comparative study of two different clear aligner systems", Progress in Orthodontics, 2014.
Fabels et al., "Interexaminer and intraexaminer reliabilites of 3-dimensional orthodontic digital setups", American Journal of Orthodontics and Dentofacial Orthopedics, Dec. 2014, vol. 146, Issue 6.
Forever Aligned Club, "Straight Teeth Forever", https://www.foreveralignedclub.com/straight-teeth-forever/, May 26, 2017, 3 pages.
Garino et al., "The iTero Intraoral Scanner in Invisalign Treatment: A Two-year Report", JCO, Feb. 2014.
Groth et al., "Three-Dimensional Printing Technology", JCO, 2014.
Hayashi et al., "Assessment of the accuracy and reliability of new 3-dimensional scanning devices", American Journal of Orthodontics and Dentofacial Orthopedics, Oct. 2013, vol. 144, Issue 4.
Jain et al., "Teledentistry: Upcoming Trend in Dentistry", J Adv Med Dent Scie 2013; 1(2): 112-115.
James Hunt; SmileDirectClub impression kit, https://www.youtube.com/watch?v=3u2KI9Mphey, uploaded Jan. 16, 2017, 19 pages of screenshots.
Jampani et al., "Applications of teledentistry: A literature review and update", Journal of Int Society of Preventive & Community Dentistry, Jul.-Dec. 2011; 1(2): 37-44.
Jones, Perry "The ITero optical scanner for use with Invisalign: A descriptive review", ineedce.com, Feb. 2012.
Kravitz et al.,"Intraoral Digital Scanners", JCO, 2014, vol. 48, No. 6.
Kuncio, Daniel A. "Invisalign: Current guidelines for Effective Treatment", NY State Dental Journal, Mar. 2014.
Lau et al., "Computerised Imaging, Virtual Treatment Planning and Orthodontic Treatment of Dental Malocclusions Using the Invisalign Appliance", The Hong Kong Medical Diary, vol. 9, No. 10, Oct. 2004.
Lin et al., "3D CAD for Design of Invisible Tooth Aligner", Proceedings of the 2005 IEEE Int Conf on Mechanics, Jul. 10-12, Taipei, Taiwan.
Martin et al., "Orthodontic scanners: what's available?", Journal of Orthodontics, vol. 000, 2014, 000-000.
Martorelli et al., "A comparison between customized clear and removable orthodontic appliances manufactured using RP and CNC techniques", Elsevier, Dental Materials 29 (2013).
Monika et al., "Teledentistry: An Overview." J Adv Med Dent Scie Res 2015;3(2):88-91.
Relode, "Startup Story and Hiring Help from SmileDirect Club Founder Doug Hudson"; https://www.relode.com/blog/startup-story-and-hiring-help-from-smiledirectclub-founder-doug-hudson, Aug. 11, 2015, 3 pages.
Shailee et al., "Teledentistry the future of dental practice", Indian J Dent Adv 2013; 5(2): 1195-1199.
Snapcorrect, "What Does My Impression Evaluation Kit Include", https://support.snapcorrect.com/support/solutions/articles/32000019500-what-does-my-impression-evaluation-kit-include, Sep. 18, 2017 1 page.
Snapcorrect, "What Does the 'Return by' Sticker Date Mean", https://support.snapcorrect.com/support/solutions/articles/32000022084-what-does-the-return-by-sticker-date-mean, Feb. 5, 2018 1 page.
Snapcorrect, Snap Correct Impressions, https://www.youtube.com/watch?v=yywqIDSabew, uploaded Oct. 6, 2017, 6 pages of screenshots.
Summerfelt, Fred F."Teledentistry-Assisted, Affiliated Practice for Dental Hygienists: An Innovative Oral Health Workforce Model", Journal of Dental Education, 2011.
Szuhanek et al., "Application of Thermoplastic Materials in the Fabrication of Orthodontic Aligners", Materiale Plastice, 52, No. 3, 2015.
Szuhanek et al., "The Role of Digital Setup in the Orthodontic Treatment with Plastic Aligners", Materiale Plastice, 52, No. 4, 2015.
Taneva et al., "3D Scanning, Imaging, and Printing in Orthodontics", IntechOpen, 2015.
Thukral et al., "Invisalign: Invisible Orthodontic Treatment—A Review." J Adv Med Dent Scie Res 2015;3(5):S42-S44.
Snapcorrect, SnapCorrect Truly Invisible Aligners, https://youtube.com/watch?v=yywqIDSabew, uploaded Jul. 27, 2017, 8 pages of screenshots.
"203221—SmileCareClub" video, uploaded to YouTube on Jun. 10, 2014, https://www.youtube.com/watch?v=B43vT_1GnR0, 33 pages of screenshots.
"Affordable Clear Braces—Smile Care Club" video, uploaded to YouTube on Mar. 30, 2015, https://www.youtube.com/watch?v=Qk-VhbH1RVM, 97 pages of screenshots.

(56) References Cited

OTHER PUBLICATIONS

"Clear Braces . . . At Home??! Review—Before & After—Cost" video, uploaded to YouTube on Oct. 7, 2014, https://www.youtube.com/watch?v=9wrwhRTPjtk&t, 132 pages of screenshots.
"Invisalign Manufacturing Process English" video, uploaded to YouTube on Apr. 7, 2014, https://www.youtube.com/watch?v=vsR0_wTR2a8, 125 pages of screenshots.
"Smile Care Club Unboxing, Review, Tutorial" video, uploaded to YouTube on May 1, 2015, https://www.youtube.com/watch?v=p7Y5fMRnJWE, 126 pages of screenshots.
"Speak Out Game—Ellen Show with Khloe Kardashian and Kevin Hart", uploaded to YouTube on Oct. 11, 2016, https://www.youtube.com/watch?v=RDILAiBFRLY, 50 pages of screenshots.
"Step 1! Working on my Smile . . . Smile Care Club" video, uploaded to YouTube on Jan. 4, 2015, https://www.youtube.com/watch?v=T_F3Xt4Og7w, 87 pages of screenshots.
Do It Yourself Dental Impression Kit, Apr. 30, 2016, 2 pages.
ITero Element Orthodontic Patient Video, Uploaded to YouTube Apr. 4, 2016, https://www.youtube.com/watch?v=Ca69CuWqHCw, 33 pages of screenshots.
Smile Care Club Review, URL: https://www.youtube.com/watch?v=jpAjhJqi6vc, Mar. 26, 2016, 260 pages of screenshots.
Smile Care Club, "Impression Kit", Jul. 21, 2014, available for retrieval at URL https://vimeo.com/wmvproductions/review/115725718/28854a7f49, 43 pages of screenshots.
Smile Care Club, "Impressions—New Box", 2015, available for retrieval at URL https://vimeo.com/wmvproductions/review/137176701/d45be82d56, 24 pages of screenshots.
Smile Care Club, "Impressions—Old Box", 2015, available for retrieval at URL https://vimeo.com/wmvproductions/review/137176599/0b8020929d, 21 pages of screenshots.
Smile Care Club, "Impressions ReEdit", 2016, available for retrieval at URL https://vimeo.com/wmvproductions/review/168249998/0b75310374, 32 pages of screenshots.
Smile Care Club, "Impressions", 2015, available for retrieval at URL https://vimeo.com/wmvproductions/review/136533463/1a8515abf5, 10 pages of screenshots.
Smile Care Club, "Promo", 2014, available for retrieval at URL https://vimeo.com/wmvproductions/review/115725719/9c8235cdf2, 25 pages of screenshots.
SmileCareClub promo video uploaded on Jun. 6, 2014 https://www.youtube.com/watch?v=h7x8BwWXUsk, 33 pages of screenshots.
Summerfelt, Fred F., "Teledentisty-Assisted, Affiliated Practice for Dental Hygienists: An Innovative Oral Health Workforce Model", Journal of Dental Education, vol. 75, No. 6, Jun. 2011, pp. 733-742.
SwankySmiles advertisement from Feb. 8, 2019, located at www.swankysmiles.com, 5 pages of screenshots.
Align Technology, Inc., "Invisalign Outcome Simulator 4.1," 2017, https://rdentlab.com/resources/clinical-information-guides/ (50 pages).
Align Technology, Inc., "iTero Element 2 and Flex Brochure for Orthodontists," 2018, https://global.itero.com/en-gb/training/literature (6 pages).
Dental Review, "New Itero Element 2 and iTero Element Flex," 2018, https://www.dentalreview.news/technology/24-dental-cad-cam-technology/3 25 5-new-itero-element-2-and-itero-element-flex (4 pages).
Decision on Appeal for U.S. Appl. No. 15/725,430, dated Sep. 23, 2021, 11 Pages.
Federal Circuit Affirmance on the '522 patent Case No. 2021-1446 dated Aug. 17, 2021.

* cited by examiner

FREE SMILE ASSESSMENT

THE FOLLOWING QUESTIONS WILL HELP OUR DENTAL STAFF ASSESS IF COMPANY IS RIGHT FOR YOU.

① HAVE YOU WORN BRACES OR INVISIBLE ALIGNERS IN THE PAST?

| YES | NO |

② CHOOSE THE OPTION THAT BEST DESCRIBES YOUR BIGGEST CONCERN WITH YOUR SMILE:

FIX A SPACING ISSUE ▼

③ OF THE IMAGES BELOW, WHICH ONE BEST DESCRIBES YOUR TEETH CROWDING?

| MILD, OR NO CROWDING | MODERATE | EXTREME |

④ OF THE IMAGES BELOW, WHICH ONE BEST DESCRIBES YOUR TEETH SPACING?

| MILD, OR NO EXTRA SPACE | MODERATE | EXTREME |

· · ·

GET YOUR RESULTS

*FIG. 26*

MY ACCOUNT
WELCOME BACK, MAGGIE!

USER:

YOUR NEXT STEP:

WHERE'S YOUR CAMERA? WITHOUT PHOTOS OF YOUR TEETH YOUR SMILE IS IN LIMBO. WE CAN'T BUILD YOUR CUSTOM TREATMENT PLAN AND WE CAN'T MOVE FORWARD. GET THAT CAMERA AND LET'S GET THOSE PHOTOS UPLOADED. IF YOU'RE HAVING ISSUES UPLOADING YOUR PHOTOS YOU CAN EMAIL THEM TO SUPPORT@COMPANY.COM

YOU'RE SCHEDULED FOR AN APPOINTMENT AT THE DENTIST AT 11:00 AM CDT, TUESDAY, MARCH 14, 2017.

THANK YOU FOR BOOKING YOUR SCAN. WE ARE LOCATED AT ADDRESS.

HELPFUL HINTS:
- YOU CAN ALWAYS CALL US AT 555-555-5555 IF YOU NEED HELP WITH DIRECTIONS.
- MAKE SURE TO BRUSH YOUR TEETH BEFORE YOUR APPOINTMENT.
  - ARRIVE A LITTLE EARLY FOR PARKING
  - THE SMILESHOP IS LOCATED INSIDE THE BUILDING.

FEEL FREE TO CALL US AT 555-555-5555 FOR QUESTIONS REGARDING SCHEDULING.

COMPLETE YOUR PHOTO ASSESSMENT — 1602

MAGGIE

YOU'RE ON YOUR WAY TO A BETTER SMILE.

THE BELOW INFORMATION WILL HELP OUR DENTAL PROFESSIONALS EVALUATE YOUR SMILE AND CREATE YOUR CUSTOM TREATMENT PLAN.

1802

I HAVE A BONDED RETAINER

| YES | NO |
|---|---|

I HAVE BRIDGEWORK

| YES | NO |
|---|---|

PRIMARY COMPLAINT

TELL US WHAT YOU WANT TO CHANGE ABOUT YOUR SMILE (EXAMPLE: "PLEASE FIX THE GAP IN MY FRONT TEETH," "PLEASE ROTATE MY BOTTOM RIGHT TOOTH," ETC.). OUR PROVIDERS NEED EXAMPLES OF WHAT YOU'D LIKE TO CHANGE IN ORDER TO PRESCRIBE TREATMENT. PLEASE BE AS SPECIFIC AS POSSIBLE.

WRITE YOUR COMMENTS HERE

SUBMIT

*FIG. 29C*

TREATMENT OPTIONS:

| | |
|---|---|
| ✓ ------ | |
| BOTH | |
| UPPER | |
| LOWER | |

| | | |
|---|---|---|
| I HAVE BRIDGEWORK: | ○ YES | ○ NO |
| I HAVE CROWNS: | ○ YES | ○ NO |
| I HAVE AN IMPACTED TOOTH: | ○ YES | ○ NO |
| I HAVE AN IMPLANT: | ○ YES | ○ NO |
| I HAVE PRIMARY (BABY) TEETH: | ○ YES | ○ NO |
| I HAVE VENEERS: | ○ YES | ○ NO |
| DO YOU FEEL PAIN IN ANY OF YOUR TEETH?: | ○ YES | ○ NO |
| DO YOU CURRENTLY HAVE ANY HEAD, NECK, OR JAW INJURIES?: | ○ YES | ○ NO |
| DO YOU HAVE ANY SORES OR LUMPS IN OR NEAR YOUR MOUTH?: | ○ YES | ○ NO |
| DO YOU CURRENTLY EXPERIENCE: JAW CLICKING, PAIN, DIFFICULTY OPENING AND/OR CLOSING OR DIFFICULTY CHEWING?: | ○ YES | ○ NO |
| HAVE YOU NOTICED ANY LOOSENING OF YOUR TEETH OR DO YOU HAVE UNTREATED PERIODONTAL DISEASE?: | ○ YES | ○ NO |

| | | |
|---|---|---|
| DO YOU HAVE ANY KNOWN ALLERGIES TO ANY DENTAL MATERIALS?: | ○ YES | ○ NO |
| I HAVE A HISTORY OF IV BISPHOSPHONATE TREATMENT.: | ○ YES | ○ NO |
| I AM CURRENTLY ON ACUTE CORTICOSTEROIDS OR IN IMMUNOSUPPRESSION, CHEMOTHERAPY, OR RADIATION OF HEAD/NECK.: | ○ YES | ○ NO |
| I HAVE HAD A BONE MARROW TRANSPLANT OR TREATMENT OF HEMATOLOGICAL MALIGNANCIES (BLOOD CANCERS) WITHIN THE PAST 2 YEARS.: | ○ YES | ○ NO |

CHIEF COMPLAINT:

[ SUBMIT ]  [ CANCEL ]

| QUESTION | ANSWER |
|---|---|
| ALLOW REFERRAL | NONE |
| HAS BONDED RETAINER | NO |
| HAS BRIDGEWORK | NO |
| HAS CROWNS | NO |
| HAS IMPACTED TOOTH | NO |
| HAS IMPLANT | NO |
| HAS PRIMARY TOOTH | NO |
| HAS VENEERS | NO |

HISTORY

EDIT HISTORY

⊙ | ᐞ CASES     SEARCH BY PATIENT NAME OR CASE NUMBER 🔍 ⋮⋮⋮ GRID ☰ LIST     ᐞ LOGOUT

2002

30 CASES

REVISE HYGCORP — AGE 35 — LAB CASE ID: CA455007
- ⓘ ACTION REQUIRED: RECOMMENDED BY HYGIENIST: APPROVE REVIEW TREATMENT PLAN
- 💬 CHIEF COMPLAINT: WQWQ
- 📅 DATE OF LAST ACTIVITY: FRIDAY, FEBRUARY 17, 2017 9:58 A.M. UTC

2004

MAGGIE TESTER — AGE 32 — LAB CASE ID: CA178920
- ⓘ ACTION REQUIRED: RECOMMENDED BY HYGIENIST: APPROVE REVIEW TREATMENT PLAN
- 💬 CHIEF COMPLAINT: MY FRONT TEETH ARE CROOKED. I HAVE A GAP BETWEEN MY BOTTOM TEETH
- 📅 DATE OF LAST ACTIVITY: TUESDAY, FEBRUARY 14, 2017 4:15 P.M. UTC

RRSMILELAB TESTING — AGE 28 — LAB CASE ID: CA092783
- ⓘ ACTION REQUIRED: RECOMMENDED BY HYGIENIST: REVISE REVIEW TREATMENT PLAN
- 💬 CHIEF COMPLAINT: CROOKED
- 📅 DATE OF LAST ACTIVITY: TUESDAY, FEBRUARY 14, 2017 2:09 P.M. UTC

HYGIENE ACCEPT — AGE 21 — LAB CASE ID: CA973141
- ⓘ ACTION REQUIRED: RECOMMENDED BY HYGIENIST: APPROVE REVIEW TREATMENT PLAN
- 💬 CHIEF COMPLAINT: CYG
- 📅 DATE OF LAST ACTIVITY: TUESDAY, FEBRUARY 7, 2017 1:50 P.M. UTC

MORPHY REJECTCORP — AGE 40 — LAB CASE ID: CA047616

MARY CORPREVISED — AGE 42 — LAB CASE ID: CA890399

ISAC NONCROP — AGE 43 — LAB CASE ID: CA674176

MONALISA CORPHYG — AGE 45 — LAB CASE ID: CA420202

JOURNAL

| DATE | NOTE | AUDIENCE |
|---|---|---|
| MONDAY, MARCH 6, 2017 12:28 P.M. UTC | E-MAILED ***** @*** TO REVIEW THE TP BY: ****** @*** | STAFF |
| FRIDAY, MARCH 3, 2017 12:28 P.M. UTC | FRENECTOMY CONSENT: EMAIL_VIEWED BY:ECHOSIGN | |
| FRIDAY, MARCH 3, 2017 12:28 P.M. UTC | FRENECTOMY CONSENT: EMAIL_VIEWED BY:ECHOSIGN | |
| THURSDAY, MARCH 2, 2017 10:15 P.M. UTC | STATUS CHANGED FROM SETUP IN PROGRESS TO SETUP READY FOR REVIEW BY: ****** @*** | ALL |
| THURSDAY, MARCH 2, 2017 10:14 P.M. UTC | NATHAN CRUTCH NEW SMILE PLAN REVISION UPLOADED BY:*** @*** | |
| THURSDAY, MARCH 2, 2017 4:07 P.M. UTC | TREATMENT PLAN REVISION REQUESTED BY: ****** | |
| THURSDAY, MARCH 2, 2017 4:07 P.M. UTC | STATUS CHANGED FROM SETUP READY FOR REVIEW TO SETUP IN PROGRESS BY: ****** | |
| THURSDAY, MARCH 2, 2017 3:35 P.M. UTC | STATUS CHANGED FROM SECOND OPINION (TREATMENT PLAN REJECTED) TO SETUP READY FOR REVIEW BY: **** @*** | |
| THURSDAY, MARCH 2, 2017 3:35 P.M. UTC | CASE SUBMITTED TO ***** BY: **** @*** | |
| THURSDAY, MARCH 2, 2017 3:35 P.M. UTC | FRENECTOMY CONSENT: SIGNATURE_REQUESTED BY:ECHOSIGN | |
| THURSDAY, MARCH 2, 2017 3:35 P.M. UTC | FRENECTOMY CONSENT: CREATED BY:ECHOSIGN | |
| THURSDAY, MARCH 2, 2017 2:36 P.M. UTC | TREATMENT PLAN REJECTED BY:***** | ALL |
| THURSDAY, MARCH 2, 2017 2:36 P.M. UTC | STATUS CHANGED FROM SETUP READY FOR REVIEW TO SECOND OPINION (TREATMENT PLAN REJECTED) BY: ****** | |
| THURSDAY, MARCH 2, 2017 12:31 P.M. UTC | HYGIENIST RECOMMENDATION-APPROVE (WAITING ON OFFICAL RESPONSE FROM DOCTOR) BY:***** @*** | ALL |
| THURSDAY, MARCH 2, 2017 2:45 A.M. UTC | STATUS CHANGED FROM SETUP IN PROGRESS TO SETUP READY FOR REVIEW BY: ***** @*** | |

*FIG. 34C*

SUBMIT JOURNAL ENTRY

NOTES

AUDIENCE

STAFF

SUBMIT

*FIG. 34D*

ALL CASE MESSAGES

TREATMENT PLAN REVISION 1
CREATED BY ****** ON 03-12-17 2:45AM

NASHVILLE, TN 37219

| | |
|---|---|
| FROM: | ****** |
| TO: | PROV |
| DATE: | 03-02-17 10:15PM |
| LAB ID: | CA734723 |
| CASE: | CFA5D9990BD4D2 |
| PATIENT: | ****** |
| MRN: | M269FA0A8B9A23 |

YOUR REVISION REQUEST HAS BEEN COMPLETED, PLEASE REVIEW THE NEW TREATMENT PLAN.

[REPLY]

TREATMENT PLAN REVISION 1
CREATED BY ****** ON 03-12-17 2:45AM

NASHVILLE, TN 37219

| | |
|---|---|
| FROM: | ****** |
| TO: | SUPPORT |
| DATE: | 03-02-17 2:36PM |
| LAB ID: | CA734723 |
| CASE: | CFA5D9990BD4D2 |
| PATIENT: | ****** |
| MRN: | M269FA0A8B9A23 |

TREATMENT PLAN REJECTED.
PERIODONTAL CLEARANCE
NEED PERIO CLEARANCE MUST HAVE CLEANING PRIOR TO ALIGNER TREATMENT

[REPLY]

| | |
|---|---|
| FROM: | ****** |
| TO: | SUPPORT |
| DATE: | 03-02-17 2:36PM |
| LAB ID: | CA734723 |
| CASE: | CFA5D9990BD4D2 |
| PATIENT: | ****** |
| MRN: | M269FA0A8B9A23 |

NEED PERIO CLEARANCE MUST HAVE CLEANING PRIOR TO ALIGNER TREATMENT.

[REPLY]

| | |
|---|---|
| FROM: | ****** |
| TO: | PROV |
| DATE: | 03-02-17 2:41PM |

PLEASE NOTICE THAT SPACE WAS LEFT DISTAL FROM UPPER LATERALS, IN ORDER TO AVOID AFFECTING CANINE RELATIONSHIP.

*FIG. 34E*

| FILES | | | |
|---|---|---|---|
| NAME | KIND | UPLOAD DATE | UPLOADED BY |
| NEW SMILE PLAN REVISION | TREATMENTPLAN | 03-02-2017 10:14PM(UTC) | ************ |
| NEW SMILE PLAN | TREATMENTPLAN | 03-02-2017 2:44AM(UTC) | ************ |
| LOWER | 3DSCAN | 03-01-2017 2:16AM(UTC) | ********** |
| UPPER | 3DSCAN | 03-01-2017 2:15AM(UTC) | ********** |
| BEFORE | OTHER | 02-28-2017 10:22PM(UTC) | ********* |
|  | PURCHCONSENT | 02-28-2017 10:22PM(UTC) | ********* |
|  | HXCONSENT | 02-28-2017 10:15PM(UTC) | ********* |

2318

| CASE DOCUMENTS | |
|---|---|
| FRENECTOMY CONSENT (03-02-2017 3:35PM) | VIEW DOCUMENTS  REMINDER  REMOVE |

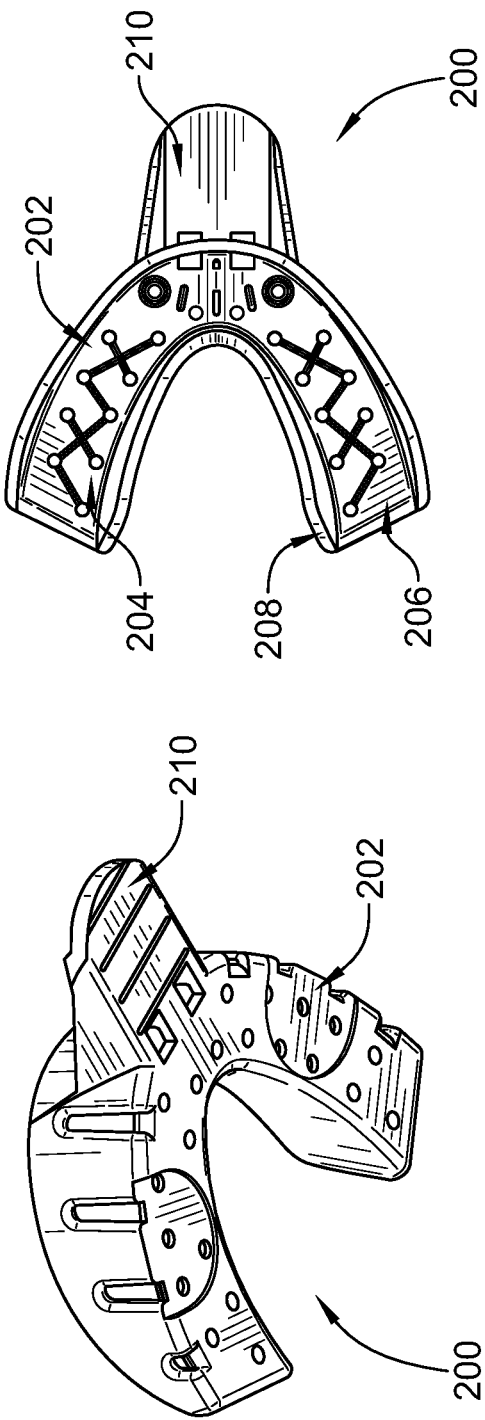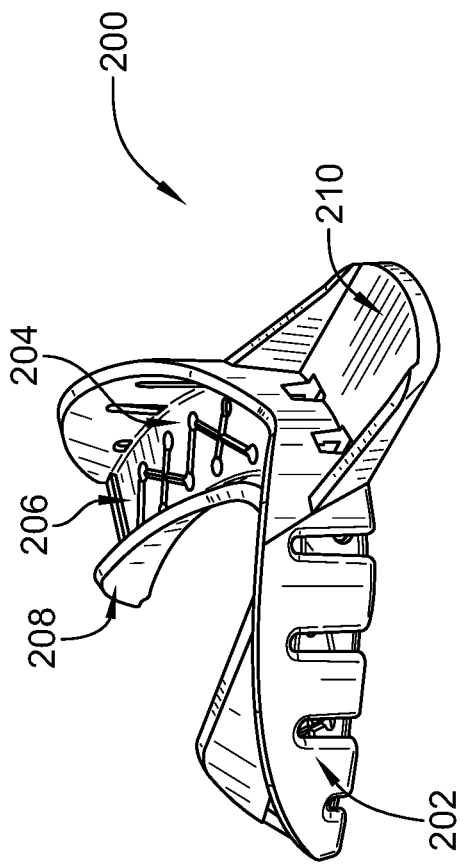

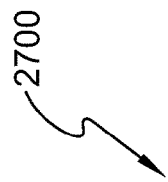

| FILES | | | |
|---|---|---|---|
| NAME | KIND | UPLOAD DATE | UPLOADED BY |
| 90 DAY PROGRESS NOTE | 90DAYNOTE | 06-14-2017 5:40 PM (UTC) | ERMINIA SARLEY |
| 90 DAY PROGRESS PHOTO | 90DAYPHOTO | 06-14-2017 5:39 PM (UTC) | ERMINIA SARLEY |
| UPPER | 3DSCAN | 02-18-2017 4:54 PM (UTC) | F792D1AFBO@399DCE4753.COM |
| LOWER | 3DSCAN | 02-18-2017 4:53 PM (UTC) | F792D1AFBO@399DCE4753.COM |
| LOWER | 3DSCAN | 02-20-2017 3:54 PM (UTC) | F792D1AFBO@399DCE4753.COM |
| UPPER | 3DSCAN | 02-20-2017 3:57 PM (UTC) | F792D1AFBO@399DCE4753.COM |

90 DAY REVIEW

SEND 90 DAY REVIEW TO PROVIDER PORTAL

| DATE SENT | SENT BY | STATUS |
|---|---|---|
| WEDNESDAY, JUNE 14, 2017 5:41 P.M. UTC | *@* | READY |

*FIG. 38D*

DENTAL IMPRESSION RETAKE KIT AND METHODS THEREFOR

CROSS-REFERENCE TO RELATED PATENT APPLICATIONS

This application is a continuation of U.S. patent application Ser. No. 16/047,694, filed Jul. 27, 2018, which claims the benefit of and priority to U.S. Provisional Patent Application No. 62/663,725, filed Apr. 27, 2018, and U.S. Provisional Patent Application No. 62/648,229, filed Mar. 26, 2018. U.S. patent application Ser. No. 16/047,694 is also a continuation-in-part of U.S. patent application Ser. No. 15/725,430, filed Oct. 5, 2017, which claims the benefit of and priority to U.S. Provisional Patent Application No. 62/522,847, filed Jun. 21, 2017. All of the aforementioned applications are incorporated herein by reference in their entirety.

TECHNICAL FIELD

The present disclosure relates to a dental impression kit and, more specifically, to a system and method for application of a dental impression kit at home. The present disclosure also relates to an application server for remote orthodontic treatment and methods therefor.

BACKGROUND

A dental impression provides a negative imprint of the teeth and tissues in the mouth. The negative impression may then be utilized to produce a physical or digital reproduction of the teeth, e.g. dentures and orthodontics. Generally, a dental tray having a viscous, thixotropic impression material therein is fit over the dental arches of the patient. The impression material sets to a solid leaving an imprint of the structures in the mouth. When removed from the mouth, the impression provides a detailed and stable negative of the teeth. Optionally, the impression is processed using digital scanning methods to create the digital negative of the teeth.

Traditionally, dental impressions are made in a dental office and require significant time. The impressions are then delivered to an outside vendor that utilizes the impression to form a positive model of the teeth. If the dental impression includes any errors, e.g. incomplete impression of the teeth and tissues, the patient may be required to return to the dental office to have a second impression made.

As an alternative method to traditional orthodontic procedures, in less severe cases, dental impressions may be made with an at-home dental impression kit. Such kits are generally prescribed by a dental professional to qualified customers, e.g. in a dental office. The user may then administer the contents of the dental impression kit at home. After completing the dental impressions, the kit is returned to the dental professional. Some at-home kits may be difficult to administer and/or may result in poor quality dental impressions.

SUMMARY

According to one aspect of the disclosure, a method of administering the contents of a dental impression kit is disclosed. The method includes sending a dental impression kit to a user, the dental impression kit including a container having a top layer containing an initial dental assembly and a bottom layer containing a redundant dental assembly. The bottom layer is positioned below the top layer. The dental impression kit has instructions for administering the initial dental assembly, administering the redundant dental assembly, and returning the administered initial dental assembly and the administered redundant dental assembly. The instructions include an initial instruction, a redundant instruction, and a return instruction. The instructions include instructing the user to administer the initial dental assembly according to the initial instruction. The instructions include instructing the user to remove the top layer from the container to expose the bottom layer. The instructions include instructing the user to administer the redundant dental assembly according to the redundant instruction. The instructions include instructing the user to return the initial dental assembly and the redundant dental assembly within a predetermined time frame.

In some embodiments, instructing the user to return the initial dental assembly and the redundant dental assembly within the predetermined time frame includes instructing the user to return the initial dental assembly and the redundant dental assembly within the predetermined time frame from a date upon which the user ordered the dental impression kit.

In some embodiments, instructing the user to return the initial dental assembly and the redundant dental assembly within the predetermined time frame includes instructing the user to return the initial dental assembly and the redundant dental assembly within the predetermined time frame from a date upon which the dental impression kit was sent to the user.

In some embodiments, instructing the user to return the initial dental assembly and the redundant dental assembly within the predetermined time frame includes instructing the user to return the initial dental assembly and the redundant dental assembly within the predetermined time frame from a date upon which the user is estimated to receive the dental impression kit.

In some embodiments, the predetermined time frame is two weeks.

In some embodiments, the dental impression kit further includes a container for returning the initial dental assembly and the redundant dental assembly. The shipping container can include a return mailing label.

In some embodiments, the dental impression kit is shipped in a container. The container for returning the initial dental assembly and the redundant dental assembly and the container in which the dental impression kit are the same container.

In some embodiments, the predetermined time frame is represented on a label positioned on the container.

According to another aspect of the disclosure, a dental impression kit is disclosed. The dental impression kit includes a container having a top layer containing an initial dental assembly and a bottom layer containing a redundant dental assembly. The bottom layer is positioned below the top layer. The dental impression kit further includes instructions instructing a user to administer the initial dental assembly according to an initial instruction. The dental impression kit further includes instructions instructing a user to remove the top layer from the container to expose the bottom layer. The dental impression kit further includes instructions instructing a user to administer the redundant dental assembly according to a redundant instruction. The dental impression kit further includes instructions instructing a user to return the initial dental assembly and the redundant dental assembly within a predetermined time frame.

In some embodiments, instructing the user to return the initial dental assembly and the redundant dental assembly within the predetermined time frame includes instructing the user to return the initial dental assembly and the redundant dental assembly within the predetermined time frame from a date upon which the user ordered the dental impression kit.

In some embodiments, instructing the user to return the initial dental assembly and the redundant dental assembly within the predetermined time frame includes instructing the user to return the initial dental assembly and the redundant dental assembly within the predetermined time frame from a date upon which the dental impression kit was sent to the user.

In some embodiments, instructing the user to return the initial dental assembly and the redundant dental assembly within the predetermined time frame includes instructing the user to return the initial dental assembly and the redundant dental assembly within the predetermined time frame from a date upon which the user is estimated to receive the dental impression kit.

In some embodiments, the predetermined time frame is two weeks.

In some embodiments, the dental impression kit further includes a container for returning the initial dental assembly and the redundant dental assembly. The shipping container may include a return mailing label and a label including the predetermined time frame.

According to another aspect of the disclosure, a dental impression kit is disclosed. The dental impression kit includes a dental assembly including a dental tray, a base putty, and a catalyst putty, the base putty and the catalyst putty being mixable to form a putty mixture to be positioned in the dental tray. The dental impression kit further includes instructions instructing a user to mix the base putty and the catalyst putty to form the putty mixture. The dental impression kit further includes instructions instructing a user to position the putty mixture in the dental tray. The dental impression kit further includes instructions instructing a user to administer the dental tray. The dental impression kit further includes instructions instructing a user to return the administered dental tray within a predetermined time frame.

In some embodiments, instructing the user to return the administered dental tray within the predetermined time frame includes instructing the user to return the administered dental tray within the predetermined time frame from a date upon which the user ordered the dental impression kit.

In some embodiments, instructing the user to return the administered dental tray within the predetermined time frame includes instructing the user to return the administered dental tray within the predetermined time frame from a date upon which the dental impression kit was sent to the user.

In some embodiments, instructing the user to return the administered dental tray within the predetermined time frame includes instructing the user to return the administered dental tray within the predetermined time frame from a date upon which the user is estimated to receive the dental impression kit.

In some embodiments, the dental impression kit further includes a shipping container for returning the initial dental assembly and the redundant dental assembly. The shipping container may include a return mailing label.

In some embodiments, the predetermined time frame is represented on a label.

BRIEF DESCRIPTION OF THE DRAWINGS

The foregoing and other features of the various embodiments of the methods and apparatuses described herein will become more apparent from the following detailed description and the accompanying drawings in which:

FIG. 26 is a screen shot of a smile assessment user interface that may be generated by the application server of FIGS. 22-23;

FIG. 27 is a screen shot of an account status user interface that may be generated by the application server of FIGS. 22-23;

FIGS. 29A-29E are screen shots of a dental history questionnaire user interface that may be generated by the application server of FIGS. 22-23;

FIGS. 30A and 30B are screen shots of a photo assessment user interface that may be generated by the application server of FIGS. 22-23;

FIGS. 31A-31E are screen shots of a provider portal user interface that may be generated by the application server of FIGS. 22-23;

FIGS. 34A-34F are screen shots of a staff portal user interface that may be generated by the application server of FIGS. 22-23;

FIGS. 35-37 are views of another embodiment of a dental tray;

FIGS. 38A-38D are screen shots of a check-in process user interface that may be generated by the application server of FIGS. 22-23.

DETAILED DESCRIPTION OF THE DRAWINGS

Figure 1:
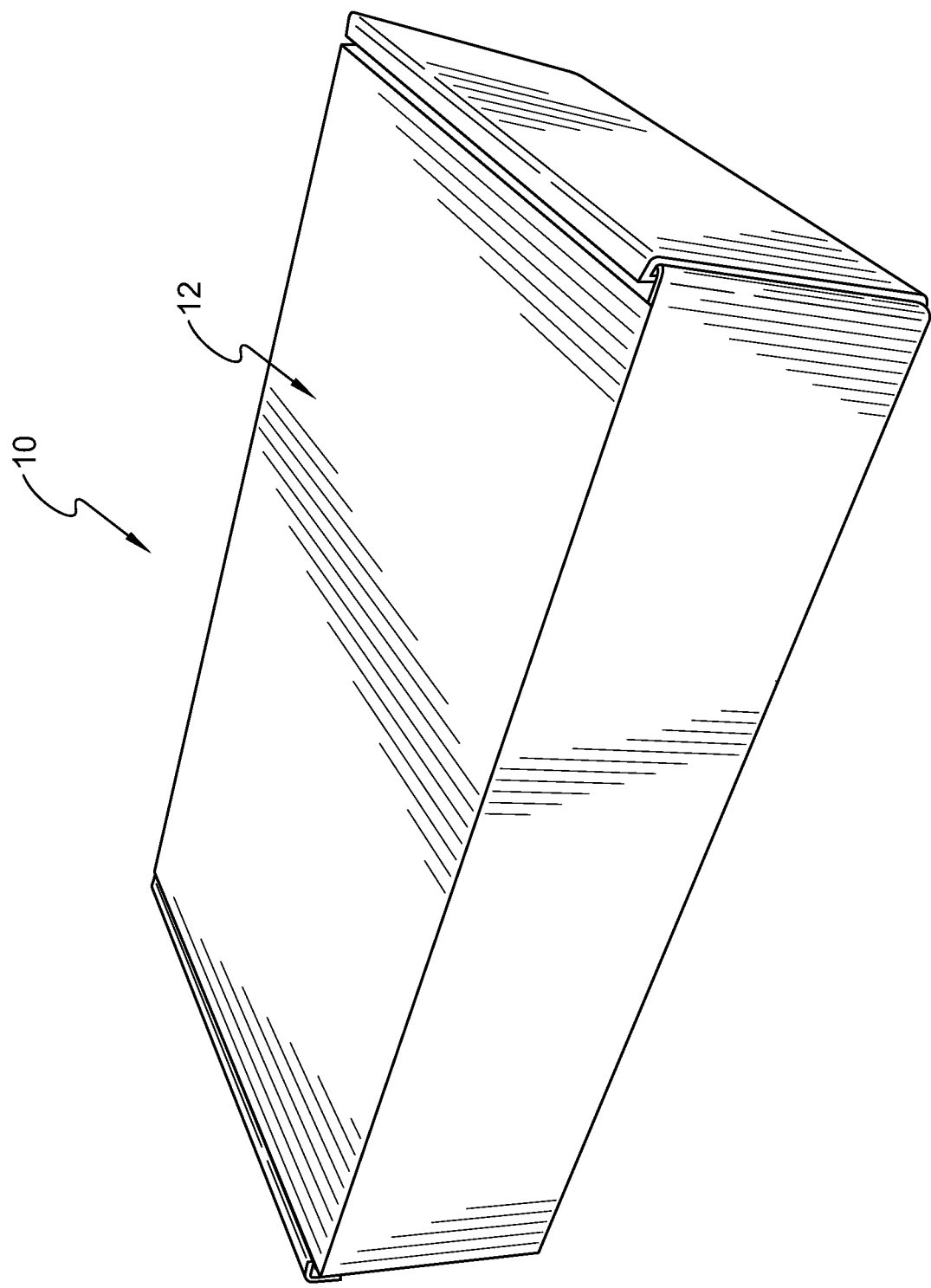
FIG. 1 is a perspective view of a container that contains the contents of a dental impression kit.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a dental impression kit 10 is shown having dental assemblies (discussed in more detail below) therein. The dental impression kit 10 may be ordered by a customer and shipped in a container or box 12, shown in FIG. 1, from a vendor. After administering the dental impression kit 10 at home, the customer may ship the dental impression kit 10 in the box 12 back to the vendor for analysis. The box 12 is sized for standard shipping and is likewise sized for delivery into the customer's mailbox. Accordingly, additional fees for shipment of the dental impression kit 10 in the box 12 may not be required.

Figure 2:
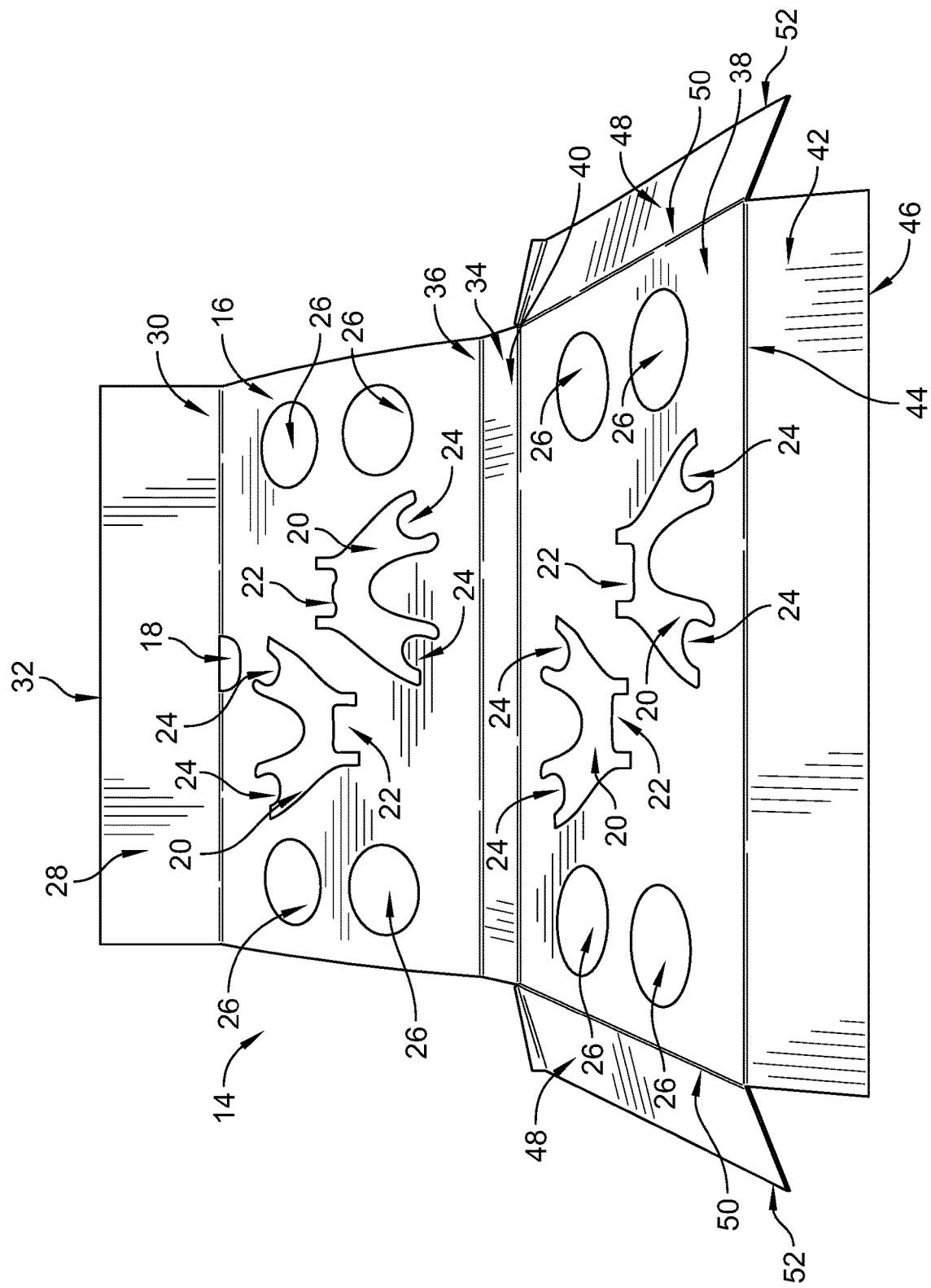
FIG. 2 is a perspective view of an insert that is positioned within the container shown in FIG. 1.

Referring to FIG. 2, the box 12 includes an insert 14 therein that is configured to retain the dental assemblies. The insert 14 includes a top layer 16 having a plurality of cutouts formed therein. A front cutout 18 is sized and shaped to receive a user's finger to lift the top layer 16 from the box 12. A pair of tray cutouts 20 are sized and shaped to retain dental trays (described below). The tray cutouts 20 include a flange 22 that is sized and shaped to retain a front flange of the dental tray. A pair of flanges 24 retain rear ends of the dental tray. Circular cutouts 26 are sized and shaped to retain containers of putty (described below).

A front flap 28 is joined to the top layer 16 along a fold line 30. The front flap 28 is configured to be folded such that an end 32 of the front flap 28 engages a bottom of the box 12, when the insert 14 is positioned within the box 12. The front flap 28 supports the top layer 16 within the box 12. A center flap 34 extends from the top layer 16 along a fold line 36. The center flap 34 is also connected to a second or bottom layer 38 along a fold line 40. When the insert 14 is positioned within the box 12, the center flap 34 supports the top layer 16 within the box.

The bottom layer 38 is configured to be positioned below the top layer 16, when the insert 14 is positioned within the box 12. The bottom layer 38 also includes a plurality of cutouts formed therein. A pair of tray cutouts 20 are sized and shaped to retain dental trays. The tray cutouts 20 include a flange 22 that is sized and shaped to retain a front flange of the dental tray. A pair of flanges 24 retain rear ends of the dental tray. Circular cutouts 26 are sized and shaped to retain containers of putty.

A front flap 42 extends from the bottom layer 38 along a fold line 44. The front flap 42 is configured to be folded such that an end 46 of the front flap 42 engages a bottom of the box 12, when the insert 14 is positioned within the box 12. A pair of side flaps 48 extends from the bottom layer 38 along fold lines 50. The side flaps 48 are configured to be folded such that an end 52 of each side flap 48 engages a bottom of the box 12, when the insert 14 is positioned within the box 12. Accordingly, the front flap 42 and the side flaps 48 support the bottom layer 38 within the box 12, when the insert 14 is positioned within the box 12.

In some embodiments, the top layer 16 and the bottom layer 38 are not integrally formed. In such an embodiment, the top layer 16 is configured to be positioned on top of the bottom layer 38 such that the top layer is individually removable while the bottom layer 38 remains within the box 12.

Figure 3:
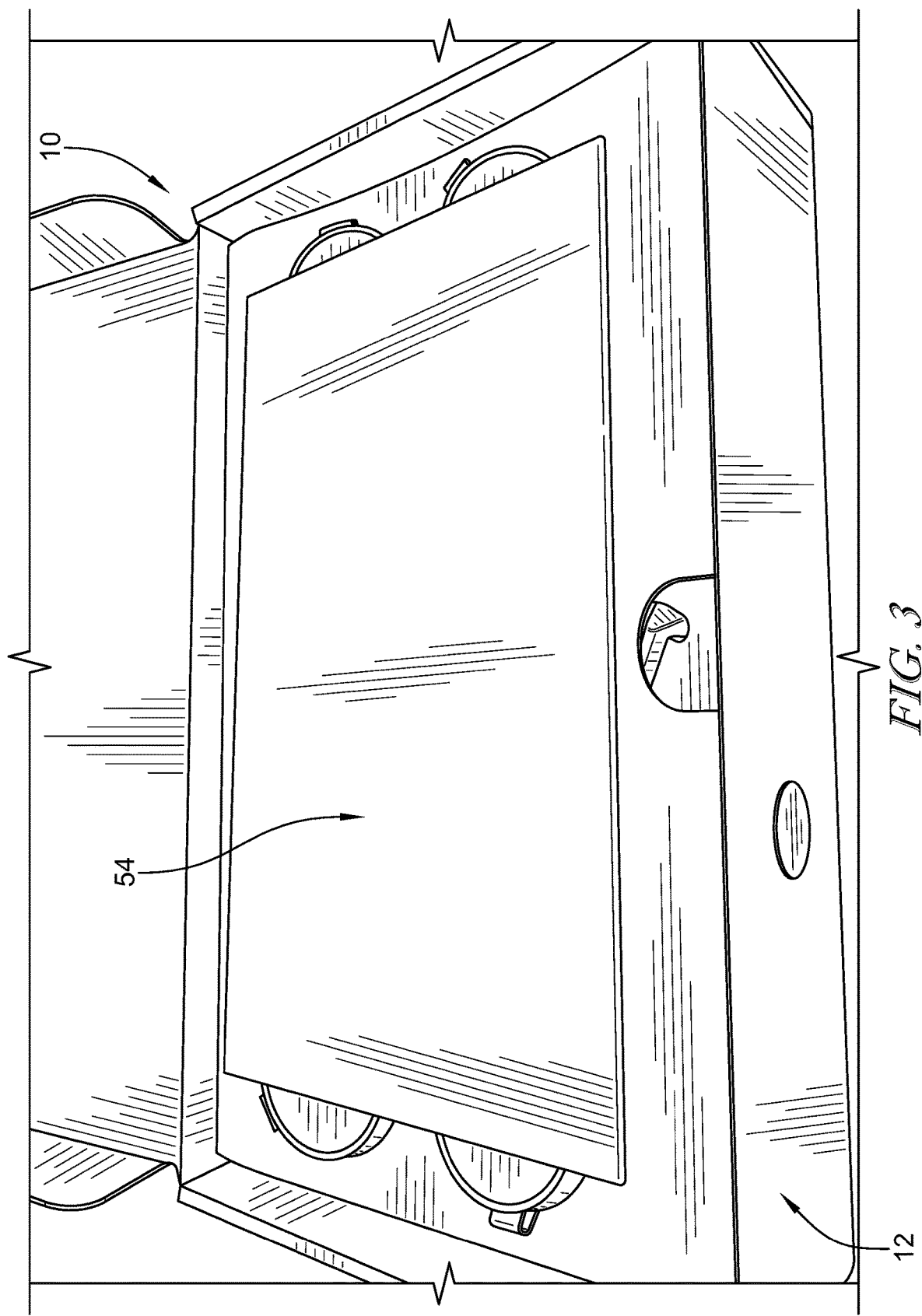
FIG. 3 is a perspective view of the container shown in FIG. 1 in an open configuration to expose an instruction manual.

Referring to FIG. 3, when the box 12 is opened, an instruction manual 54 is positioned at a top of the box contents. The instruction manual 54 provides step-by-step instructions for administering the contents of the dental impression kit 10. A method for administering the dental impression kit 10 according to the instructions is described in more detail with respect to FIG. 10. In some embodiments, the user may be provided with an impression kit video. Similar to the instructions, the video may instruct the user on how to properly administer an impression. The instructor may be a dental professional, such as a dentist, orthodontist, dental hygienist, etc. The impression kit video may be sent to the user (e.g., via email) on the date of ordering the dental impression kit 10, on the date of receipt, etc. Additionally, a link to the impression kit video may be provided on the box 12 and the user may be instructed to go to the link and watch the video. Such embodiments may increase the likelihood of acceptance of the impressions, as will be discussed in greater detail below.

Figure 4:
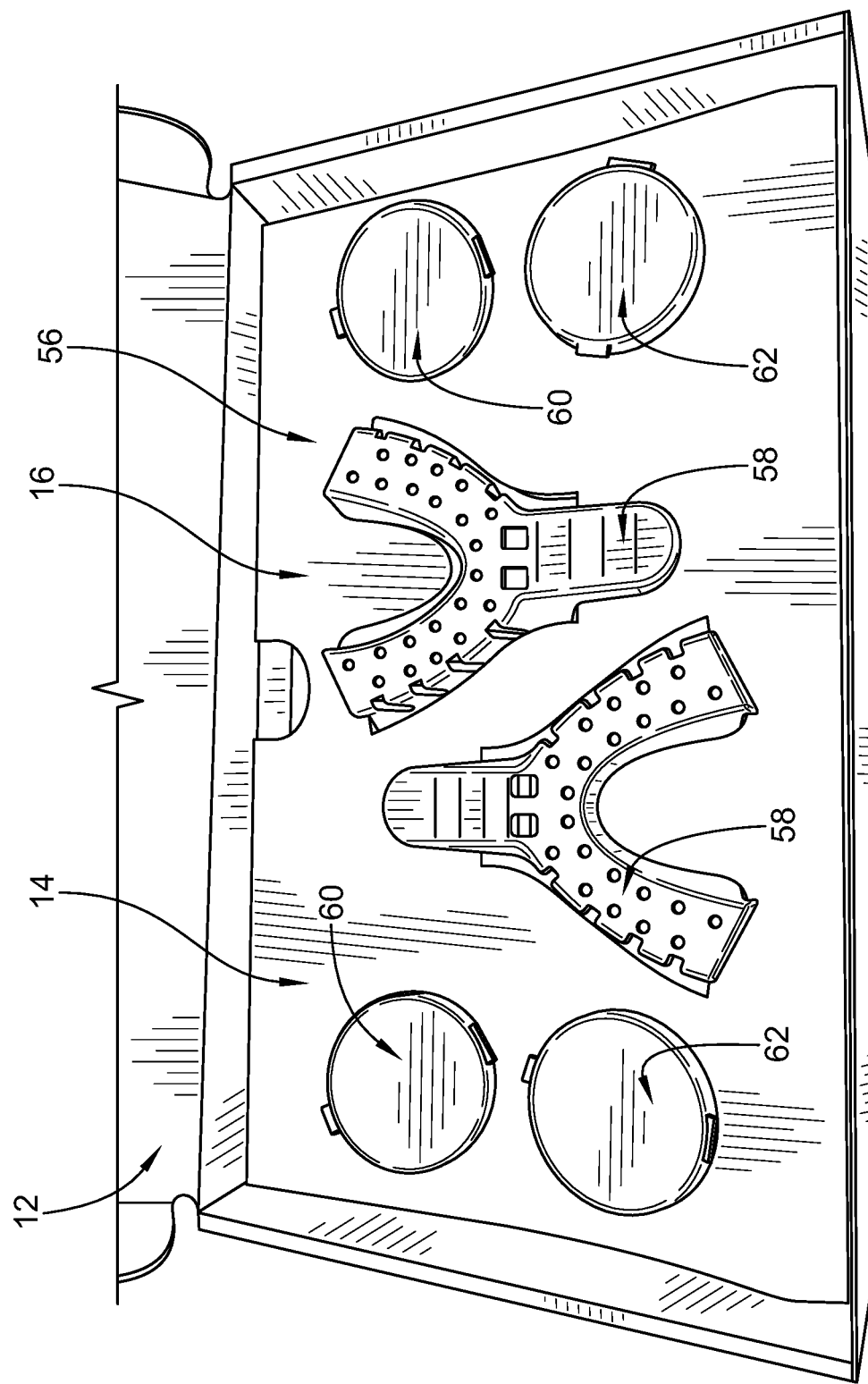
FIG. 4 is a perspective view of a top layer of the insert shown in FIG. 2 and having part of the dental impression kit therein.
Figure 7:
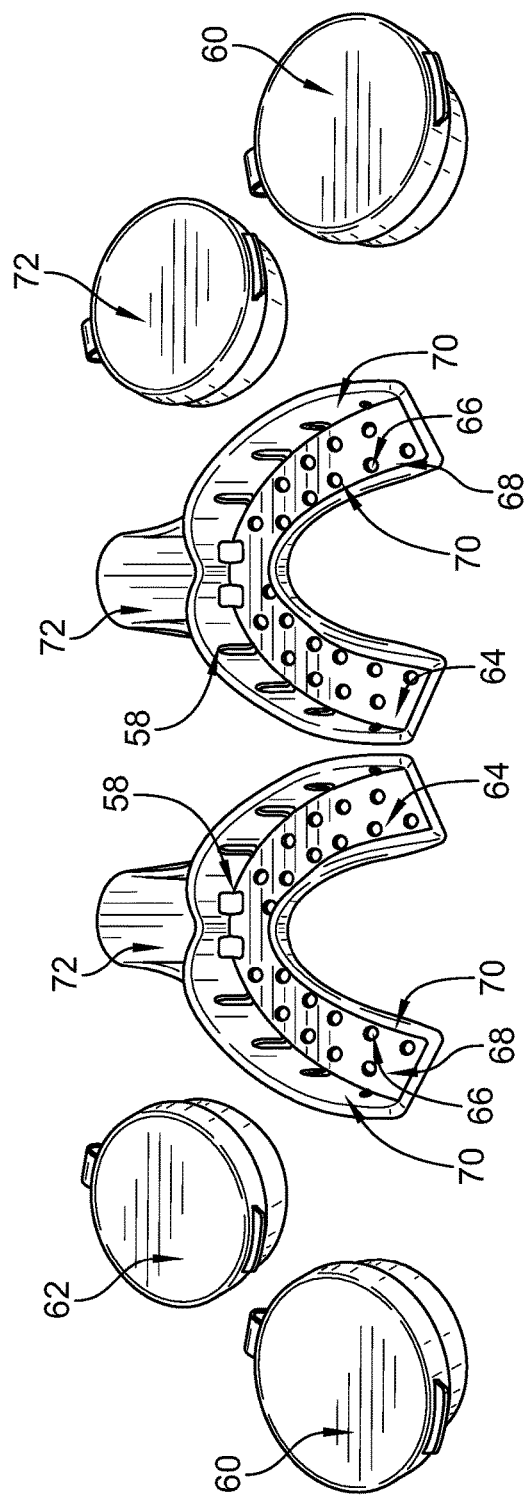
FIG. 7 is a perspective view of part of the dental impression kit including dental trays, base putty containers, and catalyst putty containers.

Referring to FIG. 4, when the instruction manual 54 is removed from the box 12, the top layer 16 of the insert 14 is exposed. The top layer 16 includes the contents of an initial dental assembly 56. Referring to FIG. 7, the initial dental assembly 56 includes two initial dental trays 58, two containers of an initial base putty 60, and two containers of an initial catalyst putty 62. The instruction manual 54 includes initial instructions for administering the initial dental assembly 56. Generally, in use, a container of initial base putty 60 is mixed with a container of initial catalyst putty 62 to form a putty mixture. The putty mixture is then positioned in one of the initial dental trays 58 to form a dental impression of the upper teeth. The second container of initial base putty 60 is then mixed with the second container of initial catalyst putty 62 to form another putty mixture that is positioned in the second initial dental tray 58 to form a dental impression of the lower teeth. This process is explained in more detail below with respect to FIG. 10.

The contents of the box 12 may be stored prior to shipment of the user. For instance, the box 12 and all putty (e.g., the initial base and catalyst putty 60, 62 described above, the redundant base and catalyst putty 61, 63 described below, etc.) may be stored in a temperature controlled environment (e.g., no greater than 77° f., for instance). Additionally the contents of the box 12 may be handled in a clean environment (e.g., on stainless steel work surfaces which are cleaned on a daily basis, in a clean space free of debris, particulates and allergens, putty and other contents only handled with gloves on, etc.). In these embodiments, the contents of the box 12 may have an increased quality. Additionally, each of the contents of the box 12 may include lot numbers for tracking the materials. Such lot numbers may be used for quality control purposes. Following the box 12 being assembled, the box 12 may be shipped out with the contents.

In some embodiments, the box 12 may include a plurality of different dental trays 58. For instance, the box 12 may include small, medium, and large sized dental trays 58. The user may place each of the different sized dental trays 58 in their mouth to determine the proper size (e.g., based on which size best fits the user's teeth). The user may then administer the impression using the proper size dental trays 58. In some embodiments, the box 12 may include upper dental arch specific and lower dental arch specific dental trays 58 of different sizes. For instance, the upper dental arch specific dental trays 58 may be shaped to substantially match the shape of an upper dental arch of a person (e.g., the user). Additionally, the lower dental arch specific dental trays 58 may be shaped to substantially match the shape of a lower dental arch of a person (e.g., the user). Using dental trays more particularly sized and shaped for a user's own personal dental arch may increase the likelihood of an acceptable dental impression.

In some embodiments, the box 12 may only include specific dental trays 58. For instance, the box 12 may include only upper dental arch impression trays 58 or lower dental arch impression trays 58. The box 12 may include upper dental arch impression trays 58 where the user previously submitted dental impressions and had upper dental impressions rejected. The box 12 may include lower dental arch impression trays 58 where the user previously submitted dental impressions and had lower dental impressions rejected. In embodiments such as these, the user may only be required to obtain one of an upper or a lower impression, rather than both upper and lower impressions. Additionally, in embodiments such as these, the user may be provided less base and catalyst putty than standard impression kits (e.g., such as only enough base and catalyst putty for taking one upper or one lower impression, only enough base and catalyst putty for taking two upper or two lower impressions, etc.).

In some embodiments, the user may order a retake kit including, for instance, upper and/or lower impression kits. For instance, the user may call the vendor to order these retake kits when their previous impressions were rejected. Additionally or alternatively, the user may provide log-in information to a website or web page for ordering retake kits. When the user logs onto their account and the user's file indicates that the user had a previously-rejected impression, the corresponding retake kit may automatically be ordered. As one example, the user may have previously had upper impressions rejected, but lower impressions accepted, which is indicated in a file associated with the user's account. The user may log into their account on a website or web page. Upon logging into their account, the upper impression retake kit may automatically be ordered, since the file associated with the user's account indicates that the upper impressions were previously rejected. In some embodiments, the user may log onto the website or web page to order the retake kit following receipt of a kit rejection message. The kit rejection message may be an email (or other message via a communications medium) which indicates that one or more of their impressions were rejected. In some embodiments, the kit rejection message may include a personalized message which indicates why their previous impression was rejected (e.g., didn't bite down properly, the impression moved, etc.). The kit rejection message may include instructions on how to improve their subsequent impression(s) in the retake kit based on their previous rejection (e.g., bite down, keep the impression tray still, etc.). Such embodiments may increase the likelihood of impression acceptance and increase the likelihood of the user returning the contents of the retake impression kit.

In some embodiments, the user may be notified that they are receiving a VIP retake impression kit via express mail, as opposed to standard mail. Additionally, in some embodiments, the VIP retake impression kit may include one or more additional promotional items located therein (e.g., lip balm, tote bag, etc.). In these embodiments, users may be more likely to continue the process and order aligners despite having to retake an impression.

In some embodiments, the retake kit may be free. For instance, where the user previously selected an option to automatically generate aligners upon their impressions being approved by the dental professional (e.g., a fast track option), the retake kit may be free. Such embodiments may further incentivize users to select the fast track option, which may eliminate bottlenecks in the aligner production process. In some embodiments, the retake kit may include a fast track form for opting into the fast track option. For instance, the fast track form may be included in a retake kit where the user has not previously opted into the fast track option. However, where a user previously opted into a fast track option, the fast track form may be foregone. In these embodiments, users may be more likely to opt into the fast track option, thus eliminating further bottlenecks in the aligner production process.

In some embodiments, the dental impression kit 10 and/or the retake kits may include ambassador program information and/or referral information. Such information may include various incentives which are available to the user if the user becomes a brand ambassador or makes any referrals. Such embodiments may highlight the benefits to the user, thus increasing the likelihood of the user promoting the process.

Still referring to FIG. 7, the initial dental trays 58 include a substantially arched mouth insert 64 that is sized and shaped to be inserted into the user's mouth. Particularly, the insert 64 is sized and shaped to be received into either an upper portion or a lower portion of the user's mouth. The insert 64 includes a cavity 66 defined by a bottom wall 68 and a pair of sidewalls 70 extending upward from the bottom wall 68. The cavity 66 is sized to receive the putty mixture. When the initial dental tray 58 is inserted into the user's mouth, the user bites down on the initial dental tray 58 so that the user's teeth are within the cavity 66 and bite into the putty mixture. A flange 72 extends from a front of the initial dental tray 58. The flange 72 is configured to be gripped by the user to insert and remove the initial dental tray 58 from the user's mouth.

In some embodiments, the initial catalyst putty 62 is a polyvinyl siloxane that provides a predetermined period of time to set when mixed with the initial base putty 60. The predetermined period of time is based on a period of time necessary for a user to administer the dental impression kit 10 at home. That is, the predetermined period of time is selected to allow the user enough time to prepare the putty mixture and dental impression, while also preventing the putty mixture from deforming when the initial dental tray 58 having the putty mixture therein is removed from the user's mouth. In some embodiments, the initial base putty 60 and the initial catalyst putty 62 may be required to be at room temperature before mixing.

In some embodiments, the user may be provided a predetermined amount of base and catalyst putty. The user may be provided an amount of base and catalyst putty that lessens the likelihood of the putty mixture overflowing the dental impression. Additionally, the user may be provided an amount of base and catalyst putty that is sufficient for capturing an acceptable dental impression by the user. For instance, the user may be provided an amount of base and catalyst putty that, when the putty mixture is prepared and placed in the dental tray 58, enough putty mixture is in the dental tray 58 to sufficiently capture a dental impression. The predetermined amount of base and catalyst putty may be provided in corresponding cups, as shown. In some embodiments, the predetermined amounts of base and catalyst putty may be in the range of 0.5 oz. to 1.5 oz. In some embodiments, the predetermined amounts of base and catalyst putty may be in the range of 0.88 oz. and 0.90 oz. In some embodiments, the predetermined amount of base putty may be approximately 0.9 oz., and the predetermined amount of catalyst putty may be approximately 0.88 oz. (e.g., more base putty than catalyst putty). In still other embodiments, the predetermined amount of base putty may be approximately 0.88 oz., and the predetermined amount of catalyst putty may be approximately 0.90 oz. (e.g., more catalyst putty than base putty). In still other embodiments, the predetermined amount of base putty may be substantially the same as the predetermined amount of catalyst putty. In each of these embodiments, the corresponding cups may be sealed. For example, the cups may be thermosealed with a plastic film, sealed with a foil and glue, sealed with a cap that is screwed or snapped onto the cup, hermetically sealed, etc.

In some embodiments, the base and catalyst putty may be premixed and loaded in the dental trays provided in a corresponding dental assembly 56, 74. For instance, the putty mixture may be stable (e.g., will not harden prior to administering the dental impressions). The stable putty mixture may be loaded in the dental trays such that the user does not need to mix the base and catalyst putties. The dental trays with the stable putty mixture may be sealed (e.g., in a manner similar to the methods of sealing the cups described above). The user can then remove the seal and administer the dental trays. Such embodiments may ease the user experience by removing the need for mixing the putties and placing the mixed putties into the dental trays. Further, such embodiments may increase the likelihood of acceptance of the impressions as the dental trays and putty mixtures may be more consistent, resulting in more consistent and better quality impressions.

Referring back to FIG. 4, after the initial dental assembly 56 is used to form an initial set of dental impressions of both the upper and lower teeth, the user may grip the top layer 16 by the front cutout 18 and lift the top layer 16 from the box 12. Specifically, the top layer 16 folds back along the fold line 36 to expose the bottom layer 38.

Figure 5:
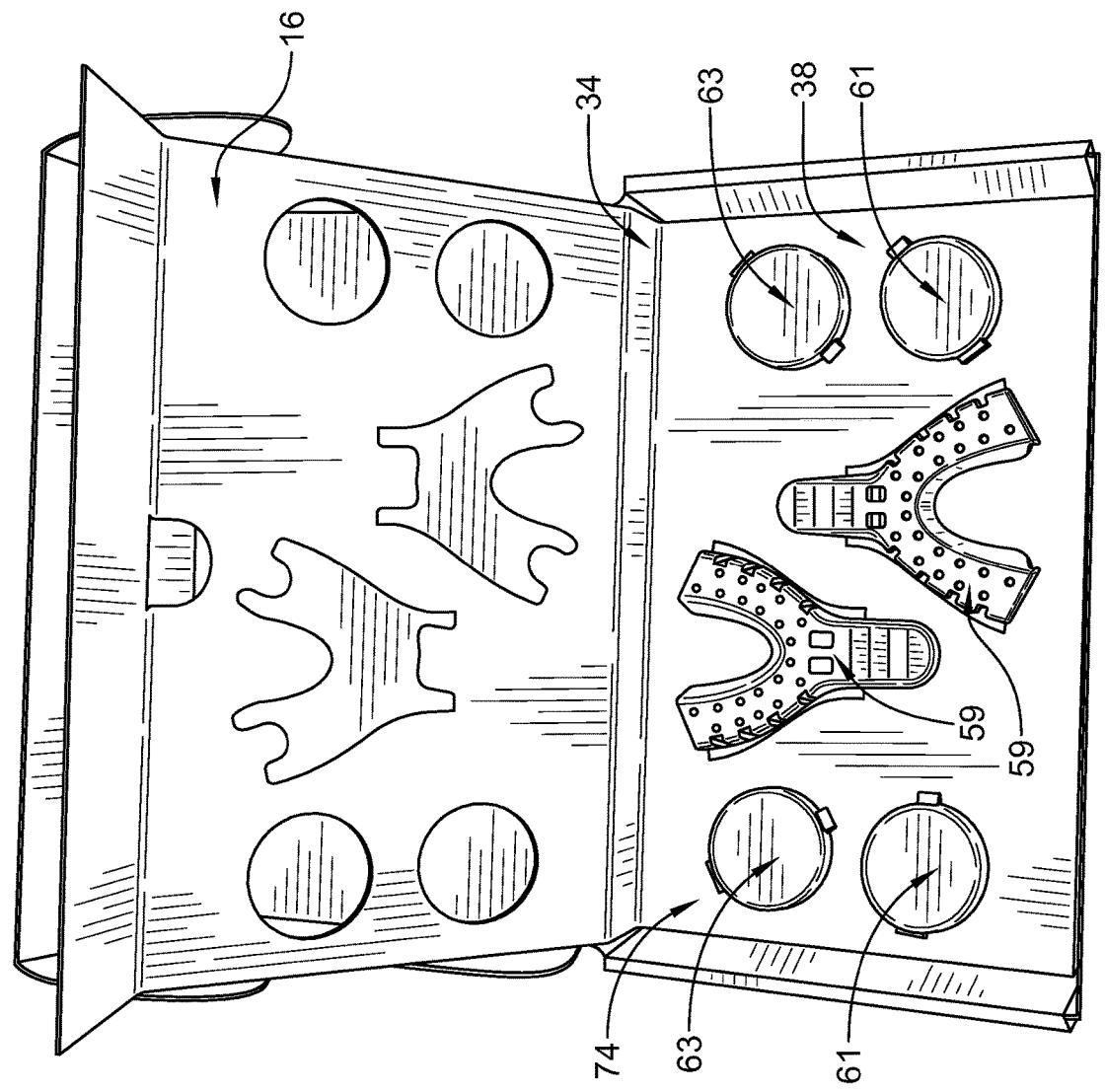
FIG. 5 is a perspective view of a bottom layer of the insert shown in FIG. 2 and having part of the dental impression kit therein.

FIG. 5 shows, the top layer 16 folded back to expose the bottom layer 38. Notably, the top layer 16 is still connected to the bottom layer 38 by the center flap 34; however, the top layer 16 is folded back so that the bottom layer 38 may be accessed. The bottom layer 38 includes a redundant dental assembly 74. The redundant dental assembly 74 is identical to the initial dental assembly 56, described with respect to FIG. 7, and includes two redundant dental trays 59 that are identical to the initial dental trays 58 described with respect to FIG. 7, two containers of a redundant base putty 61 that are identical to the containers of initial base putty 60 described with respect to FIG. 7, and two containers of a redundant catalyst putty 63 that are identical to the containers of initial catalyst putty described with respect to FIG. 7. The instruction manual 54 includes redundant instructions for administering the redundant dental assembly 74. The redundant dental assembly 74 is utilized to form a second set of dental impressions of the upper and lower teeth (as described below). Accordingly, the redundant dental assembly 74 provides redundancy in administering the dental impression kit 10. This redundancy enables the user to "practice" forming the dental impression with the initial dental assembly 56. Alternatively or in addition to, the redundancy provides for two sets of dental impressions if one of the impressions is not properly achieved.

Figure 6:
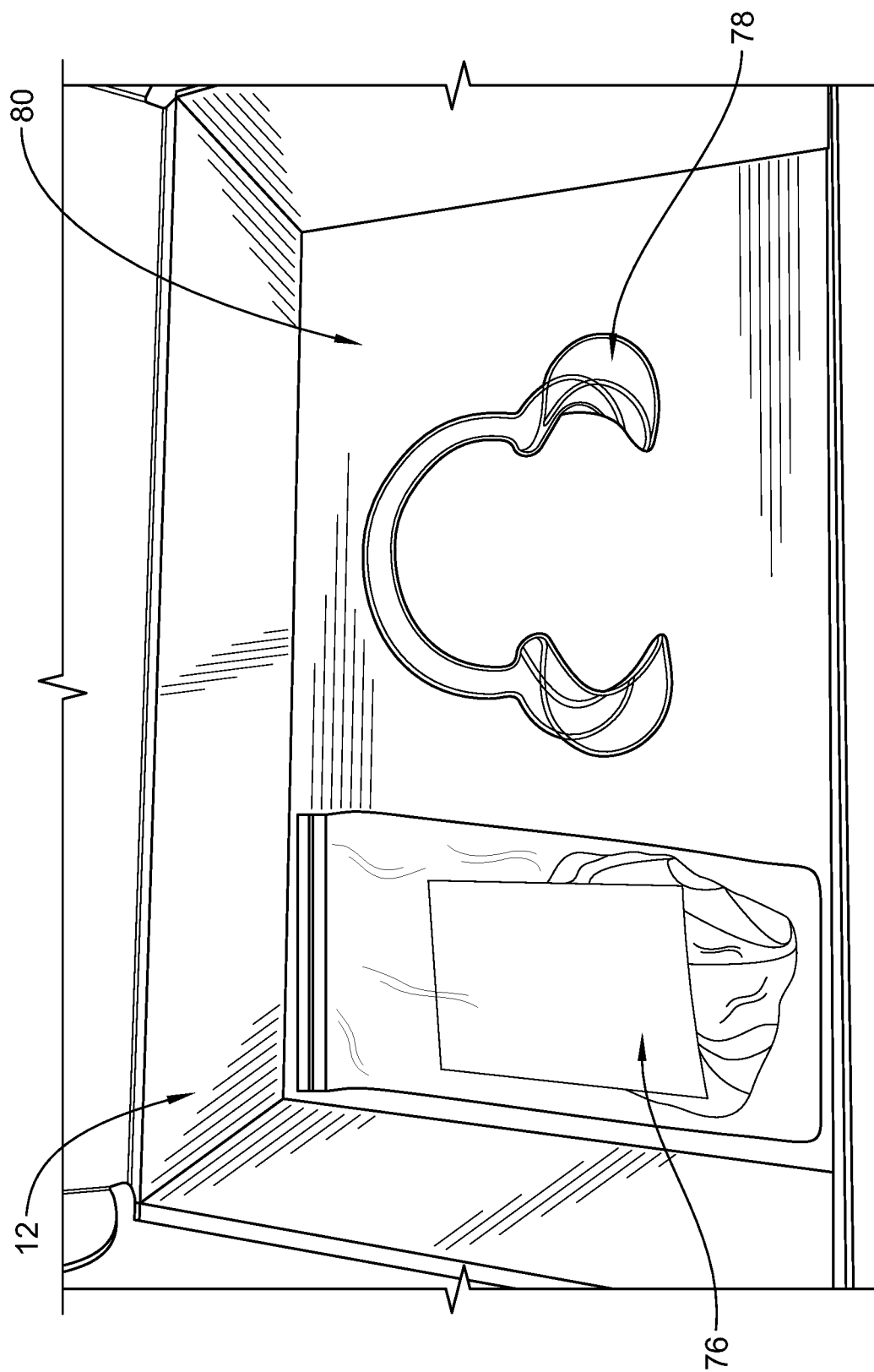
FIG. 6 is a perspective view of a bottom of the container shown in FIG. 1 and having part of the dental impression kit therein.

Referring to FIG. 6, a pair of gloves 76 and a dental appliance 78 are included at a bottom 80 of the box 12. Particularly, the pair of gloves 76 and the dental appliance 78 are positioned below the insert 14. When opening the dental impression kit 10, the user may first remove the instruction manual 54 and the insert 14 to gain access to the pair of gloves 76 and the dental appliance 78. The insert 14 may then be positioned back into the box so that the user may appropriately follow the instructions in the instruction manual 54, as described in more detail below.

Figure 8:
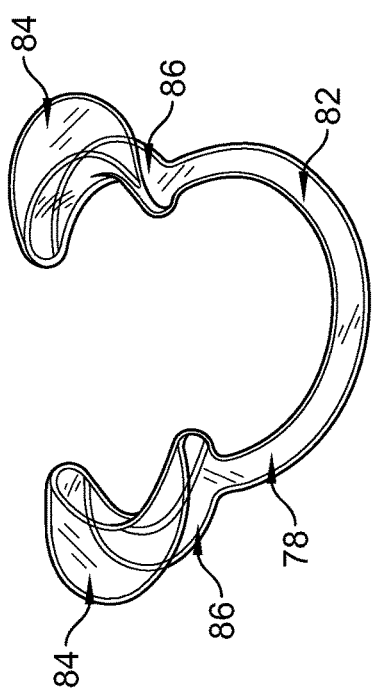
FIG. 8 is a perspective view of a dental appliance that is included in the dental impression kit.

Referring to FIG. 8, the dental appliance 78 includes a handle 82 having a pair of flanges 84 at each end. The flanges 84 are generally U-shaped and form a cavity 86. The instruction manual 54 includes appliance instructions for utilizing the dental appliance 78. The cavity 86 is configured to receive the user's lips at the sides of the user's mouth. The dental appliance 78 is configured to separate the user's lips to open the user's mouth. In this position, the user may photograph his/her teeth, as described in more detail below. In some embodiments, the dental appliance 78 may be positioned in a resealable (or otherwise reusable) bag. The dental appliance 78 may then be maintained by the user for both initial and subsequent photos of his/her teeth. The subsequent photos may be substantially the same types of photos as the initial photos, but are captured a duration (for instance, 90 days) into the treatment process.

Figure 9:
FIG. 9 is a perspective view of gloves that are included in the dental impression kit.

FIG. 9 shows the pair of gloves 76. In some embodiments, the gloves 76 are formed from a non-latex, hypo-allergenic material. The gloves 76 may also be sized and stretchable for any user's hands. The gloves 76 are used to protect the user's hands from the initial base putty 60 and the initial catalyst putty 62. The gloves 76 also prevent contamination of the initial base putty 60 and the initial catalyst putty 62.

Figure 10:
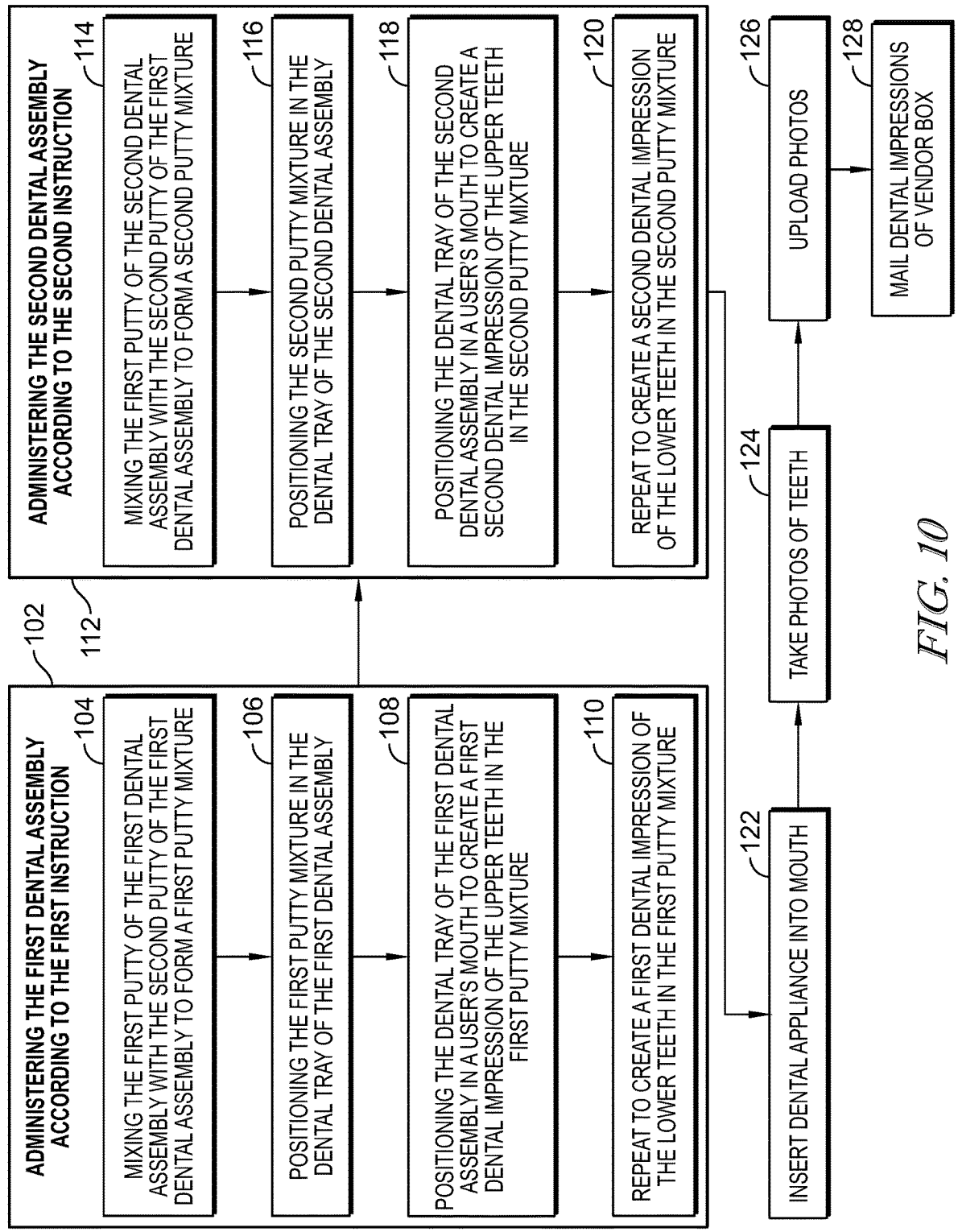
FIG. 10 is a flowchart of a method for administering the dental impression kit shown in FIGS. 1-9.

Referring to FIG. 10, a method 100 for administering the dental impression kit 10 includes receiving from a vendor the dental impression kit 10 in the box 12 in the mail. The box 12 is opened so that the user may obtain the instruction manual 54 for the dental impression kit 10. After removing the instruction manual 54, the entire insert 14 may be removed to expose the gloves 76 and the dental appliance 78. After the gloves 76 and dental appliance 78 are removed from the box 12, the insert 14 is positioned back into the box 12 so that the instruction manual 54 may be properly followed. The user is instructed to wash his/her hands and put the gloves 76 on before proceeding.

With the insert 14 positioned back into the box 12, the top layer 16 is exposed. The initial dental assembly 56 is then administered, at step 102, by following the initial instruction of the instruction manual 54. At step 104, the initial base putty 60 is mixed with the initial catalyst putty 62 to form an initial putty mixture. In some embodiments, the initial base putty 60 and the initial catalyst putty 62 may be referred to in the instruction manual 54 by their colors (as opposed to base and catalyst putty 60, 62). In these embodiments, the instruction manual 54 may be easier to follow by the user. Accordingly, the initial instruction of the instruction manual 54 may instruct the user to mix the purple putty with the gray putty, for instance.

In some embodiments, the initial base putty 60 is mixed with the initial catalyst putty 62 for approximately 20 seconds to form the initial putty mixture. In other embodiments, the initial base putty 60 is mixed with the initial catalyst putty 62 for a time period to reach a proper temperature as required by the putty type and/or environmental conditions. For example, the mixing time may vary based on geographical region or the time of year, e.g. summer or winter, humidity and temperature dependent environment (e.g., both interior temperature and/or exterior temperature). At step 106, the initial putty mixture is then positioned within the cavity 66 of the initial dental tray 58. In some embodiments, the user is instructed to position the initial putty mixture within the cavity 66 of the initial dental tray 58 within a time frame of approximately less than or equal to one minute from the time the initial base putty and 60 the initial catalyst putty 62 are opened. In other embodiments, the initial putty mixture is positioned within the cavity 66 of the initial dental tray 58 within a time period required by the putty type and/or environmental conditions. For example, the time may vary based on geographical region or the time of year, e.g. summer or winter. With the initial putty mixture positioned within the cavity 66 of the initial dental tray 58, the user then inserts the initial dental tray 58 into his/her mouth and bites down so that the user's upper teeth are positioned within the initial putty mixture to form an initial dental impression, at step 108. In some embodiments the initial dental tray 58 is retained within the user's mouth for a time period of approximately 2.5 to 3.5 minutes to create the initial dental impression. In other embodiments, the initial dental tray 58 is retained within the user's mouth for a time period required by the putty type and/or environmental conditions. For example, the time may vary based on geographical region or the time of year, e.g. summer or winter. At step 110, steps 104-108 are repeated using the second initial dental tray 58, the second container of initial base putty 60, and the second container of initial catalyst putty 62 to form an initial dental impression of the user's lower teeth. In some embodiments, the instructions may instruct the user to administer the impression of the user's lower teeth before administering the impression of the user's upper teeth. In these embodiments, likelihood of acceptance of the impressions for generation of aligners may be increased.

After the initial set of dental impressions has been made, the user folds the top layer 16 back to expose the bottom layer 38 and the redundant dental assembly 74. The redundant dental assembly 74 is then administered, at step 112, by following the redundant instruction of the instruction manual 54. At step 114, the redundant base putty 61 is mixed with the redundant catalyst putty 63 to form a redundant putty mixture. In some embodiments, the redundant base putty 61 and the redundant catalyst putty 63 may be referred to in the instruction manual 54 by their colors (as opposed to base and catalyst putty 61, 63). In these embodiments, the instruction manual 54 may be easier to follow by the user. Accordingly, the initial instruction of the instruction manual 54 may instruct the user to mix the purple putty with the gray putty, for instance.

In some embodiments, the redundant base putty 61 is mixed with the redundant catalyst putty 63 for approximately 20 seconds to form the redundant putty mixture. In other embodiments, the redundant base putty 61 is mixed with the redundant catalyst putty 63 for a time period to reach a proper temperature as required by the putty type and/or environmental conditions. For example, the time may vary based on geographical region or the time of year, e.g. summer or winter, humidity and temperature dependent environment (e.g., both interior temperature and/or exterior temperature). The redundant putty mixture is then positioned within the cavity 66 of the redundant dental tray 59, at step 116. In some embodiments, the user is instructed to position the redundant putty mixture within the cavity 66 of the redundant dental tray 59 within a time frame of approximately less than or equal to one minute from the time the redundant base putty 61 the redundant catalyst putty 63 are opened. In other embodiments, the redundant putty mixture is positioned within the cavity 66 of the redundant dental tray 59 within a time period required by the putty type and/or environmental conditions. For example, the time may vary based on geographical region or the time of year, e.g. summer or winter. With the redundant putty mixture positioned within the cavity 66 of the redundant dental tray 59, the user then inserts the redundant dental tray 59 into his/her mouth and bites down so that the user's upper teeth are positioned within the redundant putty mixture to form a redundant dental impression, at step 118. In some embodiments the redundant dental tray 59 is retained within the user's mouth for a time period of approximately 2.5 to 3.5 minutes to create the redundant dental impression. In other embodiments, the redundant dental tray 59 is retained within the user's mouth for a time period required by the putty type and/or environmental conditions. For example, the time may vary based on geographical region or the time of year, e.g. summer or winter. At step 120, steps 114-118 are repeated using the second redundant dental tray 59, the second container of redundant base putty 61, and the second container of redundant catalyst putty 63 to form a redundant dental impression of the user's lower teeth.

After administering the initial dental assembly 56 and the redundant dental assembly 74, the user has created two sets of dental impressions of both his/her upper teeth and his/her lower teeth. The insert 14 may be removed from the box 12 and discarded. The dental appliance 78 is then inserted into the user's mouth to separate the user's lips and expose the user's teeth, at step 122. With the dental appliance 78 in his/her mouth, the user takes a series of photos of his/her teeth in accordance with an appliance instruction in the instruction manual 54, at step 124. These photos may then be uploaded to the vendor's website via a web portal or the like, at step 126. In some embodiments, the user may receive analysis and evaluation results from a dental professional. The dental professional may access the photos via a corresponding web portal in real-time or near real-time to analyze and evaluate the results. The dental professional may evaluate the user's photos to determine whether the user's smile is suitable for treatment, whether the user's photos sufficiently capture the user's smile in the desired perspectives, etc. The dental professional may indicate that the user needs to retake one or more photos. The dental professional may send a message (e.g., a text message, an e-mail, etc.) to the user instructing the user on how to recapture a photo. Following the user uploading the photos, and optionally receiving analysis and evaluation results, the user may then position both sets of dental impressions, i.e. the upper and lower initial dental impressions from the initial dental assembly 56 and the upper and lower redundant dental impressions from the redundant dental assembly 74 into the empty box 12. It should be noted that the dental impressions are not removed from the dental trays 58, 59. That is, the dental trays 58, 59 with the dental impressions therein are positioned in the box 12. The box is then sealed with a sticker included within the dental impression kit 10. At step 128, the box 12 with the dental impressions sealed therein is mailed back to the vendor using a return mailing label that is included in (or affixed to) the dental impression kit 10.

While described as taking photos of the user's teeth following administering the dental assemblies 56 and 74, in some embodiments, the user may take additional photos of the user's teeth and/or of the dental impressions to the vendor's website via a web portal. For instance, the user may take photos of the dental impressions (e.g., of the upper and/or the lower impressions). The user may take these photos between the user administering the initial dental assembly 58 and administering the redundant dental assembly 74. These photos may be detailed photos showing the dental impressions in various views. Similar to the analysis and evaluation described above, a dental professional may access the photos via a corresponding web portal. The dental professional may direct the user to modify one or more aspects of administering dental impressions from the redundant dental assembly 74 based on results from the initial dental impressions as represented in the photos. For instance, the dental professional may direct the user to bite down on the dental trays, ensure that the dental trays are properly aligned both with the user's teeth and with the user's dental arch, etc. Accordingly, such embodiments may increase the likelihood of acceptance of the redundant dental impressions administered by the user based on evaluation of the initial dental impressions from the initial dental assembly 56.

Figure 11:
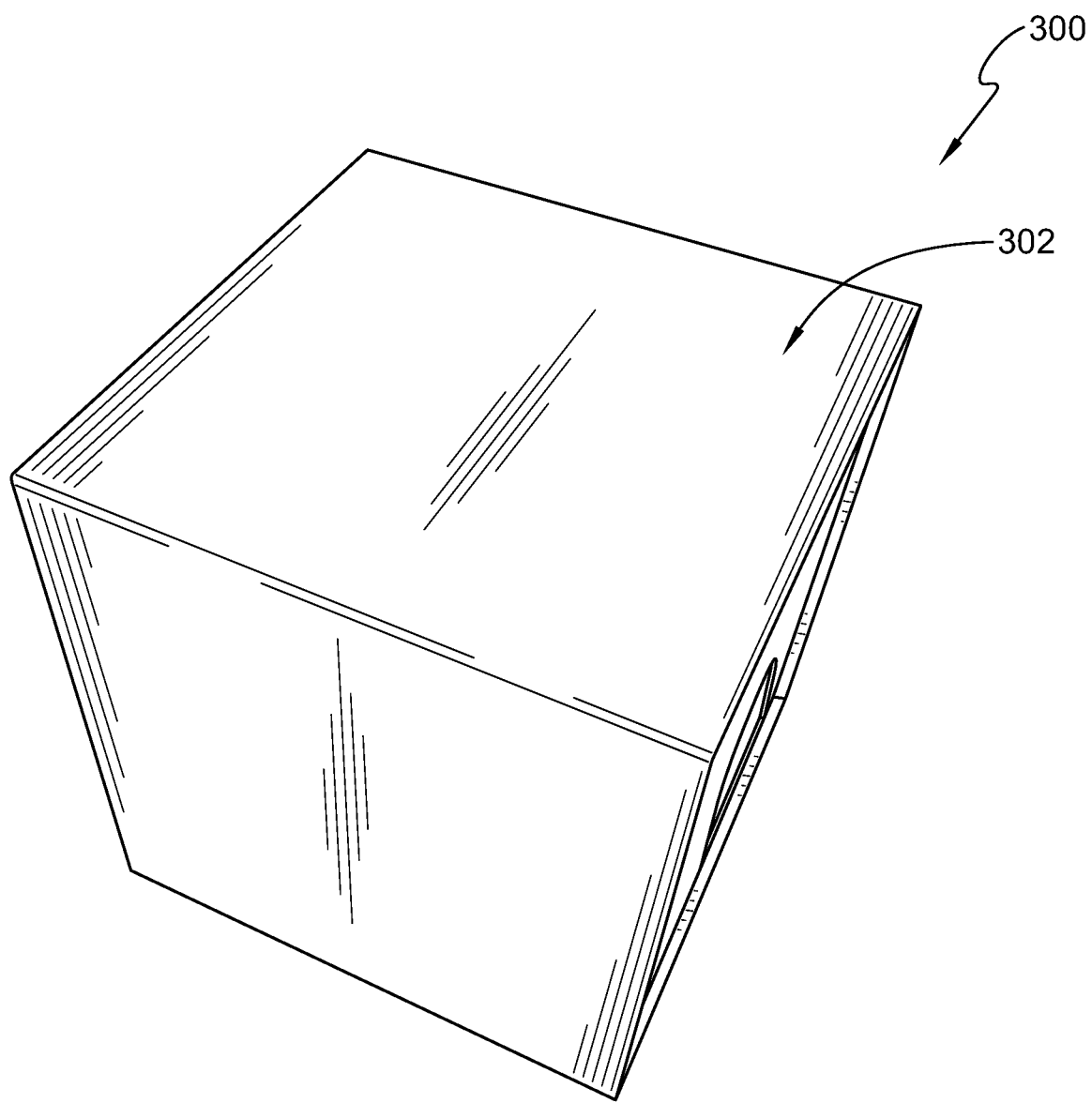
FIG. 11 is a perspective view of another container that contains the contents of a dental impression kit.

Referring to FIG. 11, a dental impression kit 300 is shown having dental assemblies (discussed in more detail below) therein. The dental impression kit 300 may be ordered by a customer and shipped in a container or box 302, shown in FIG. 11, from a vendor. After administering the dental impression kit 300 at home, the customer may ship the dental impression kit 300 in the box 302 back to the vendor for analysis. The box 302 is sized for standard shipping and is likewise sized for delivery into the customer's mailbox. Accordingly, additional fees for shipment of the dental impression kit 300 in the box 302 may not be required.

Figure 12:
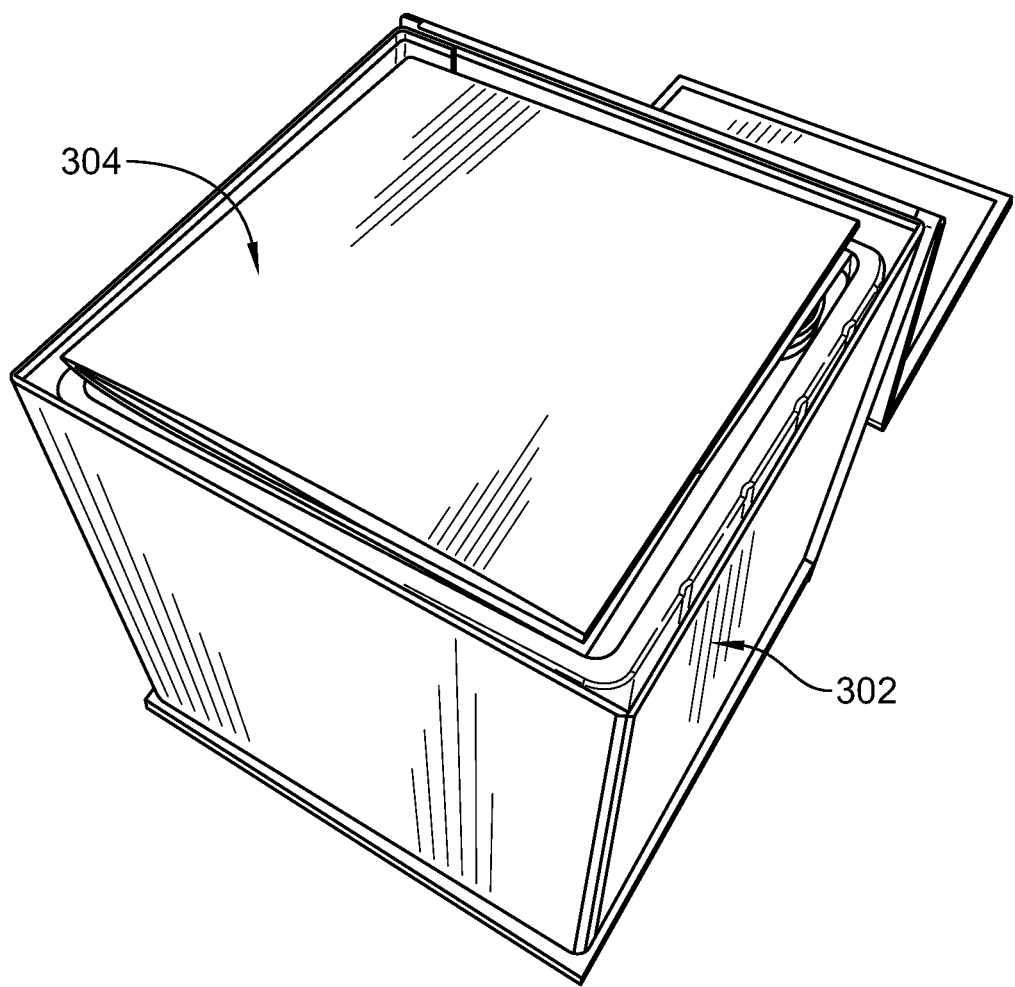
FIG. 12 is a perspective view of the container shown in FIG. 11 opened.
Figure 13:
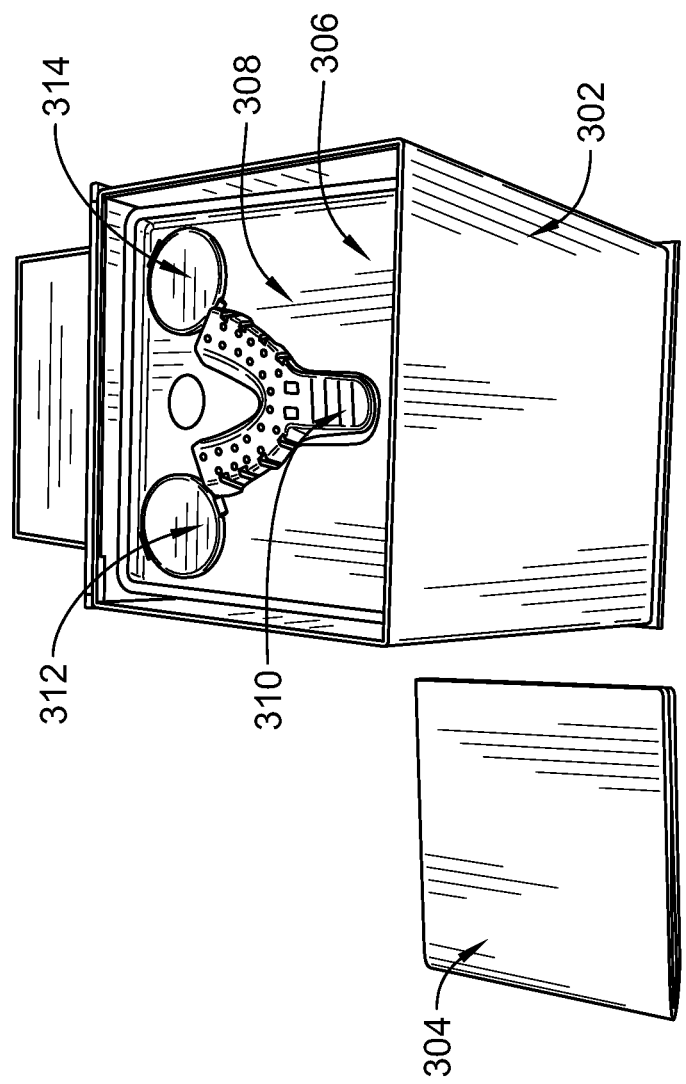
FIG. 13 is a perspective view of an initial dental assembly insert that is positioned within the container shown in FIG. 11.

Referring to FIG. 12, when the box 302 is opened, an instruction manual 304 is positioned at a top of the box contents. The instruction manual 304 provides step-by-step instructions for administering the contents of the dental impression kit 300. Referring to FIG. 13, when the instruction manual 304 is removed from the box 302, an insert 306 is exposed that includes the contents of an upper initial dental assembly 308. The initial upper dental assembly 308 includes an initial upper dental tray 310, a container of an initial upper base putty 312, and a container of an initial upper catalyst putty 314. The instruction manual 304 includes initial instructions for administering the initial upper dental assembly 308. Generally, in use, the initial upper base putty 312 is mixed with the initial upper catalyst putty 314 to form a putty mixture. The putty mixture is then positioned in the initial upper dental tray 310 to form a dental impression of the upper teeth.

Figure 14:
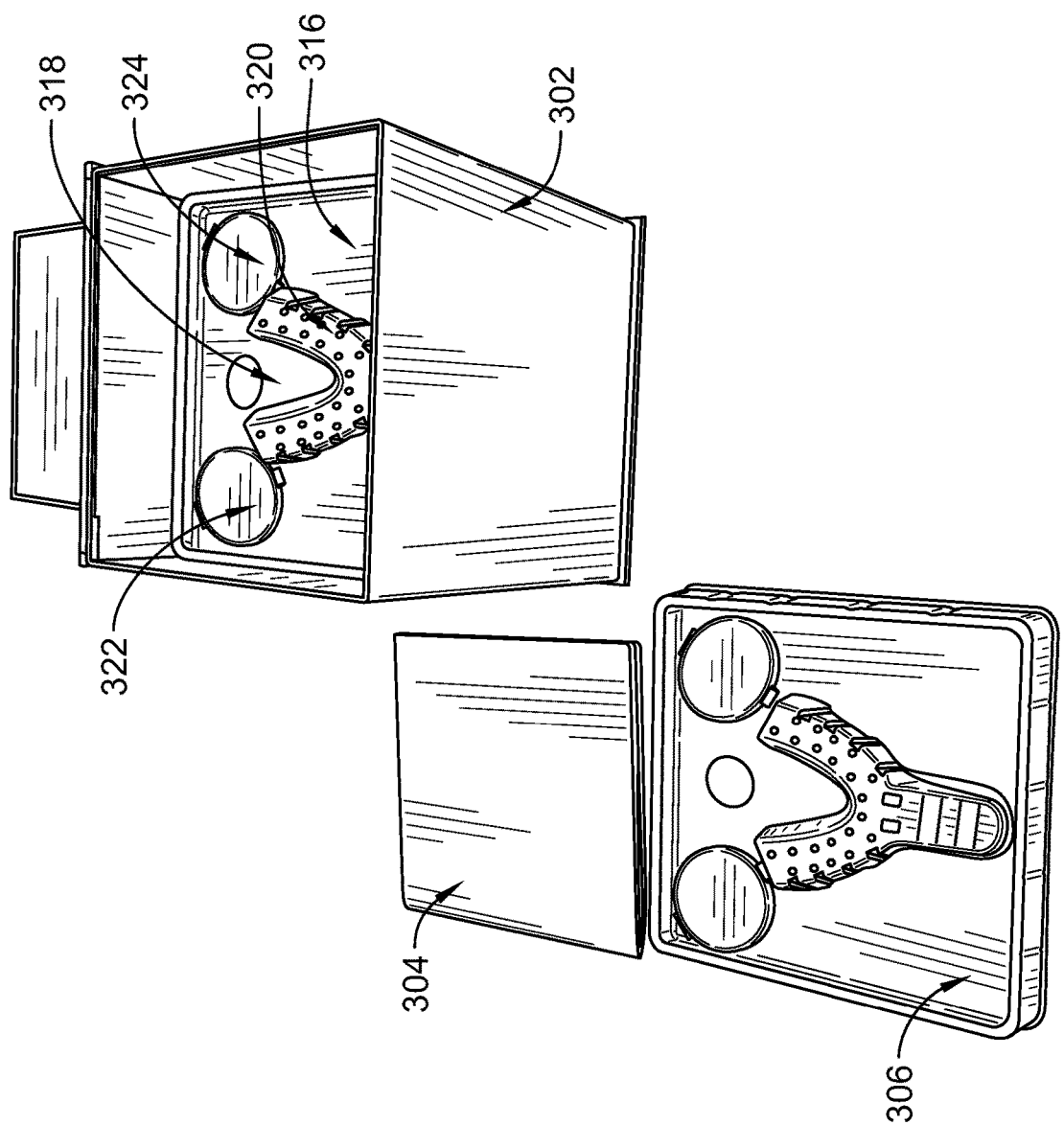
FIG. 14 is a perspective view of another initial dental assembly insert that is positioned within the container shown in FIG. 11.

Referring to FIG. 14, when the insert 306 is removed, another insert 316 is exposed that includes the contents of an initial lower dental assembly 318. The initial lower dental assembly 318 includes an initial lower dental tray 320, a container of an initial lower base putty 322, and a container of an initial lower catalyst putty 324. The instruction manual 304 includes initial instructions for administering the initial lower dental assembly 318. Generally, in use, the initial lower base putty 322 is mixed with the initial lower catalyst putty 324 to form a putty mixture. The putty mixture is then positioned in the initial lower dental tray 320 to form a dental impression of the lower teeth.

Figure 15:
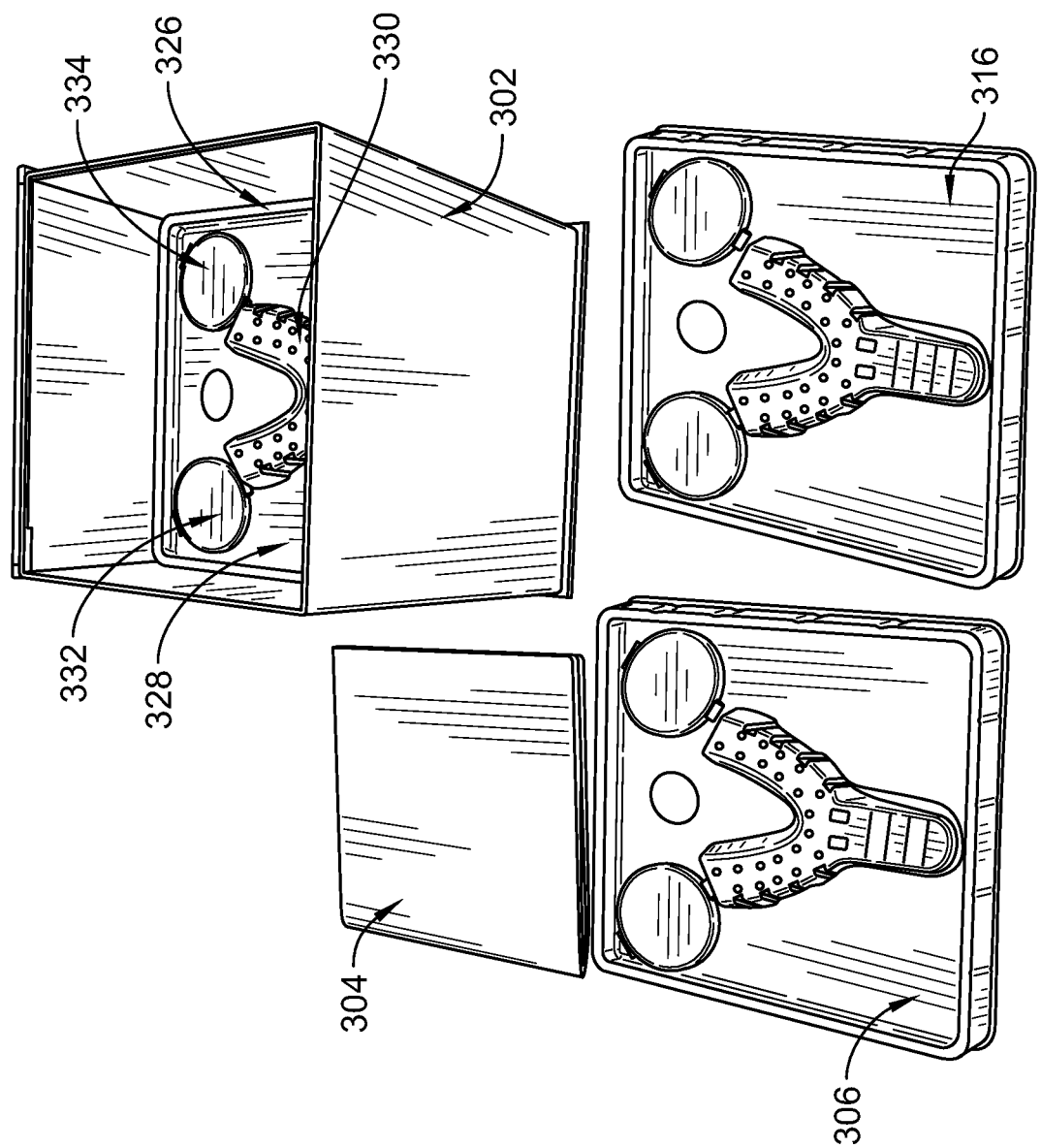
FIG. 15 is a perspective view of a redundant dental assembly insert that is positioned within the container shown in FIG. 11.

Referring to FIG. 15, when the insert 316 is removed from the box 302, an insert 326 is exposed that includes the contents of a redundant upper dental assembly 328. The redundant upper dental assembly 328 includes a redundant upper dental tray 330, a container of a redundant upper base putty 332, and a container of a redundant upper catalyst putty 334. The instruction manual 304 includes redundant instructions for administering the redundant upper dental assembly 328. Generally, in use, the redundant upper base putty 332 is mixed with the redundant upper catalyst putty 334 to form a putty mixture. The putty mixture is then positioned in the redundant upper dental tray 330 to form a dental impression of the upper teeth.

Figure 16:
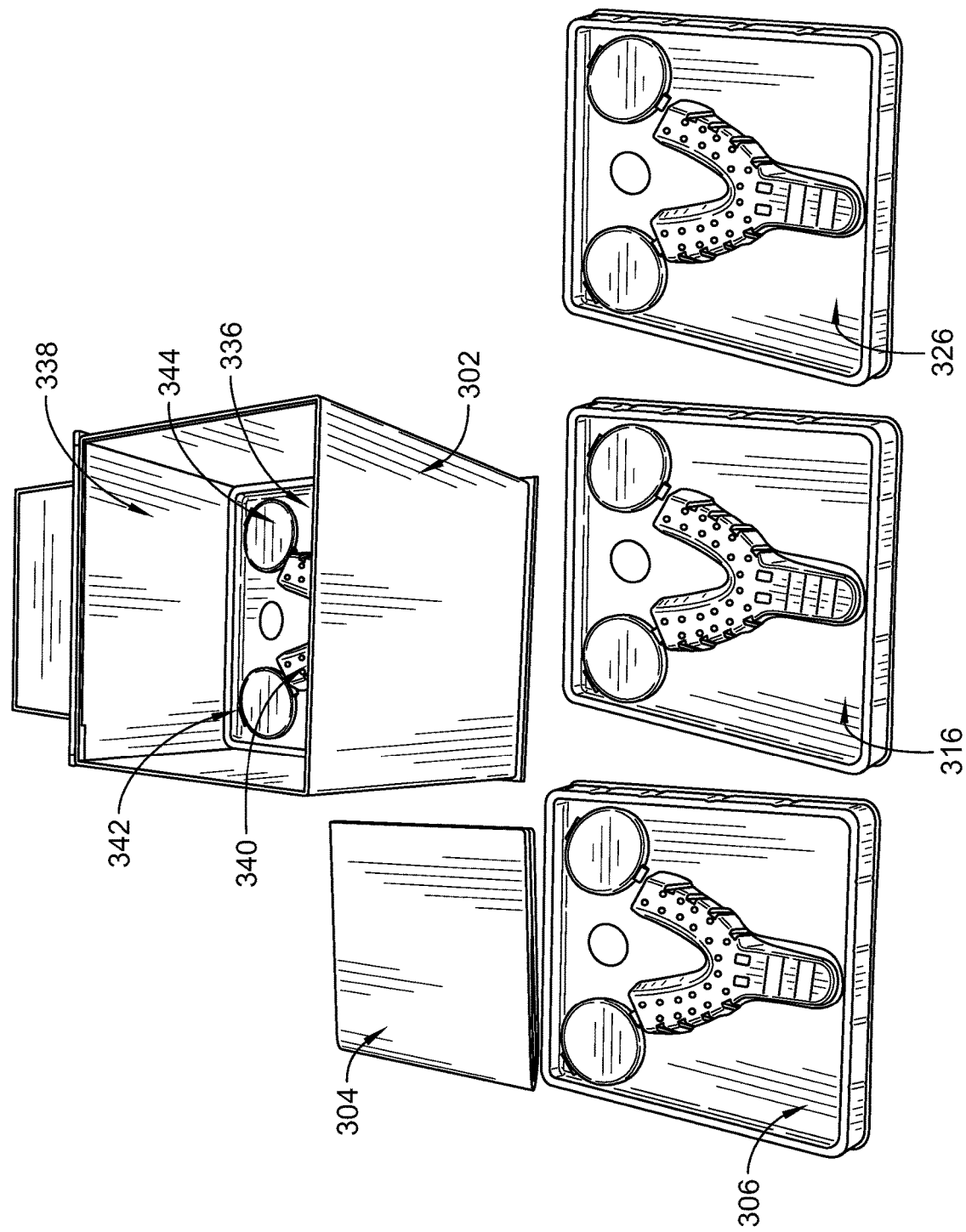
FIG. 16 is a perspective view of another redundant dental assembly insert that is positioned within the container shown in FIG. 11.

Referring to FIG. 16, when the insert 326 is removed, another insert 336 is exposed that includes the contents of a redundant lower dental assembly 338. The redundant lower dental assembly 338 includes a redundant lower dental tray 340, a container of a redundant lower base putty 342, and a container of a redundant lower catalyst putty 344. The instruction manual 304 includes redundant instructions for administering the redundant lower dental assembly 338. Generally, in use, the redundant lower base putty 342 is mixed with the redundant lower catalyst putty 344 to form a putty mixture. The putty mixture is then positioned in the redundant lower dental tray 340 to form a dental impression of the lower teeth.

Figure 17:
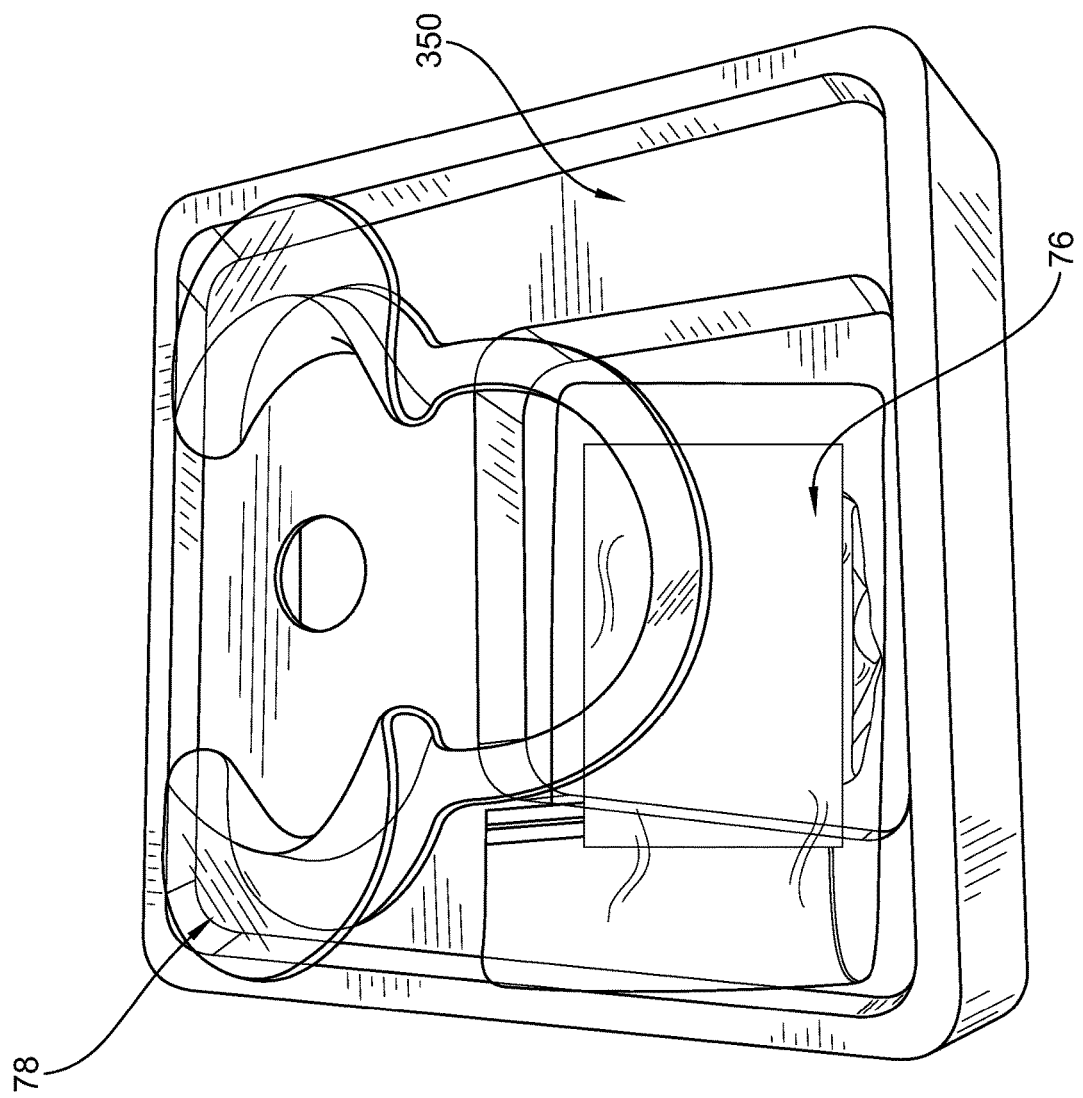
FIG. 17 is a perspective view of a dental appliance insert that is positioned within the container shown in FIG. 11.

Referring to FIG. 17, another insert 350 includes a pair of gloves 76 and a dental appliance 78. The insert 350 is positioned below the insert 336. When opening the dental impression kit 10, the user may first remove the instruction manual 54 and the inserts 306, 316, 326, and 336 to gain access to the pair of gloves 76 and the dental appliance 78. The inserts 306, 316, 326, and 336 may then be positioned back into the box so that the user may appropriately follow the instructions in the instruction manual 54, as described in more detail below.

Figure 18:
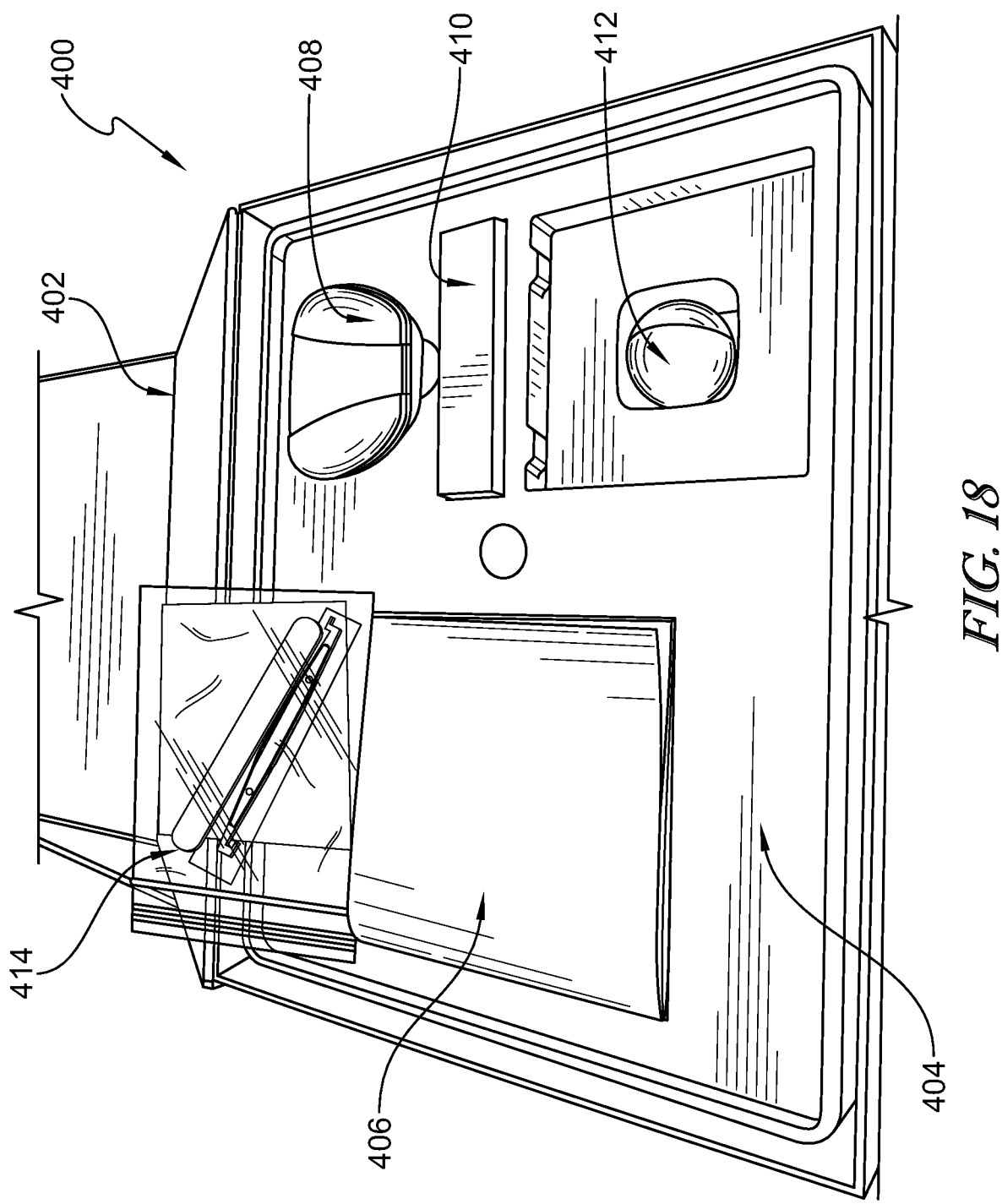
FIG. 18 is a perspective view of a dental aligner kit having a top insert.

Referring to FIG. 18, an alignment kit 400 is mailed to the user after the user specific aligners have been created by the vendor. The alignment kit 400 includes a container 402 having a top insert 404. The top insert 404 includes an instruction manual 406 that provides instructions for administering the alignment kit 400. The top insert 404 also includes a case 408 for retaining aligners (described below), a case of tooth whitening 410 to be used with the aligners, and lip balm 412. A tool kit 414 is also provided in the top insert 404.

Figure 19:
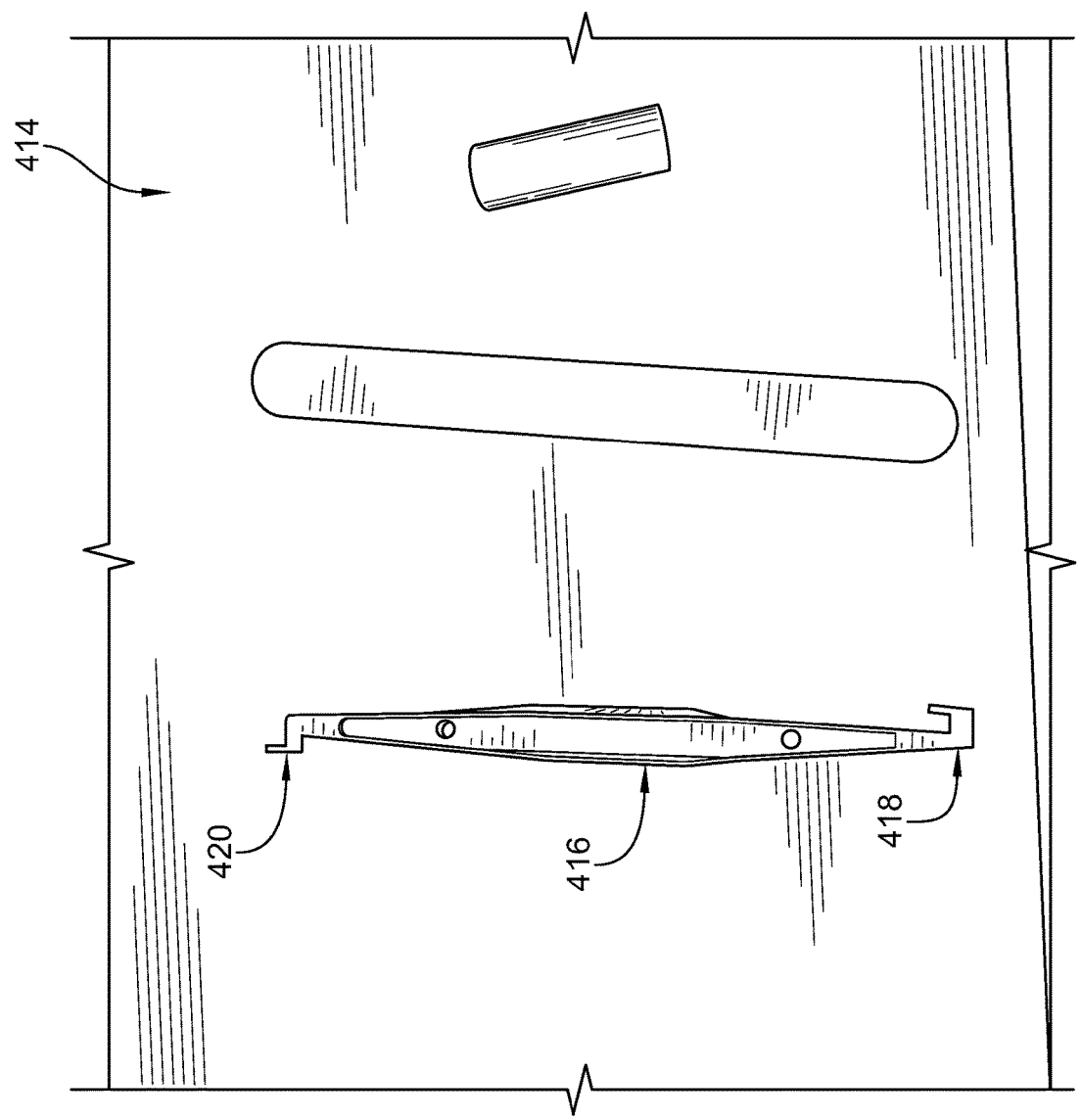
FIG. 19 is a plan view of a dental tool kit of the dental aligner kit shown in FIG. 18.

Referring to FIG. 19, the tool kit 414 includes an extractor 416 for removing aligners from the user's mouth. The extractor 416 includes a first hook 418 for pulling upper aligners off of the user's upper teeth. A second hook 420 pushes lower aligners off the user's lower teeth. The tool kit 414 also includes a file 422 for smoothing out edges of the aligners for the user's comfort. At least one rubber pellet 424 is also provided for aiding the insertion of the aligners. When the user positions the aligner's in his/her mouth, the user may chew on the rubber pellets 424 to push the aligners into position on the user's upper and lower teeth.

Figure 20:
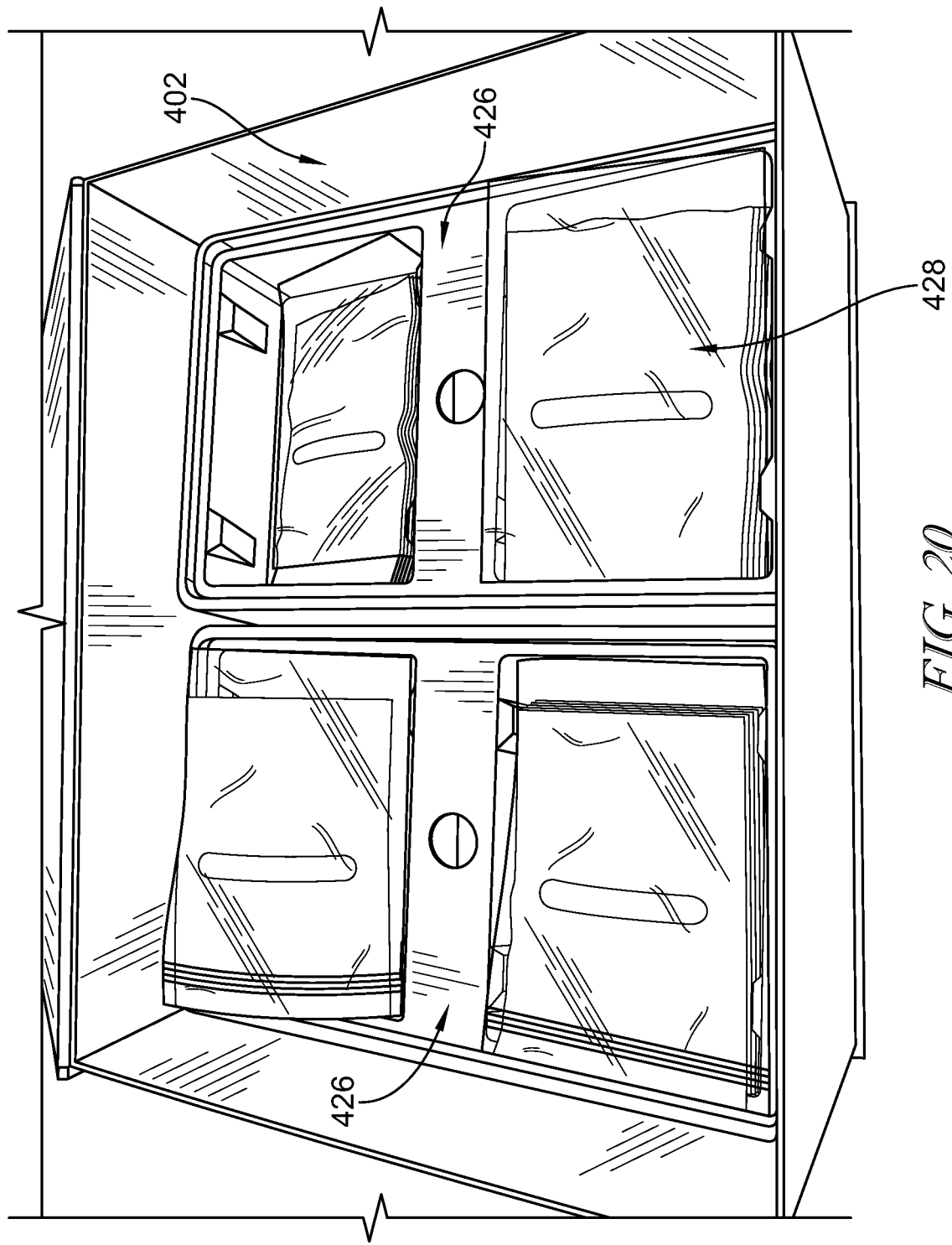
FIG. 20 is a perspective view of first lower inserts of the dental aligner kit shown in FIG. 18.
Figure 21:
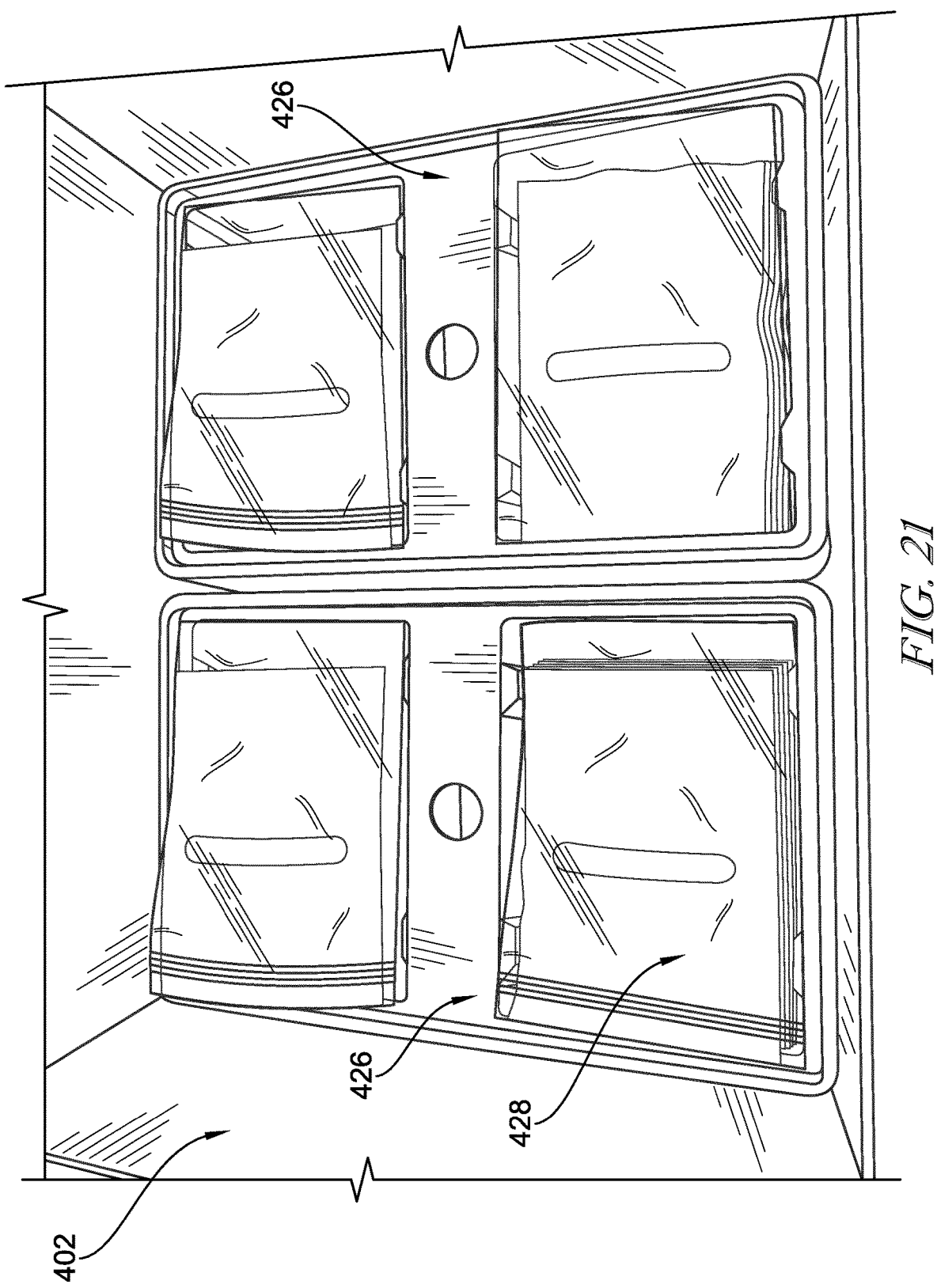
FIG. 21 is a perspective view of second lower inserts of the dental aligner kit shown in FIG. 18.

Referring to FIG. 20, when the top insert 404 is removed from the container 402, at least two lower inserts 426 are exposed. The lower inserts 426 include the aligners 428 that will be inserted in the user's mouth. Referring to FIG. 21, the additional lower inserts 426 may be positioned below the first layer of lower inserts 426.

Figure 22:
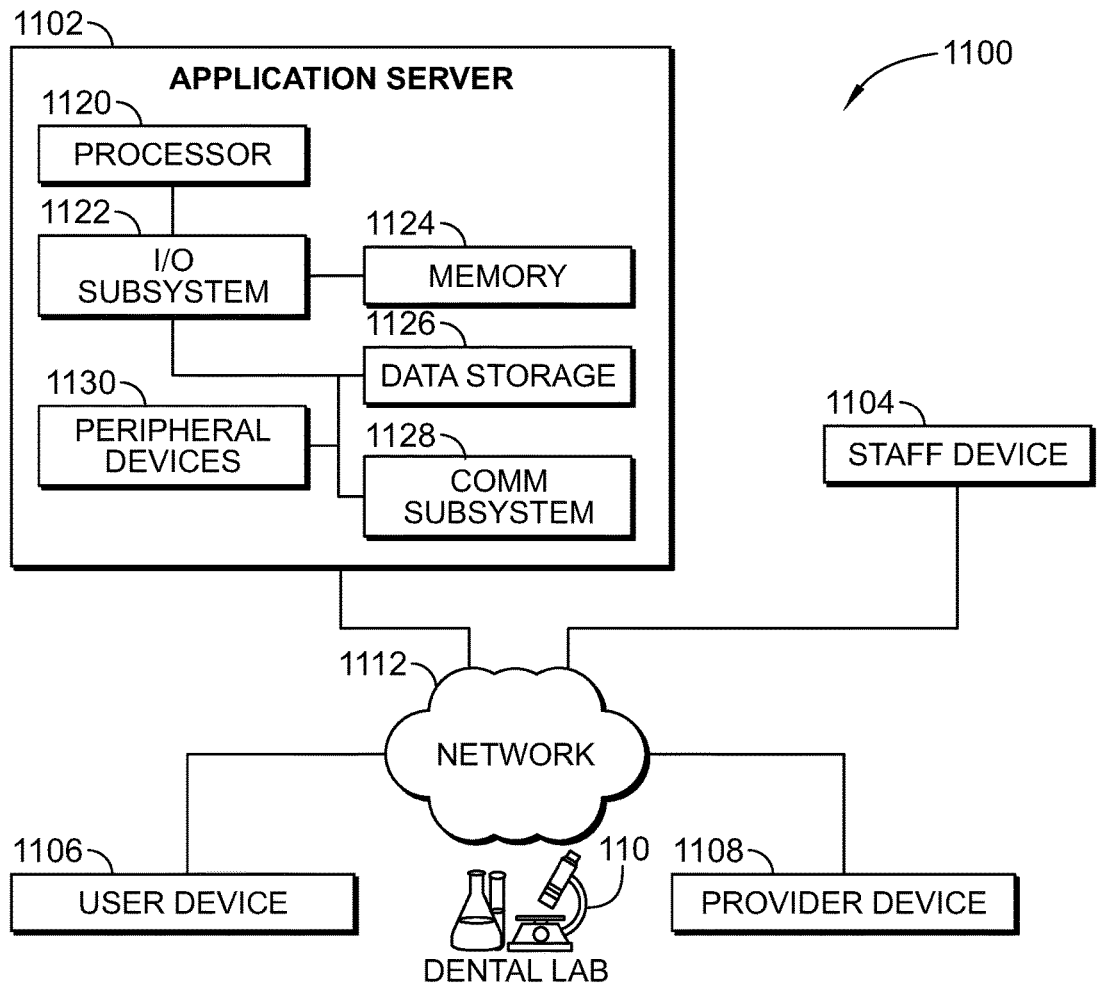
FIG. 22 is a simplified block diagram of at least one embodiment of a system for remote orthodontic treatment and assessment.

Referring now to FIG. 22, in an illustrative embodiment, a system 1100 for remote orthodontic assessment and treatment includes an application server 1102 in communication over a network 1112 with multiple other computing devices, such as one or more staff devices 1104, user devices 1106, provider devices 1108, and/or dental labs 1110. In use, as described further below, the application server 1102 allows a user (using a user device 1106) to order a dental impression kit 10, as described above, and then upload images of the user's mouth and teeth to the application server 1102. The application server 1102 allows a staff professional/hygienist to review and approve the images using the staff device 1104, and then allows a provider (e.g., an orthodontist) to perform a photo assessment using the provider device 1108. After the photo assessment is approved, the application server 1102 receives a 3D treatment plan from the dental lab 1110, and the application server 1102 allows the provider to approve the treatment plan using the provider device 1108. After approval, the application server 1102 allows the user to view the 3D treatment plan using the user device 1106. The application server 1102 optimizes the 3D treatment plan for viewing on the user device 1106. Thus, the system 1100 may allow for remote orthodontic treatment and assessment, without requiring the user to visit the provider's physical offices. Accordingly, the system 1100 may improve the cost and/or availability of orthodontic services. Additionally, by optimizing the 3D treatment plan, the system 1100 provides an improved user experience for viewing treatment plans without the aid of an orthodontist.

The application server 1102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As such, the application server 1102 may be embodied as a single server computing device or a collection of servers and associated devices. For example, in some embodiments, the application server 1102 may be embodied as a "virtual server" formed from multiple computing devices distributed across the network 1112 and operating in a public or private cloud. Accordingly, although the application server 1102 is illustrated in FIG. 1 and described below as embodied as a single server computing device, it should be appreciated that the application server 1102 may be embodied as multiple devices cooperating together to facilitate the functionality described below. As shown in FIG. 1, the application server 1102 illustratively include a processor 1120, an input/output subsystem 1122, a memory 1124, a data storage device 1126, and a communication subsystem 1128, and/or other components and devices commonly found in a server computer or similar computing device. Of course, the application server 1102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 1124, or portions thereof, may be incorporated in the processor 1120 in some embodiments.

The processor 1120 may be embodied as any type of processor capable of performing the functions described herein. The processor 1120 may be embodied as a single or multi-core processor(s), digital signal processor, microcontroller, or other processor or processing/controlling circuit. Similarly, the memory 1124 may be embodied as any type of volatile or non-volatile memory or data storage capable of performing the functions described herein. In operation, the memory 1124 may store various data and software used during operation of the application server 1102, such as operating systems, applications, programs, libraries, and drivers. The memory 1124 is communicatively coupled to the processor 1120 via the I/O subsystem 1122, which may be embodied as circuitry and/or components to facilitate input/output operations with the processor 1120, the memory 1124, and other components of the application server 1102. For example, the I/O subsystem 1122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 1122 may form a portion of a system-on-a-chip (SoC) and be incorporated, along with the processor 1120, the memory 1124, and other components of the application server 1102, on a single integrated circuit chip.

The data storage device 1126 may be embodied as any type of device or devices configured for short-term or long-term storage of data such as, for example, memory devices and circuits, memory cards, hard disk drives, solid-state drives, or other data storage devices. The communication subsystem 1128 of the application server 1102 may be embodied as any communication circuit, device, or collection thereof, capable of enabling communications between the application server 1102 and other remote devices over a network. The communication subsystem 1128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the application server 1102 may also include one or more peripheral devices 1130. The peripheral devices 1130 may include any number of additional input/output devices, interface devices, and/or other peripheral devices. For example, in some embodiments, the peripheral devices 1130 may include a display, touch screen, graphics circuitry, keyboard, mouse, speaker system, microphone, network interface, and/or other input/output devices, interface devices, and/or peripheral devices.

As described further below, the staff device 1104 is configured to upload, review, and otherwise manage data stored by the application server 1102. The staff device 1104 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the staff device 1104 may include a processor, an I/O subsystem, a memory, a data storage device, communication circuitry, and/or other components and devices commonly found in a notebook computer or similar computing device. The individual components of the staff device 1104 may be similar to the corresponding components of the application server 1102, the description of which is applicable to the corresponding components of the staff device 1104 and is not repeated herein so as not to obscure the present disclosure.

As described further below, the user device 1106 is configured to allow a user to send and receive images, questionnaire responses, and other data with the application server 1102. The user device 1106 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the user device 1106 may include a processor, an I/O subsystem, a memory, a data storage device, communication circuitry, and/or other components and devices commonly found in a smartphone or similar computing device. The individual components of the user device 1106 may be similar to the corresponding components of the application server 1102, the description of which is applicable to the corresponding components of the user device 1106 and is not repeated herein so as not to obscure the present disclosure.

As described further below, the provider device 1108 is configured to allow a provider to review image assessments and treatment plans and to otherwise access the application server 1102. The provider device 1108 may be embodied as any type of device capable of performing the functions described herein, such as, without limitation, a smartphone, a cellular phone, a tablet computer, a notebook computer, a laptop computer, a desktop computer, a consumer electronic device, a wearable computing device, a smart appliance, and/or any other computing device capable of performing the functions described herein. Accordingly, the provider device 1108 may include a processor, an I/O subsystem, a memory, a data storage device, communication circuitry, and/or other components and devices commonly found in a notebook computer or similar computing device. The individual components of the provider device 1108 may be similar to the corresponding components of the application server 1102, the description of which is applicable to the corresponding components of the provider device 1108 and is not repeated herein so as not to obscure the present disclosure.

The dental lab 1110 may be embodied as any dental analysis and/or manufacturing facility that is capable of generating orthodontic treatment plans or otherwise performing the functions described herein. In particular, the dental lab 1110 may include or otherwise have access to one or more computing devices capable of executing software to generate orthodontic treatment plans.

As discussed in more detail below, the application server 1102, the staff device 1104, the user device 1106, and the provider device 1108 may be configured to transmit and receive data with each other and/or other devices of the system 1100 over the network 1112. The network 1112 may be embodied as any number of various wired and/or wireless networks. For example, the network 1112 may be embodied as, or otherwise include, a wired or wireless local area network (LAN), and/or a wired or wireless wide area network (WAN). As such, the network 1112 may include any number of additional devices, such as additional computers, routers, and switches, to facilitate communications among the devices of the system 1100. In the illustrative embodiment, the network 1112 is embodied as a local Ethernet network.

Figure 23:
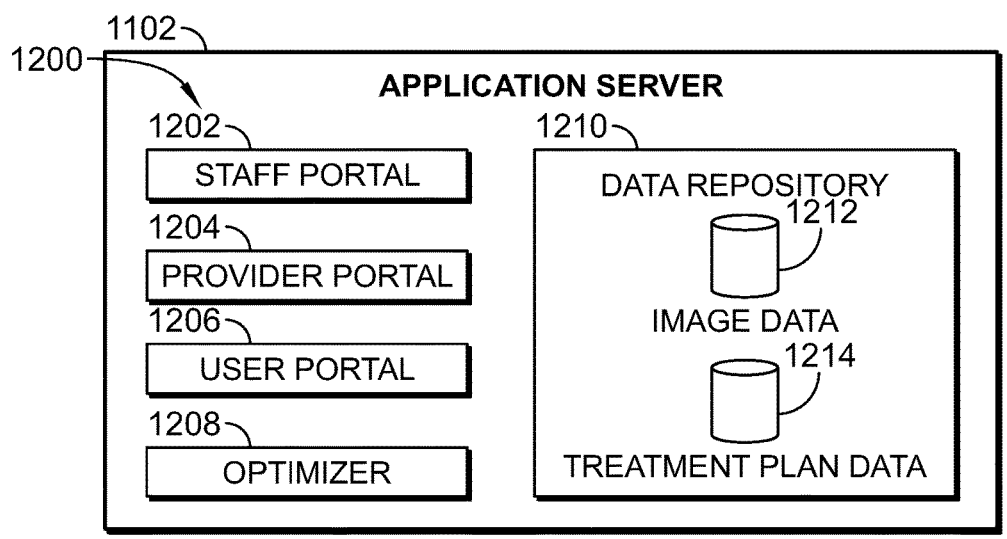
FIG. 23 is a simplified block diagram of at least one embodiment of an environment that may be established by an application server of FIG. 22.

Referring now to FIG. 23, in an illustrative embodiment, the application server 1102 establishes an environment 1200 during operation. The illustrative environment 1200 includes a staff portal 1202, a provider portal 1204, a user portal 1206, an optimizer 1208, and a data repository 1210. The various components of the environment 1200 may be embodied as hardware, firmware, software, or a combination thereof. As such, in some embodiments, one or more of the components of the environment 1200 may be embodied as circuitry or collection of electrical devices (e.g., staff portal circuitry 1202, provider portal circuitry 1204, user portal circuitry 1206, optimizer circuitry 1208, and/or data repository circuitry 1210). It should be appreciated that, in such embodiments, one or more of the staff portal circuitry 1202, the provider portal circuitry 1204, the user portal circuitry 1206, the optimizer circuitry 1208, and/or the data repository circuitry 1210 may form a portion of one or more of the processor 1120, the I/O subsystem 1122, and/or other components of the application server 1102. Additionally, in some embodiments, one or more of the illustrative components may form a portion of another component and/or one or more of the illustrative components may be independent of one another.

The data repository 1210 is configured to manage and store case data related to each user. The data repository 1210 may be configured to receive multiple images that represent the teeth of a user. The data repository 1210 may be further configured to receive a treatment plan for the user. The treatment plan may include a sequence of three-dimensional models indicative of the teeth of the user. Thus, the data repository 1210 may store, among other data, image data 1212 and/or treatment plan data 1214.

The staff portal 1202 is configured to manage data access and other communications with the staff devices 1104. In particular, the staff portal 1202 may be configured to provide the images that represent the teeth of the user to a staff device 1104. The staff portal 1202 is further configured to receive an approval from the staff device 1104 indicating that a person (e.g., a staff professional person and/or hygienist) has approved the images for assessment by a provider (e.g., an orthodontist).

The provider portal 1204 is configured to manage data access and other communications with the provider devices 1108. In particular, the provider portal 1204 may be configured to provide the images to a provider device 1108 in response receiving the approval from the staff device 1104. The provider portal 1204 may be further configured to receive an approval from the provider device 1108 indicating that the provider successfully performed an assessment of the fitness of the user for treatment. A treatment plan may be received in response to that approval, and the provider portal 1204 may be further configured to provide the treatment plan to the provider device 1108 and to receive an approval from the provider device 1108 indicating that the provider approved the treatment plan.

In some embodiments, the user may be provided history and consent forms. The history and consent forms may be forms which a user provides various information for use in generation of the user's aligners and/or for determination in the fitness for treatment. For instance, the user may be provided with a series of questions that illicit information related to various health and dental information, such as previous dental treatments, health conditions, etc. Additionally, the user may be provided a consent form where the user consents to treatment. In some embodiments, the history and consent forms may be provided to the user upon ordering the impression kit 10. The history and consent forms may be provided electronically. In some embodiments, the history and consent forms may be provided a duration after the user orders the kit 10. For instance, the history and consent forms may be provided a day after the user orders the kit 10. In these embodiments, the user may be less intimidated by the history and consent forms by providing them at a later date rather than the date of the order.

The user portal 1206 is configured to manage data access and other communications with the user devices 1106. In particular, the user portal 1206 may be configured to receive the images indicative of the teeth of the user from a user device 1106. For instance, the user may be required to provide images when the user orders a dental impression kit 10 (as opposed to an oral scan center). For instance, the user may be required to provide a number of images (e.g., three images, five images, seven images, etc.). In some embodiments, the images may include an upper, open view image, a lower, open view image, and a straight-on, closed view image. The user portal 1206 may be further configured to receive a dental history questionnaire response from the user device 1106. The dental history questionnaire response may be included with the images to the staff device 1104 and/or to the provider device 1108. The user portal 1206 is further configured to provide a visualization of the treatment plan to the user device 1106 in response to receiving approval of the treatment plan from the provider device 1108.

The optimizer 1208 is configured to optimize the sequence of three-dimensional models to generate an optimized sequence of three-dimensional models. The visualization of the treatment plan may use the optimized sequence of three-dimensional models. The optimizer 1208 may increase the speed, rendering, and/or quality of the visualization of the treatment plan.

Referring now to FIGS. 23A and 23B, in use, the application server 1102 may execute a method 1300 for remote orthodontic treatment and assessment. It should be appreciated that, in some embodiments, the operations of the method 1300 may be performed by one or more components of the environment 1200 of the application server 1102 as shown in FIG. 23. The method 1300 begins in block 1302, in which the application server 1102 receives a smile assessment response from a user device 1106. The smile assessment response may be embodied as a web form, electronic message, or other data submitted by the user device 1106 that is indicative of whether the user is a potential candidate for orthodontic treatment. For example, the smile assessment response may include answers to questions indicating the current condition of the user's mouth and the user's chief complaint (i.e., the user's biggest concern with his or her smile). The smile assessment response may be submitted in response to a web form or other web page that includes appropriate questions and instructions. One potential embodiment of a smile assessment web page is described below in connection with FIG. 26. After receiving the smile assessment response, in block 1304 the application server 1102 determines whether the user is a potential candidate for orthodontic treatment based on the smile assessment response. If the application server 1102 determines that the user is not a good candidate, the method 1300 loops back to block 1302, in which the application server 1102 may receive additional smile assessment responses from the same user device 1106 and/or other user devices 1106. If the application server 1102 determines that the user is a good candidate, the method 1300 advances to block 1306.

In block 1306, the application server 1102 determines an appropriate intake technique for the user. In the illustrative embodiment, potential intake techniques include performing a three-dimensional (3D) scan of the user's teeth and mouth at an oral scan center, or delivering a dental impression kit 10, as described above. The application server 1102 may allow the user to select an intake technique using the user device 1106, for example by selecting an option from a web page. In some embodiments, the application server 1102 may determine whether the user is located near an oral scan center and, if near a scan center, present the user with the scan option. If the application server 1102 determines to use the dental impression kit 10, the method 1300 branches to block 1312, described below. If the application server 1102 determines to use the 3D scan, the method 1300 branches to block 1308.

In block 1308, the application server 1102 allows the user to schedule an appointment at a 3D oral scan center. The application server 1102 may use any technique to schedule the appointment. For example, the application server 1102 may provide a web application or other interface to the user device 1106 to allow the user to select a date and time for the appointment. In some embodiments, the user may select a date and time for the appointment when the user had impressions rejected (or the user did not return their dental impressions). The application server 1102 may store the appointment information and provide reminders to the user as appropriate. At the appointment, a professional uses a 3D scanner to capture a 3D optical scan of the user's mouth. The professional may be a hygienist or other trained professional, but is typically not an orthodontist. After the 3D scan appointment, in block 1310 the application server 1102 receives 3D optical scan data for the user's mouth. The 3D optical scan data may be embodied as any data file or collection of data files that include images of the patient's mouth as well as corresponding depth or other spatial information. After receiving the 3D optical scan data, the method 1300 advances to block 1322, described below.

Referring back to block 1306, if the application server 1102 determines to use the dental impression kit 10, the method 1300 branches to block 1312, in which the application server 1102 schedules delivery of a dental impression kit 10 to the user. In some embodiments, the user may order or otherwise receive the kit if the user does not show up to (or cancels) their appointment at the 3D oral scan center (e.g., referred to above at block 1308). After the user has received the dental impression kit 10, in block 1314 the application server 1102 receives images of the user's mouth and teeth. The user device 1106 may upload the images to the application server 1102, for example, through a web interface. In some embodiments, the application server 1102 may establish an account for the user. The application server 1102 may present the user with an account status user interface that provides access to an interface for uploading images. Images may be updated at any time after the account is created, for example after purchasing the dental impression kit 10, during use of the dental impression kit 10, and/or after creating a scan appointment. One potential embodiment of an account status user interface is described below in connection with FIG. 27. As part of the image upload web interface, the application server 1102 may provide instructions to the user on which views to capture and upload, and in some embodiments may provide tips to improve image quality. For example, the instructions may recommend that the user has another person assist in taking the images and/or may recommend using a flash or a bright light source such as a bathroom light or a window on a sunny day. As described above, the dental impression kit 10 may also include an instruction manual 54 that includes similar instructions and/or tips. In block 1316, the application server 1102 receives images for three views of the user's mouth: a view of the upper teeth with the mouth open, a view of the lower teeth with the mouth open, and a view of the teeth from straight on with the mouth closed. One potential embodiment of a web interface to provide instructions to the user and to upload images is described further below in connection with FIGS. 27A-27C. In some embodiments, in block 1318 the user may use the dental appliance 78 to separate the user's lips and open the user's mouth while taking the images, as described above. In some embodiments, in block 1320 the application server 1102 may receive additional images of the user's mouth and teeth, such as an upper, closed view; a left side, closed view; a right side, closed view; and/or a straight-on, full-smile view. As described further below, the additional images may be requested by a staff professional, a hygienist, and/or a provider while performing an image assessment. For example, the additional images may be requested for complicated cases. After receiving the images, the method 1300 advances to block 1322.

In block 1322, the application server 1102 receives a dental history questionnaire response from the user device 1106. The dental history questionnaire response may be embodied as any web form, electronic message, or other data submitted by the user device 1106. The dental history questionnaire response may include information related to the user's dental history that may be used by a staff professional, hygienist, and/or provider to determine the user's fitness for treatment. One potential embodiment of a dental history questionnaire is described below in connection with FIGS. 28A-28E.

In block 1324, the application server 1102 provides images of the user's mouth and teeth as well as the dental history questionnaire response to a staff professional and/or hygienist for review and approval. For example, the application server 1102 may establish a staff portal web site that is accessible by the staff device 1104. Because the images of the user's mouth and teeth and the dental history questionnaire response may include personal health information, the application server 1102 may restrict access to the staff portal or other user interfaces to authorized users (e.g., authorized staff professionals and/or hygienists). The staff professional/hygienist may review the images and questionnaire data to determine whether the images are sufficient to allow the provider to determine the user's fitness for treatment. For example, the staff professional/hygienist may determine whether each of the images are of the correct view and/or are of sufficient quality. The staff professional/hygienist may indicate whether each image is approved and may also request that the user provide additional views or other images. One potential embodiment of a web interface provided by the application server 1102 to perform the image review is described below in connection with FIGS. 29A and 29B. In block 1326, the application server 1102 determines whether the staff professional/hygienist approved the images. If not, the method 1300 may loop back to block 1314, in which the application server 1102 receives additional images from the user device 1106. If the staff professional/hygienist approved the images, the method 1300 advances to block 1328.

In block 1328, the application server 1102 provides images of the user's mouth and teeth as well as the dental history questionnaire response to a provider for assessment and approval. For example, the application server 1102 may establish a provider portal web site that is accessible by the provider device 1108. Because the images of the user's mouth and teeth and the dental history questionnaire response may include personal health information, the application server 1102 may restrict access to the provider portal or other user interfaces to authorized users (e.g., authorized providers). The provider may review the images and questionnaire data to determine the user's fitness for treatment. For example, the provider may determine whether the user's mouth and/or desired treatment outcome are fit for treatment with invisible plastic aligners. Continuing that example, the user may not be fit for treatment, for example, if the user's mouth and/or desired treatment outcome requires pulling teeth, interproximal reduction, or performing other procedures that cannot be achieved with aligners. To perform the assessment, the provider may access a provider portal with a web interface similar to the web interface shown in FIGS. 29A and 29B. Features of the provider portal are also described below in connection with FIGS. 30A-30E. In block 1330, the application server 1102 determines whether the provider approved the images. If not, the method 1300 may loop back to block 1314, in which the application server 1102 receives additional images from the user device 1106. If the provider approved the images, the method 1300 advances to block 1332, shown in FIG. 24B.

Figure 24A:
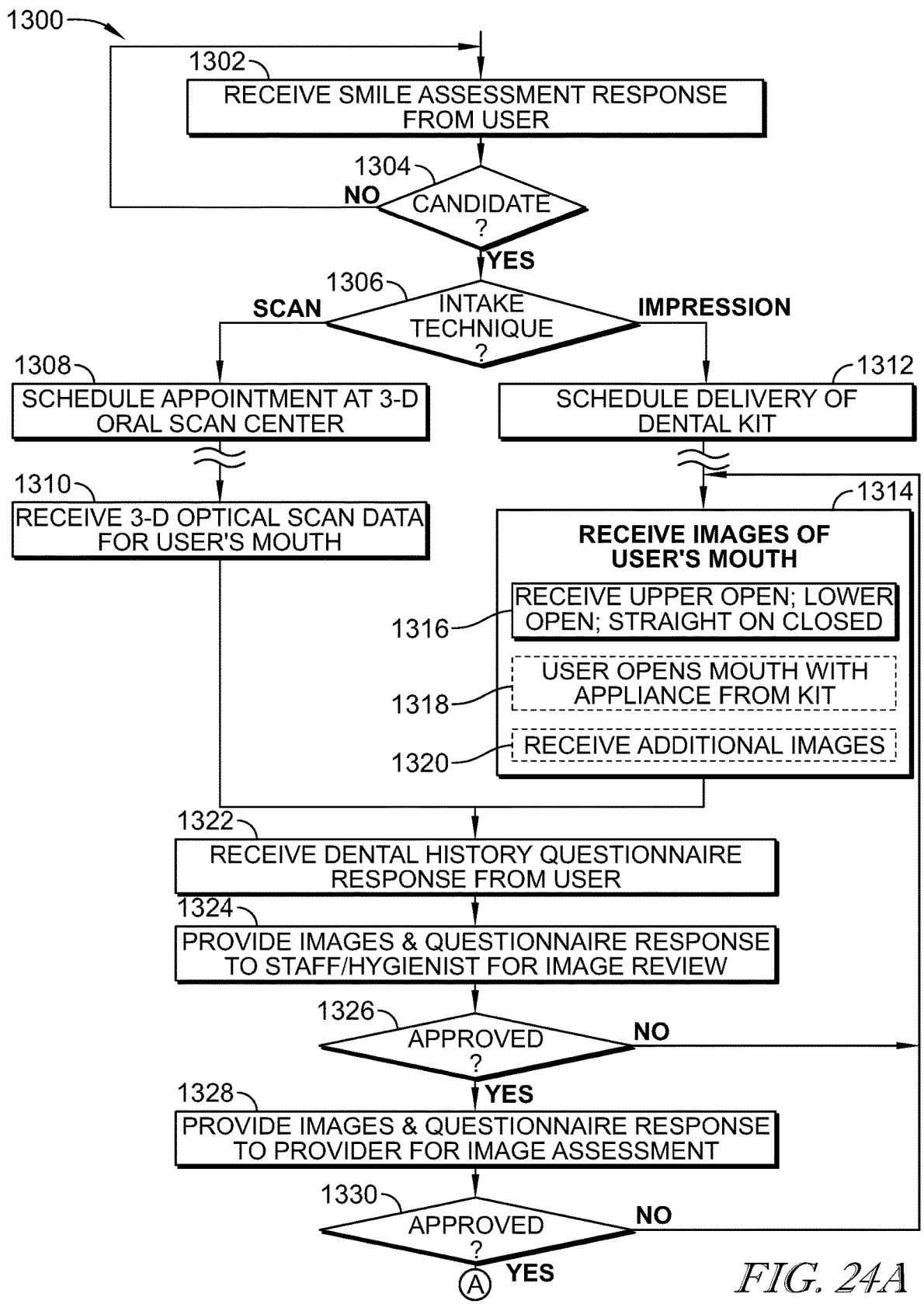
FIGS. 24A and 24B are a simplified flow diagram of at least one embodiment of a method for remote orthodontic treatment and assessment that may be executed by the application server of FIGS. 22-23.
Figure 24B:
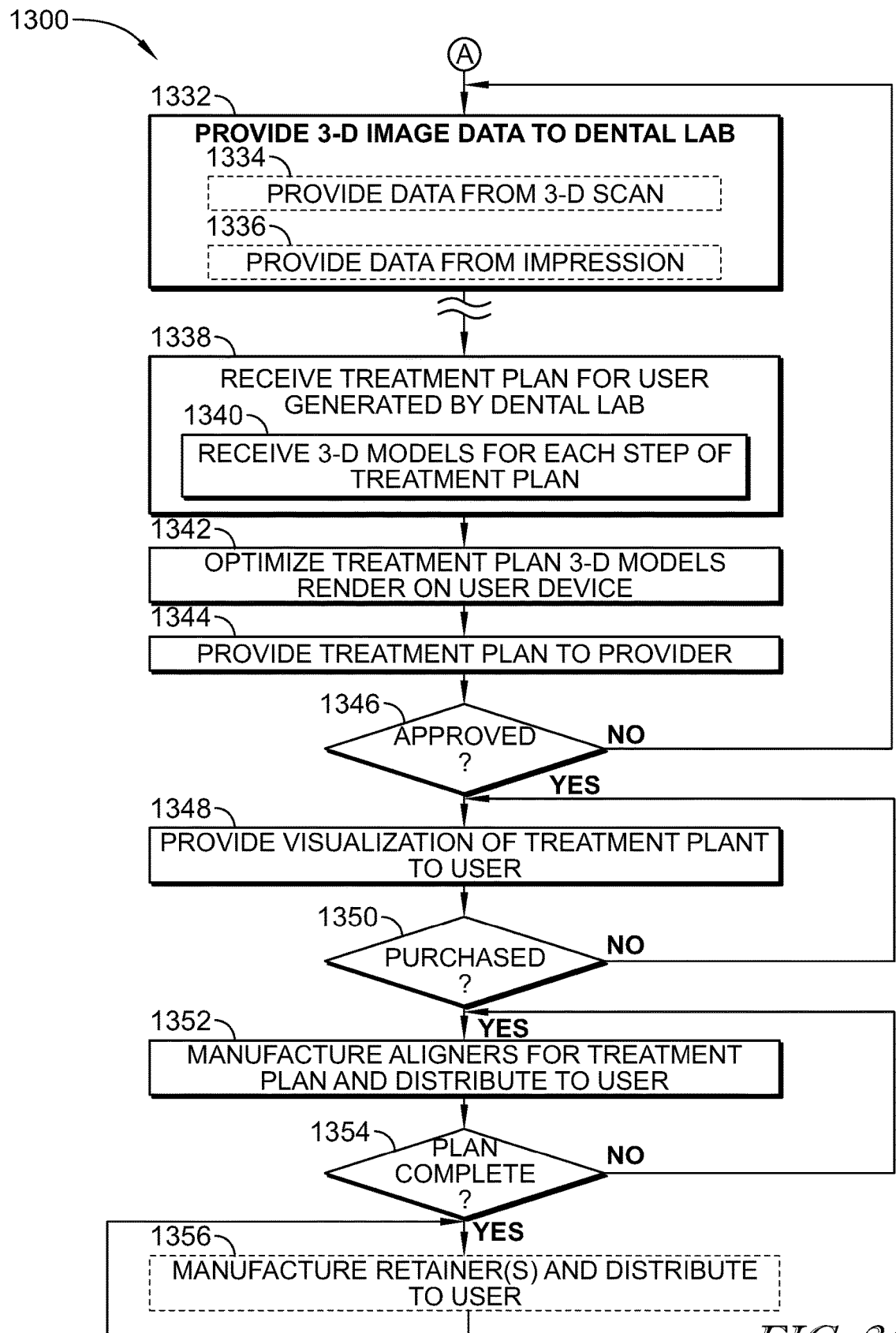

Referring now to FIG. 24B, in block 1332 the application server 1102 provides 3D image data for the user's mouth to the dental lab 1110. The application server 1102 may use any technique to provide the data, for example by transferring data over the network 1112 to a server or other computing device of the dental lab 1110. The 3D image data may be generated using any appropriate technique. In some embodiments, in block 1334 the application server 1102 provides data generated during a 3D optical scan, which was received by the application server 1102 as described above in connection with block 1310. In some embodiments, in block 1336 the application server 1102 provides data generated based on impressions created using the dental impression kit 10, which was scheduled for delivery as described above in connection with block 1312. In some embodiments, the dental impressions themselves may be provided to the dental lab 1110, and the dental lab 1110 may generate the 3D image data based on the impressions (and/or on the images provided by the user). After receiving the 3D image data, the dental lab 1110 may use typical dental software to generate a treatment plan.

After the dental lab 1110 creates the treatment plan, in block 1338 the application server 1102 receives the treatment plan generated by the dental lab 1110. The treatment plan may be embodied as any data indicative of a series of steps used to correct or otherwise modify the positions of the user's teeth. In particular, the treatment plan may represent the user's teeth and how they move through the duration of the treatment plan. The treatment plan may be directed to the user's upper teeth, lower teeth, or both upper and lower teeth. In block 1340, the application server 1102 receives a 3D model of the user's mouth and teeth for each step of the treatment plan. Thus, the treatment plan may indicate the position of the user's teeth as they are modified over the course of treatment. The 3D models of the treatment plan may be embodied as STL files, OBJ files, or any other data file that is indicative of a three-dimensional object and/or scene.

In block 1342, the application server 1102 optimizes the treatment plan 3D models to render on the user device 1106. The application server 1102 may perform optimization to reduce the size of corresponding data files or to otherwise improve rendering performance on the user device 1106. One potential embodiment of a method for optimizing the treatment plan 3D models is described below in connection with FIG. 25.

After optimizing the treatment plan 3D models, in block 1344 the application server 1102 provides the treatment plan to the provider for approval. For example, the application server 1102 may establish a provider portal web site that is accessible by the provider device 1108. Because the treatment plan may include personal health information, the application server 1102 may restrict access to the provider portal or other user interfaces to authorized users (e.g., authorized providers). Using the provider portal, the provider may review 3D images of the steps of the treatment plan, and may approve the plan, reject the plan, request modifications to the plan, or otherwise review the treatment plan. One potential embodiment of a user interface for the provider portal is described below in connection with FIGS. 30A-30E. In block 1346, the application server 1102 determines whether the provider has approved the treatment plan. If not, the method 1300 loops back to block 1332, in which the dental lab 1110 may modify the treatment plan or otherwise generate a new treatment plan. If the treatment plan is approved, the method 1300 advances to block 1348.

In block 1348, the application server 1102 provides a visualization of the treatment plan to the user. For example, the application server 1102 may establish a user portal web site that is accessible by the user device 1106. Because the treatment plan may include personal health information, the application server 1102 may restrict access to the user portal or other user interfaces to the authorized user. The visualization may allow the user to view the 3D models of the user's mouth and teeth for each step of the treatment process from multiple angles. As described above in connection with block 1342, the 3D models of the treatment plan are optimized for rendering by the user device 1106, which provides the user with a responsive user interface. As described above, the application server 1102 may establish an account for the user, and an account status user interface may provide access to the treatment plan visualization user interface. One potential embodiment of an account status user interface is described below in connection with FIG. 32. One potential embodiment of a treatment plan visualization user interface is described below in connection with FIG. 33.

In block 1350, the application server 1102 determines whether the user has purchased the approved treatment plan. The user may purchase the treatment plan, for example, through an account user interface provided by the application server 1102 to the user device 1106. If the user has not purchased the approved treatment plan, the method 1300 loops back to block 1348, in which the application server 1102 may continue to provide the visualization of the treatment plan to the user. If the treatment plan is purchased, the method 1300 advances to block 1352.

In block 1352, one or more aligners are manufactured for the treatment plan and distributed to the user. Any appropriate technique may be used to manufacture and distribute the aligners. For example, the aligners may be manufactured by 3D printing physical models of the user's teeth and then molding plastic aligners using the physical models of the user's teeth. Multiple aligners may be distributed to the user each month. For example, the user may be sent three aligners each month, with the first aligner to be worn for one week, the second aligner to be worn for one week, and the third aligner to be worn for two weeks. During the manufacturing and distribution process, the application server 1102 may coordinate access to order information, the treatment, plan, and other data associated with the user. In block 1354, it is determined whether the treatment plan is complete. For example, a treatment plan may have a duration of five months. If the plan is not complete, the method 1300 loops back to block 1352 to continue manufacturing and distributing aligners. If the plan is complete, the method 1300 may advance to block 1356, in which one or more retainers may be manufactured and distributed to the user. In some embodiments, the application server 1102 may perform a check-in process after a predetermined amount of time has elapsed during treatment, for example a 90-day check in process. As part of the check-in process, the patient may answer a questionnaire and submit photos that are reviewed by a dental professional. Thus, the application server 1102 may monitor the progress of the patient during treatment. One potential embodiment of a user interface for the check-in progress is shown in FIGS. 37A-37D. The method 1300 may loop back to block 1356 to continue manufacturing and distributing retainers, or in some embodiments may be completed. It should be understood that the method 1300 illustrates techniques for remote orthodontic treatment and assessment for a single user; it should be understood that the application server 1102 may execute multiple instances of the method 1300 for multiple users.

Figure 25:
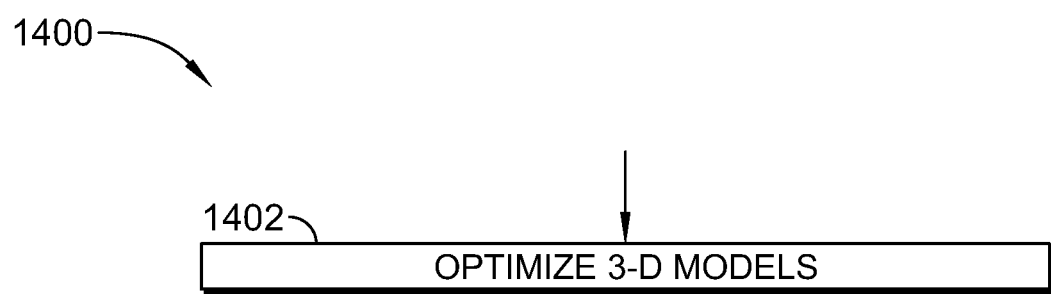
FIG. 25 is a simplified flow diagram of at least one embodiment of a method for 3D model optimization that may be executed by the application server of FIGS. 22-23.

Referring now to FIG. 25, in use, the application server 1102 may execute a method 1400 for 3D model optimization. The method 1400 may be executed, for example, in connection with block 1342 of the method 1300, described above in connection with FIG. 24B. It should be appreciated that, in some embodiments, the operations of the method 1400 may be performed by one or more components of the environment 1200 of the application server 1102 as shown in FIG. 23. The method 1400 begins in block 1402, in which the application server 1102 optimizes the 3-D models of a treatment plan.

Referring now to FIG. 26, a user interface 1500 for a smile assessment is shown. The user interface 1500 may be used to receive a smile assessment response as described above in connection with block 1302 of FIG. 24A. The illustrative user interface 1500 is a web page provided by the application server 1102 to the user device 1106; however, it should be understood that the user interface 1500 may be embodied as native application, managed application, or other interface of the user device 1106. As shown, the user interface 1500 includes multiple input elements 1502 that allow the user to provide information regarding current condition of the user's mouth and the user's chief complaint. The user interface 1500 includes a submit button 1504 that, when selected by the user, provides the smile assessment response to the application server 1102. In some embodiments, the user interface 1500 may include additional input elements 1506 (not shown) to collect additional information, such as user contact information (e.g., email address or phone number, mailing address, zip code), account information, or other information.

Referring now to FIG. 27, a user interface 1600 for account status is shown. The illustrative user interface 1600 is a web page provided by the application server 1102 to the user device 1106; however, it should be understood that the user interface 1600 may be embodied as native application, managed application, or other interface of the user device 1106. The user interface 1600 may be used to display the status of the user's account, including indicating additional information required from the user or otherwise indicating the next step to be performed by the user. For example, the illustrative user interface 1600 indicates that the user still needs to upload photos. The user interface 1600 includes a button 1602 that, when selected by the user, launches a user interface for uploading the photos. It should be understood that the user interface 1600 may include information and/or actions for other steps, such as scheduling a 3D scan appointment, reminding the user of a 3D scan appointment, indicating that images were received and are being reviewed, indicating that a treatment plan is being created, or other status information.

Figure 28A:
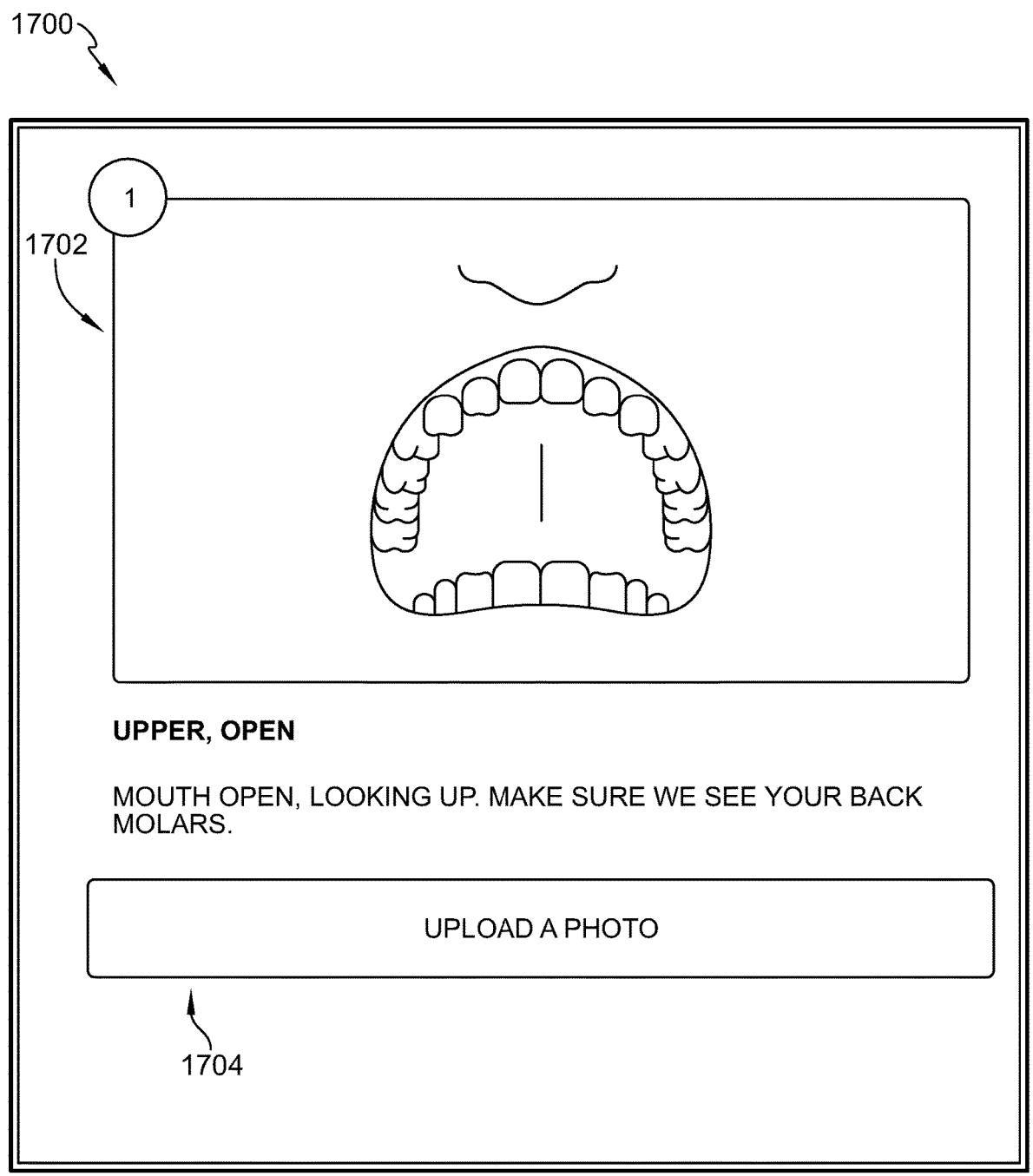
FIGS. 28A-28C are screen shots of an image upload user interface that may be generated by the application server of FIGS. 22-23.
Figure 28B:
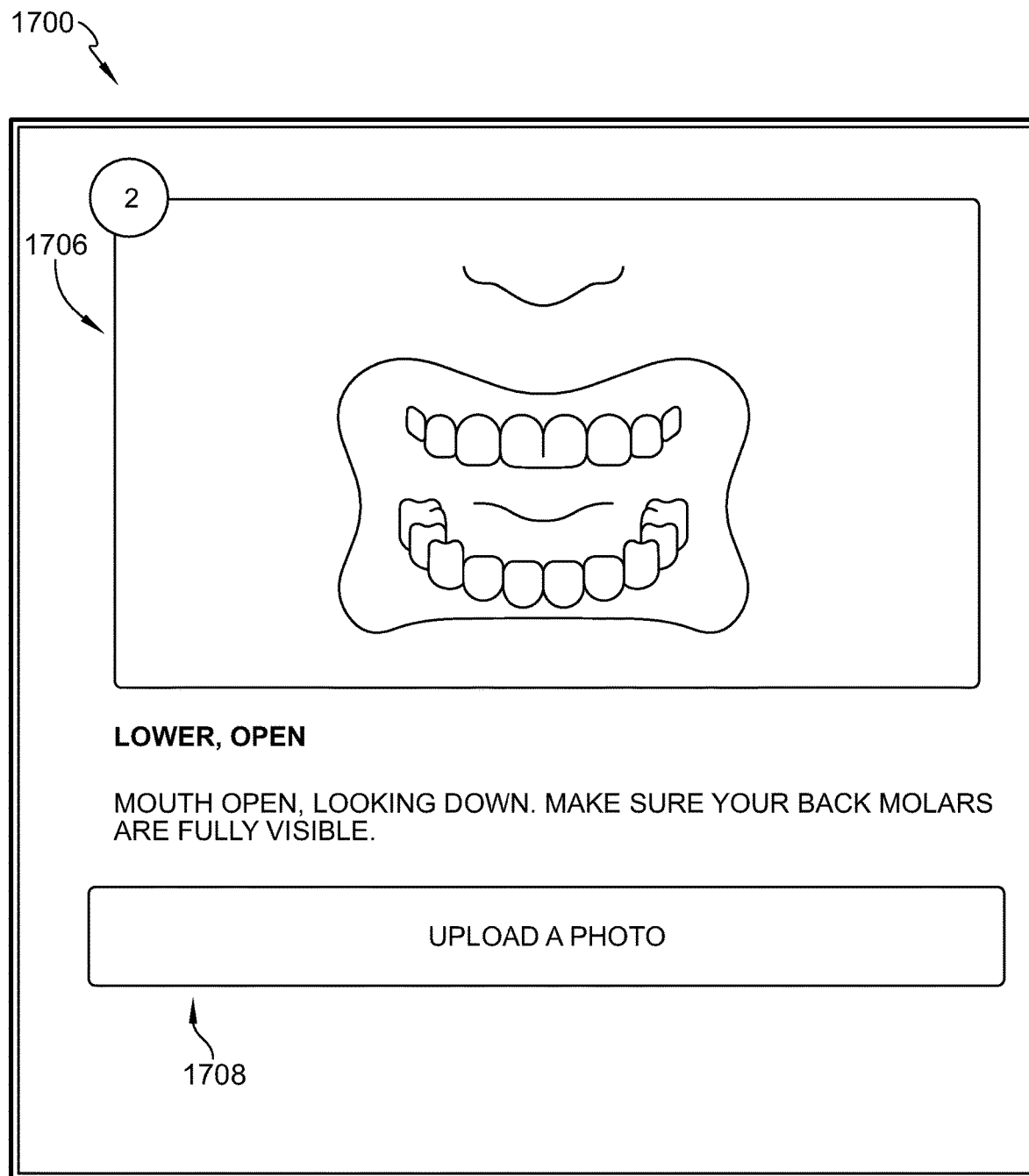
Figure 28C:
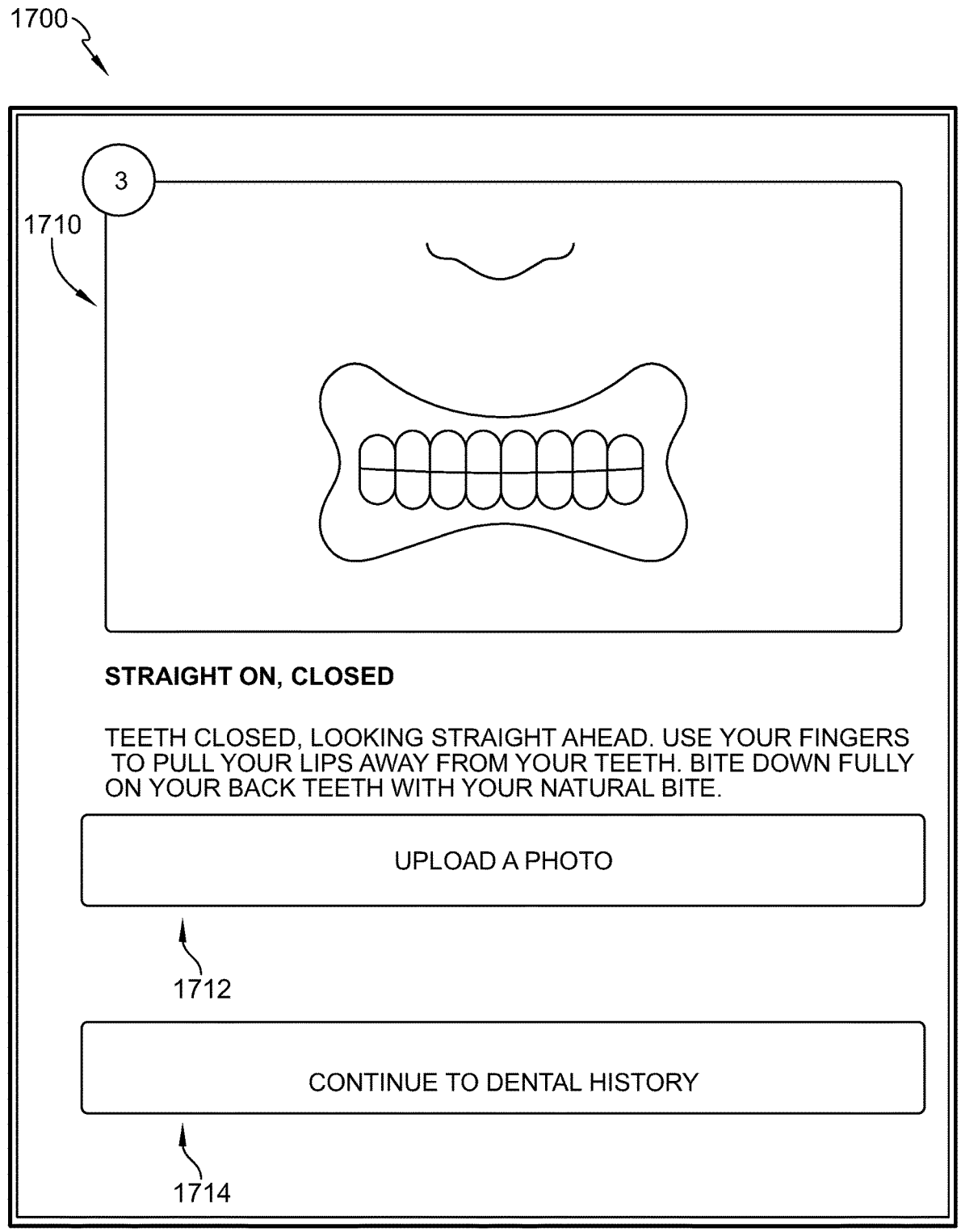

Referring now to FIGS. 27A-27C, a user interface 1700 for uploading images of the user's mouth and teeth is shown. The user interface 1700 may be used to receive images from the user device 1106 as described above in connection with block 1314 of FIG. 24A. The illustrative user interface 1700 is a web page provided by the application server 1102 to the user device 1106; however, it should be understood that the user interface 1700 may be embodied as native application, managed application, or other interface of the user device 1106. As shown, the user interface 1700 includes instructions 1702, 1706, 1710 and corresponding submit buttons 1704, 1708, 1712 for the three images that are used for photo assessment. In particular, the instructions 1702 and submit button 1704 shown in FIG. 28A are for an upper, open view; the instructions 1706 and submit button 1708 shown in FIG. 28B are for a lower, open view; and the instructions 1710 and submit button 1712 shown in FIG. 28C are for a straight-on, closed view. The user interface 1700 further includes a button 1714 to cause the user device 1106 to move on to the dental history questionnaire.

Referring now to FIGS. 28A-28C, a user interface 1800 for a dental history questionnaire is shown. The user interface 1800 may be used to receive a dental history questionnaire response as described above in connection with block 1322 of FIG. 24A. The illustrative user interface 1800 is a web page provided by the application server 1102 to the user device 1106; however, it should be understood that the user interface 1800 may be embodied as native application, managed application, or other interface of the user device 1106. As shown, the user interface 1800 includes multiple input elements 1802 that allow the user to provide information regarding the user's dental history. The user interface 1800 also includes a submit button 1804 that, when selected by the user, provides the dental history questionnaire response to the application server 1102. Referring now to FIGS. 28D-28E, another potential embodiment of a user interface 1800 for a dental history questionnaire is shown.

Figure 29A:
Figure 29B:
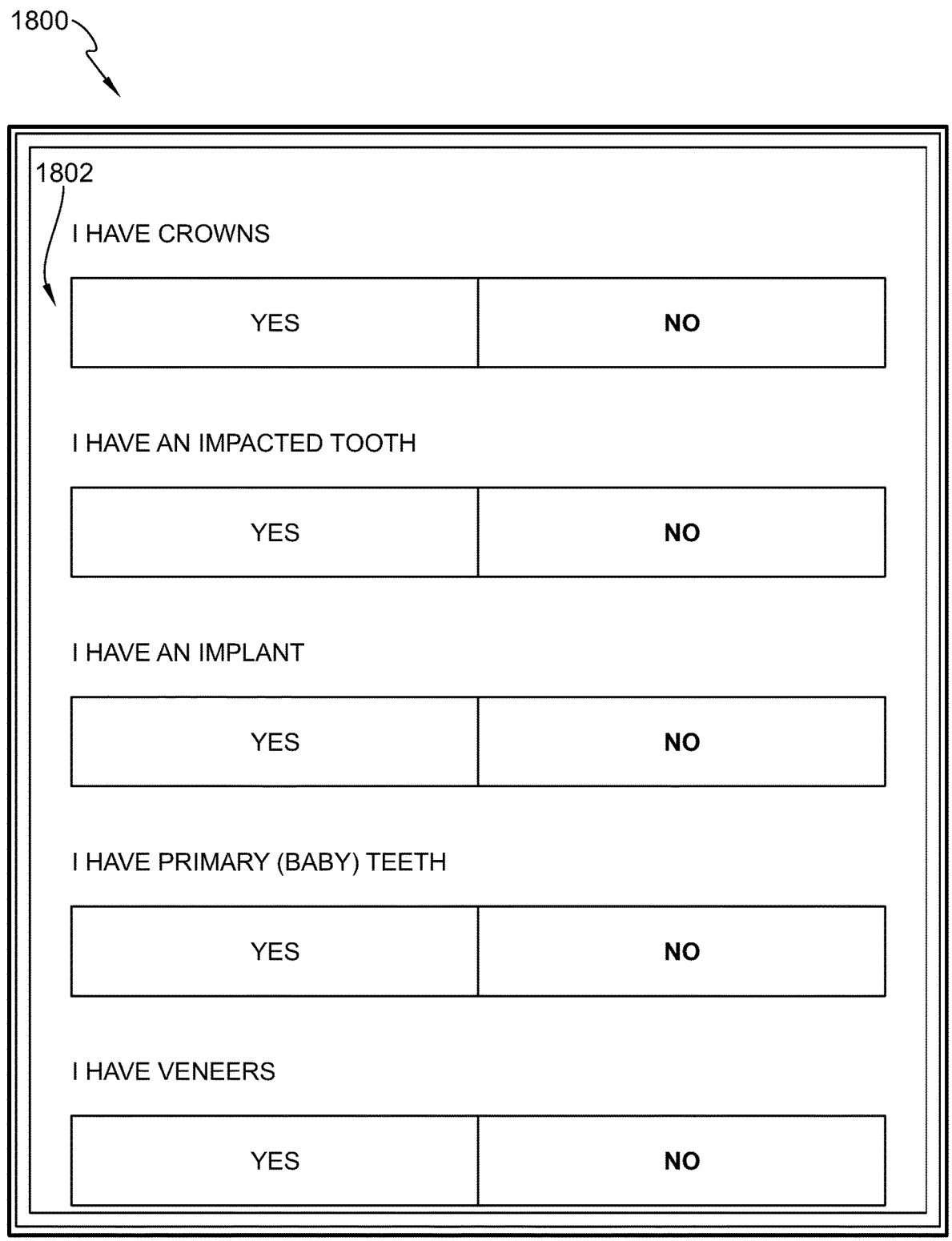

Referring now to FIGS. 29A and 29B, a user interface 1900 for photo assessment review is shown. The user interface 1900 may be used to provide data to the staff professional/hygienist and to receive approval as described above in connection with blocks 1322, 1324 of FIG. 24A. The illustrative user interface 1900 is a web page provided by the application server 1102 to the staff device 1104; however, it should be understood that the user interface 1900 may be embodied as native application, managed application, or other interface of the staff device 1104 and/or application server 1102. Additionally or alternatively, in some embodiments the user interface 1900 may be embodied as an embedded view within a staff portal user interface provided by the application server 1102.

Figure 30A:
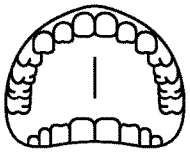

As shown in FIG. 30A, the user interface 1900 includes multiple indicator elements 1902 for the different views. Each indicator element 1902 may indicate whether the image for the associated view has been approved, rejected, or is pending review. As shown, the user interface 1900 includes indicator elements 1902 for seven potential views, including the three views described above in connection with FIGS. 27A-27C, as well as four additional views that may be requested for complex cases. The user interface 1900 further includes an image thumbnail 1904 for the selected view (which is illustratively a line drawing but could include a photographic image) and a popup list 1906 used to approve or reject the selected image. The user interface 1900 includes a submit button 1908 that, when selected by the staff professional/hygienist, provides the approval to the application server 1102. The user interface 1900 also includes a view 1910, shown in FIG. 30B, that displays the dental history questionnaire response for the user. The staff professional/hygienist may review data displayed in the view 1910 when performing the photo review.

Figure 31B:
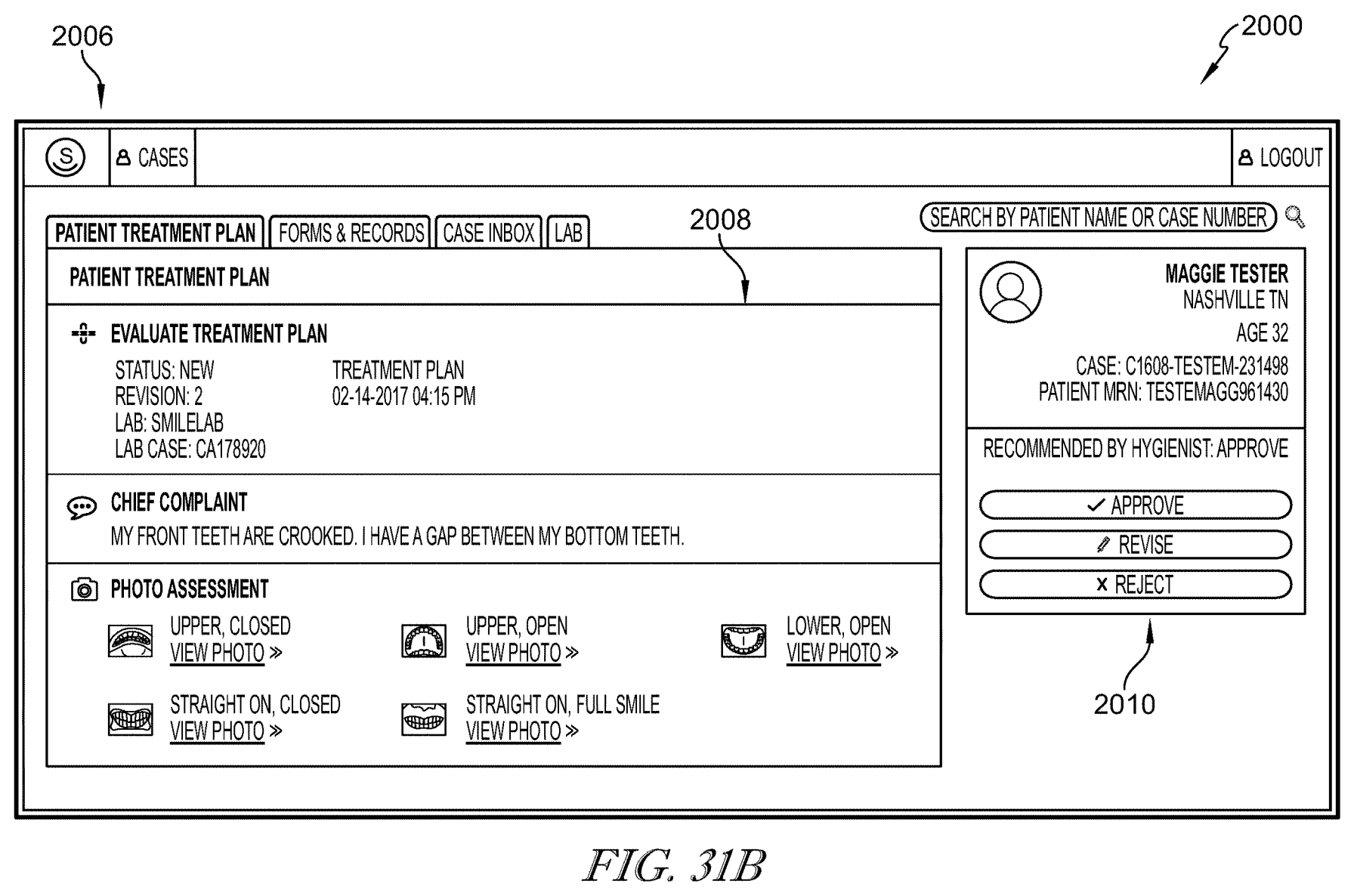
Figure 31C:
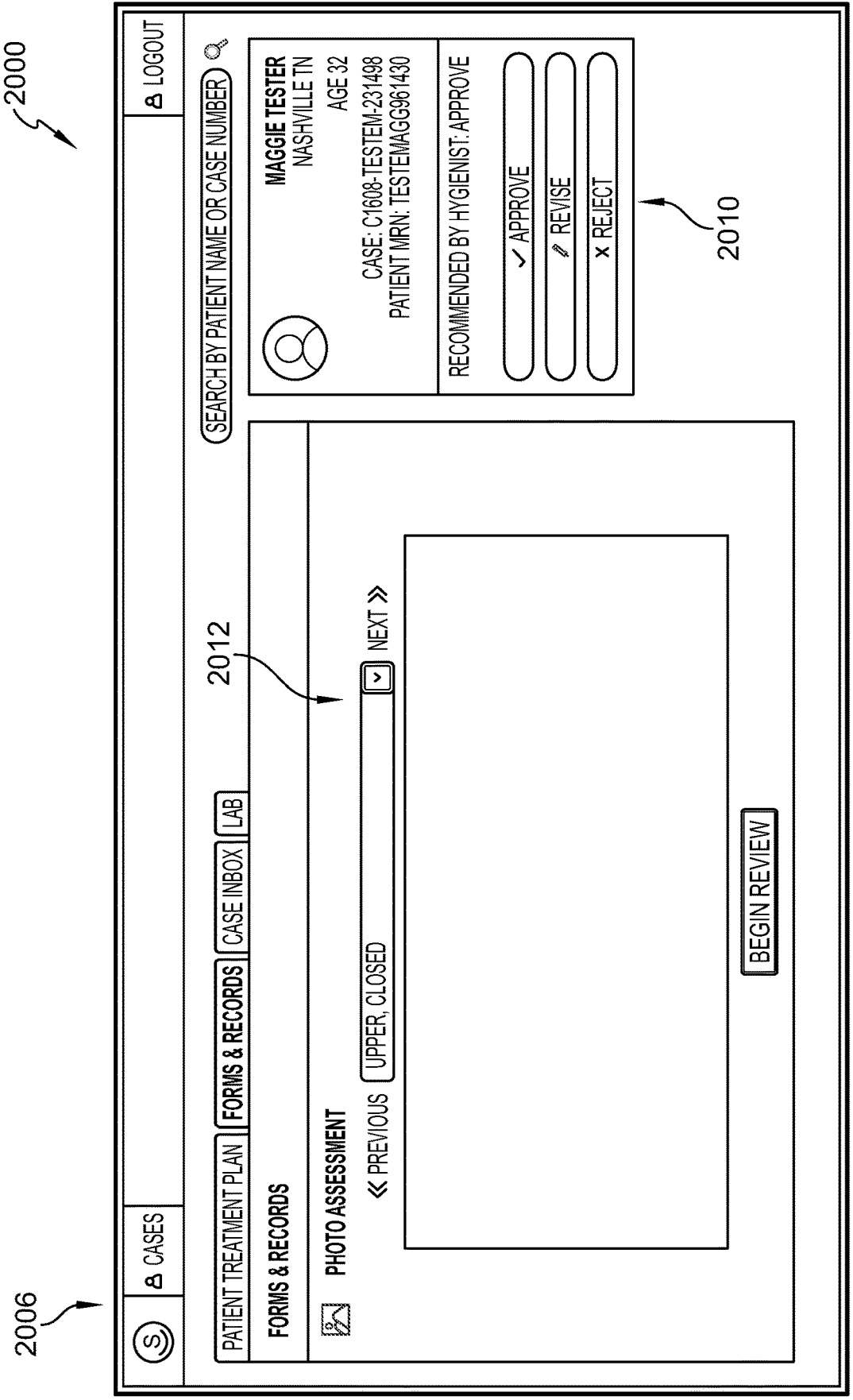

Referring now to FIGS. 31A-31E, a user interface 2000 for a provider portal is shown. The user interface 2000 may be used to allow a provider to perform a photo assessment, review a treatment plan, or otherwise interact with a user's case. The illustrative user interface 2000 is a web page provided by the application server 1102 to the provider device 1108; however, it should be understood that the user interface 2000 may be embodied as native application, managed application, or other interface of the provider device 1108. As shown in FIG. 31A, the user interface 2000 may include a case listing view 2002. The case listing view 2002 may include a case summary view 2004 for each user assigned to or otherwise associated with the provider. Selecting a case summary view 2004 may cause the provider device 1108 to display a corresponding case detail view 2006, shown in FIGS. 30B-30E.

Figure 31D:
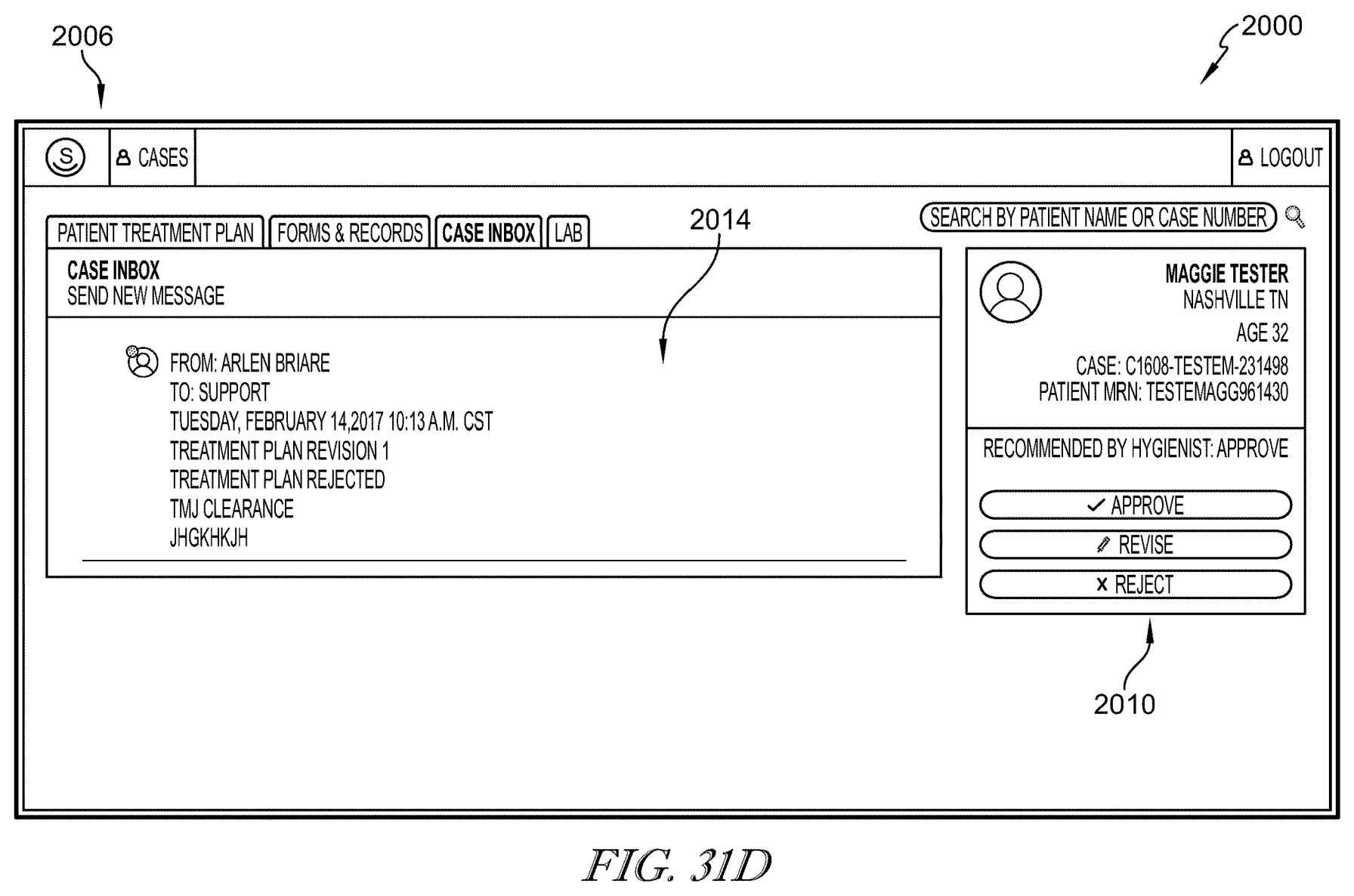
Figure 31E:
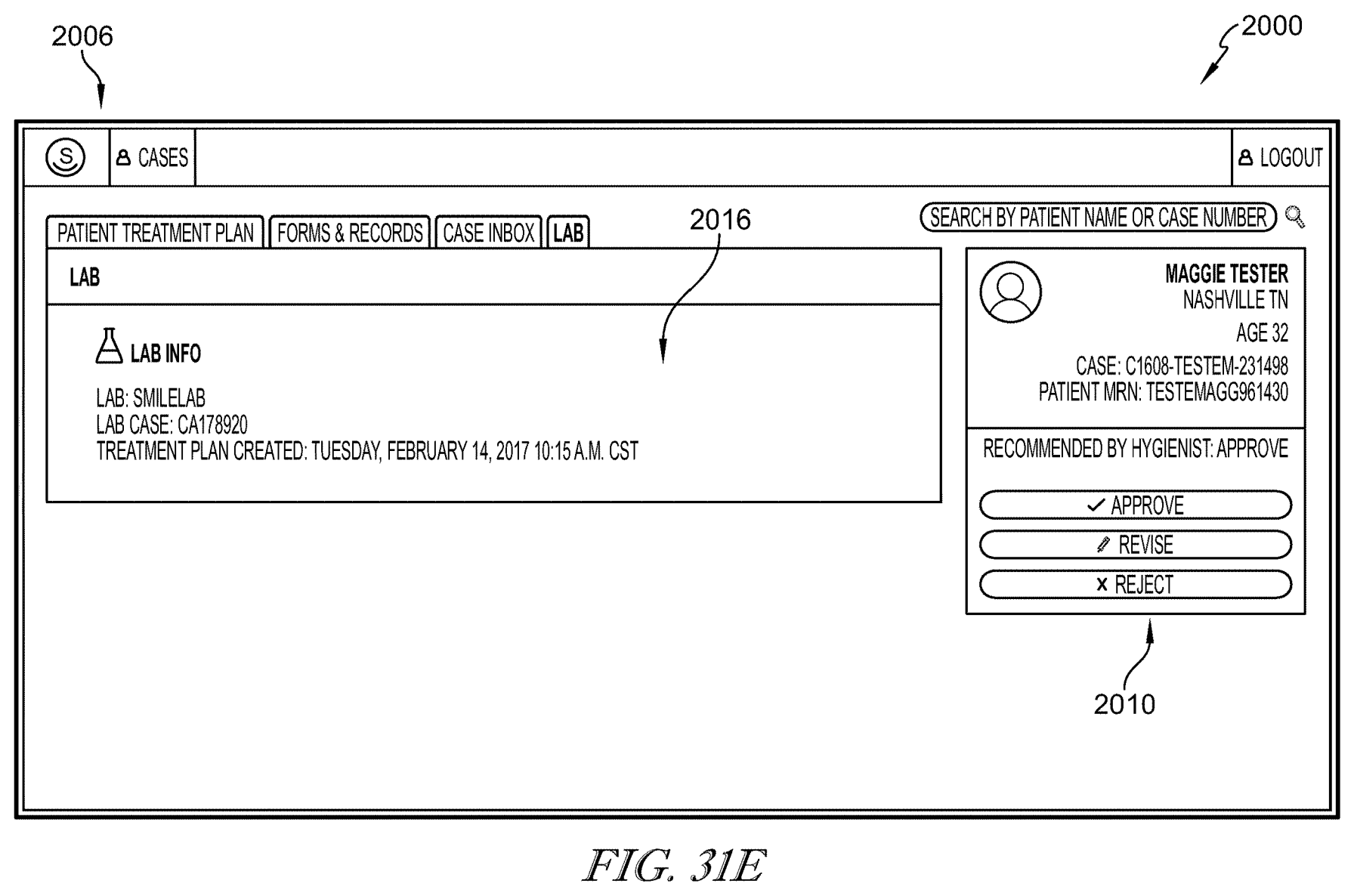

The case detail view 2006 may include a tabbed interface with multiple sub-views, including a patient treatment plan view 2008, shown in FIG. 31B. The patient treatment plan view 2008 may provide information on the treatment plan, the user's chief complaint, and the photo assessment, and may also allow the provider to initiate evaluation of the treatment plan and the photo assessment. The case detail view 2006 also includes an action box 2010, which includes buttons to allow the provider to approve or reject the treatment plan. As shown in FIG. 31C, the case detail view 2006 may include a form and record view 2012, which may display images (including treatment plan images and/or photo assessment images) and other documents for the provider to review. As shown in FIG. 31D, the case detail view 2006 may include a case inbox view 2014 that displays communications relevant to the user's case that are managed by the application server 1102. As shown in FIG. 31E, the case detail view 2006 may include a lab view 2016 that displays information for the dental lab 1110 assigned to the case.

Figure 32:
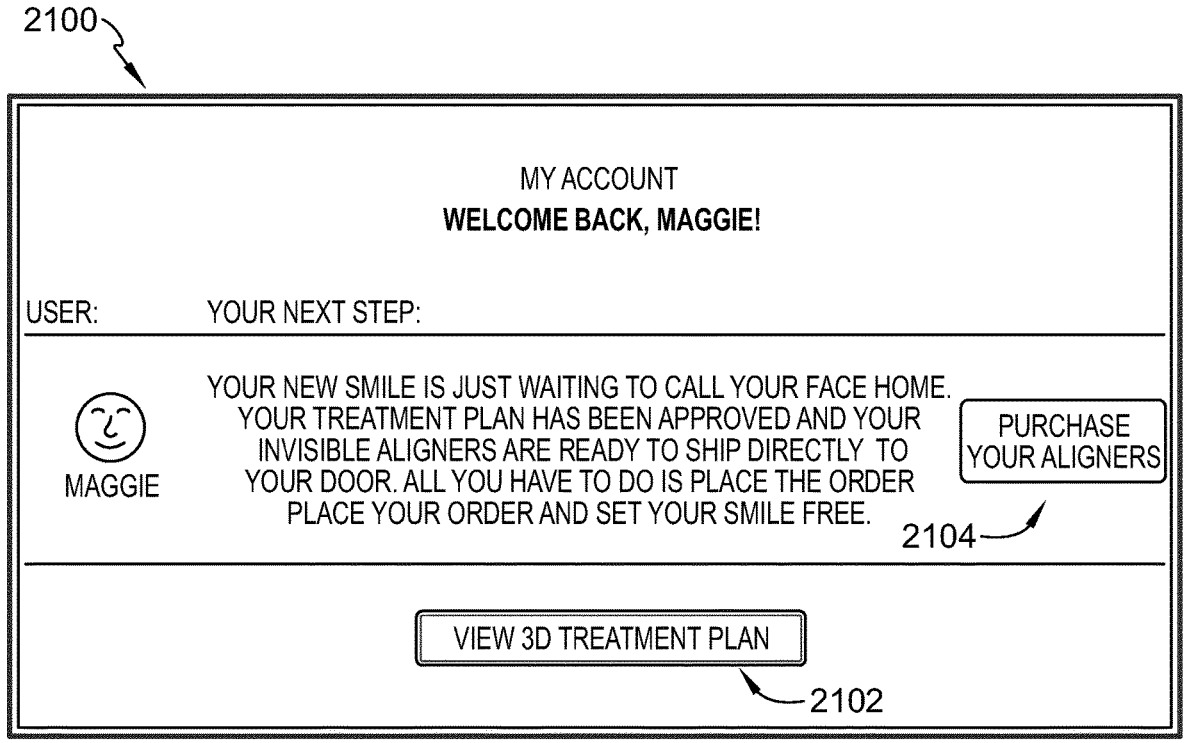
FIG. 32 is a screen shot of an account status user interface that may be generated by the application server of FIGS. 22-23.

Referring now to FIG. 32, a user interface 2100 for account status is shown. The illustrative user interface 2100 is a web page provided by the application server 1102 to the user device 1106; however, it should be understood that the user interface 2100 may be embodied as native application, managed application, or other interface of the user device 1106. The user interface 2100 may be used to display the status of the user's account, including indicating additional information required from the user or otherwise indicating the next step to be performed by the user. For example, the illustrative user interface 2100 indicates that the user's treatment plan is completed and ready for viewing. The user interface 2100 includes a button 2102 that, when selected by the user, launches a user interface for viewing the treatment plan. The user interface 2100 also includes a button 2104 that, when selected by the user, launches a user interface to purchase aligners for the treatment plan. The user interface for purchasing the aligners may collect account information, payment information, and perform other e-commerce functions as described above.

Figure 33:
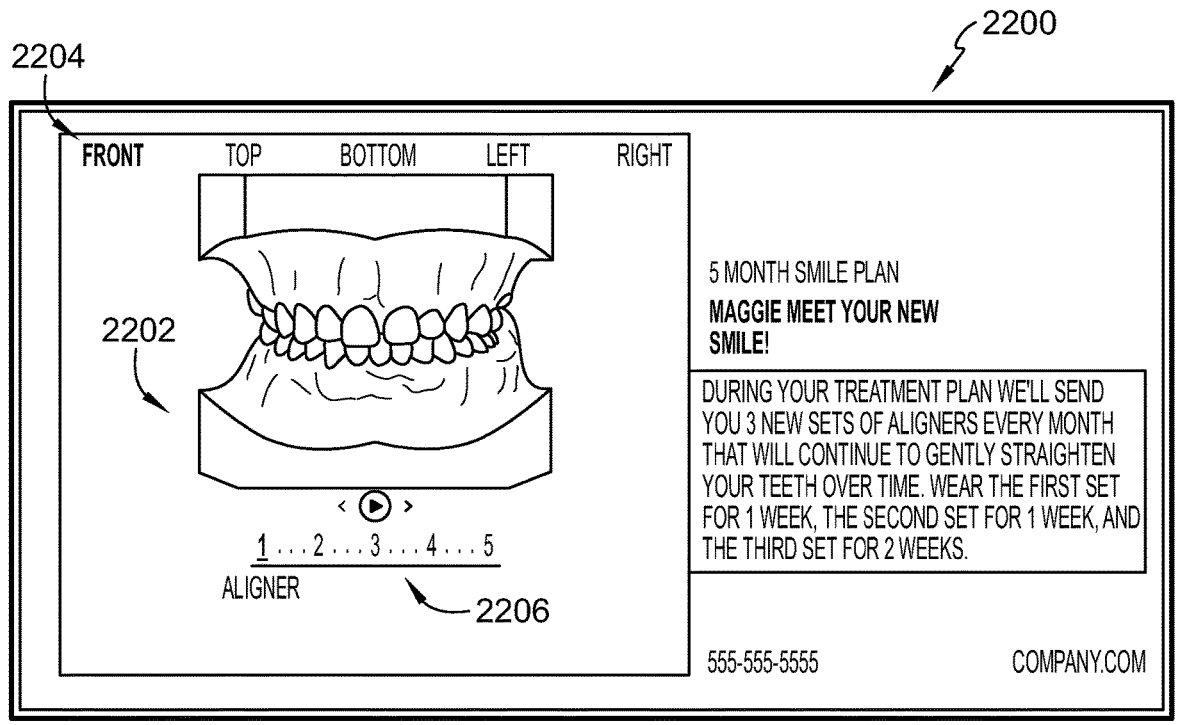
FIG. 33 is a screen shot of a 3D treatment plan viewer user interface that may be generated by the application server of FIGS. 22-23.

Referring now to FIG. 33, a user interface 2200 for viewing a 3D treatment plan is shown. The user interface 2200 may be used to view the treatment plan as described above in connection with block 1348 of FIG. 24B. The illustrative user interface 2200 is a web page provided by the application server 1102 to the user device 1106; however, it should be understood that the user interface 2200 may be embodied as native application, managed application, or other interface of the user device 1106. As shown, the user interface 2200 includes a 3D model view 2202 that displays the 3D model of the treatment plan. As described above in connection with block 1342 of FIG. 24B, the 3D model may be optimized for efficient viewing on the user device 1106. The user interface 2200 also includes a button bar 2204 that allows the user to switch between particular views of the 3D model and a slider 2206 that allows the user to switch between particular phases of the treatment plan. For example, the illustrative user interface 2200 displays a five-month treatment plan, and the slider 2206 allows the user to display a 3D model for each month of the treatment plan.

Figure 34A:
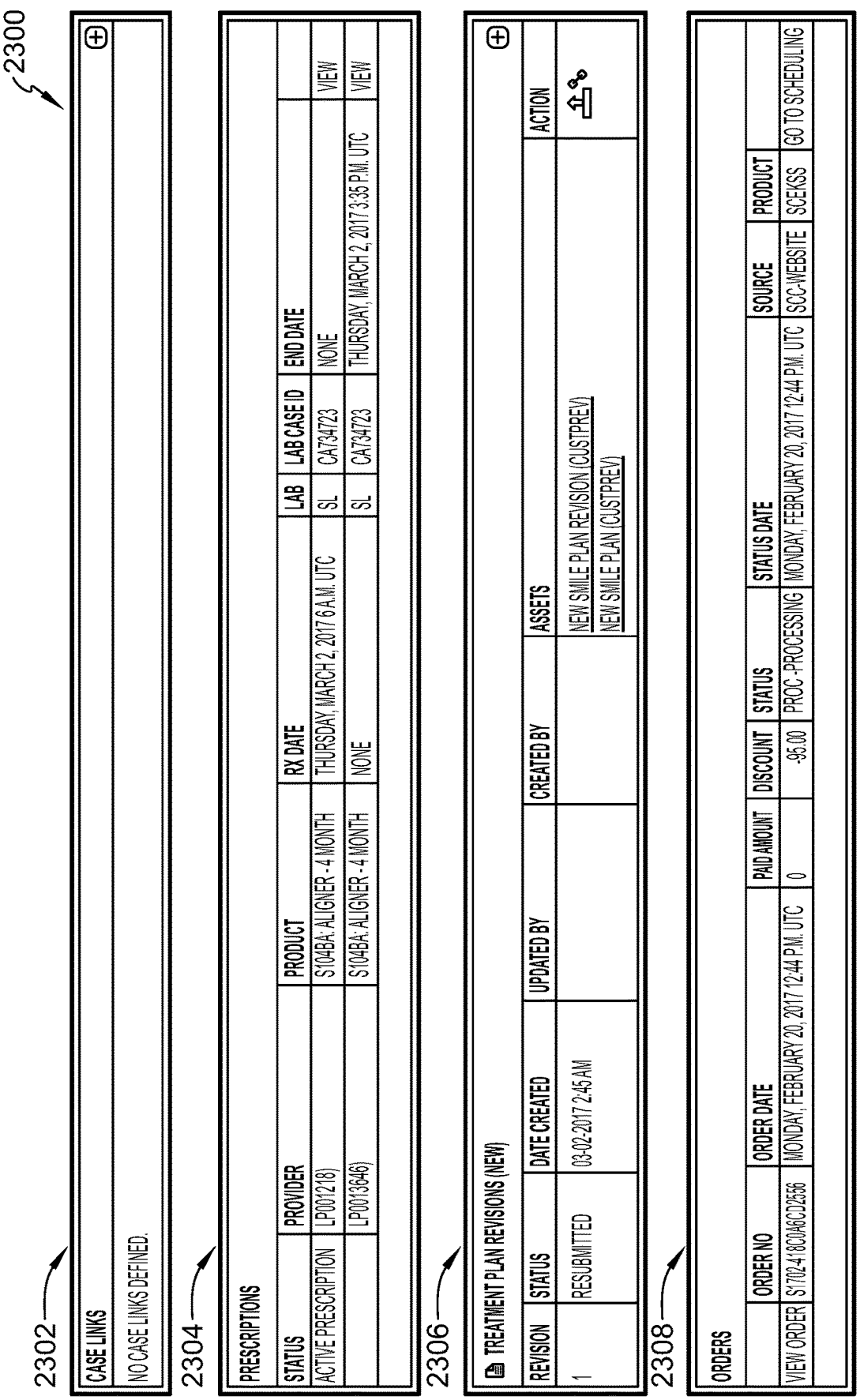
Figure 34B:
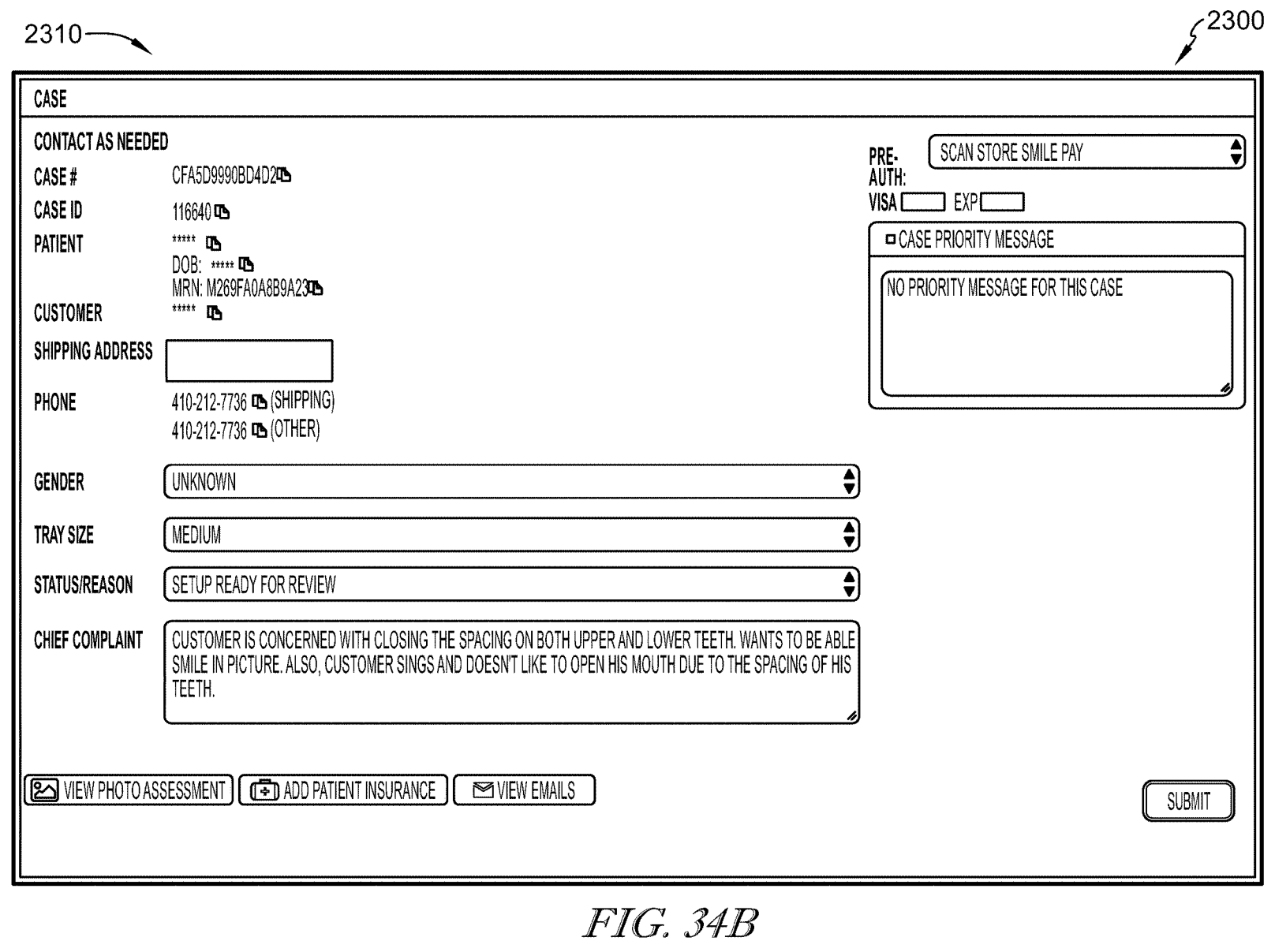
Figures 38A, 38B:
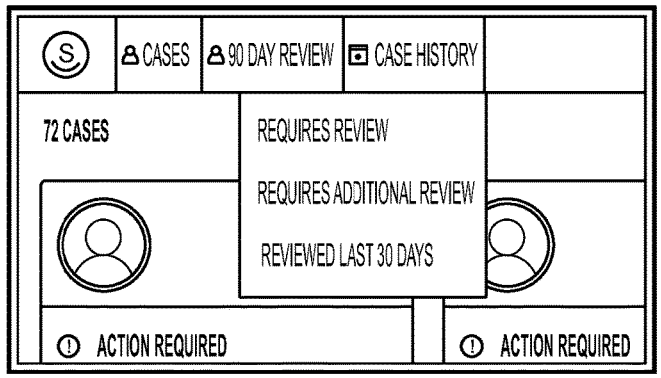
Figure 38C:
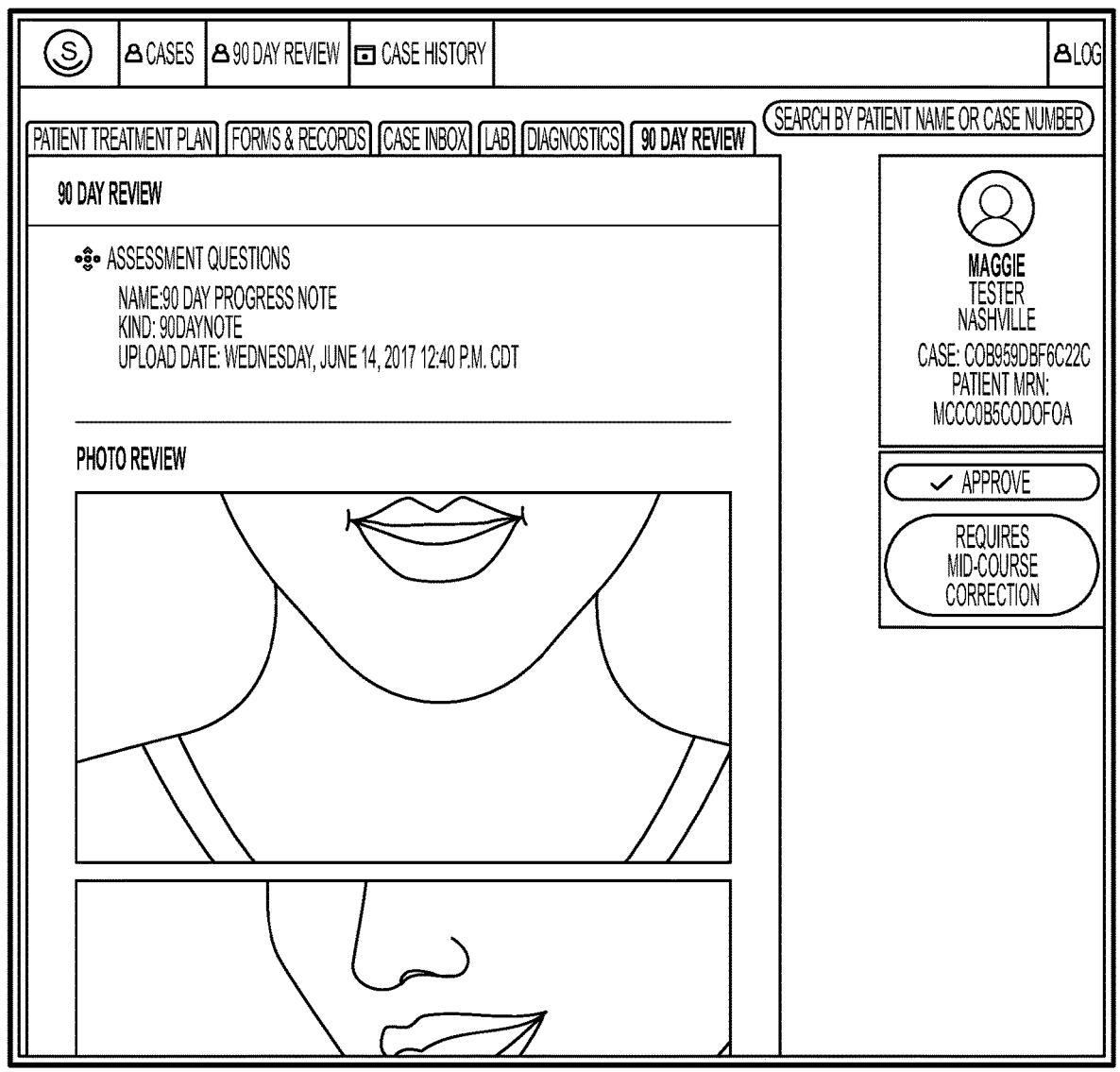

Referring now to FIGS. 33A-33F, a user interface 2300 for a staff portal is shown. The user interface 2300 may be used to store and manage all data relating to a particular user's case. Thus, the user interface 2300 may be used as an interface to a secure electronic medical records repository provided by the application server 1102. The illustrative user interface 2300 is a web page provided by the application server 1102 to the staff device 1104; however, it should be understood that the user interface 2300 may be embodied as native application, managed application, or other interface of the staff device 1104 and/or the application server 1102. The illustrative user interface 2300 shown in FIGS. 33A-33F illustrates one potential embodiment of the documents and other data that may be stored for each user by the application server 1102. As shown in FIGS. 33A-33F, the user interface 2300 includes multiple views, with each view allowing access to part of the data associated with a particular user's case. As shown in FIG. 34A, the user interface 2300 may include a case link view 2302, a prescription view 2304, a treatment plan revision view 2306, and an order view 2308. The treatment plan revision view 2306 may track changes made to the treatment plan during the provider's review process, as described above in connection with blocks 1332 to 1346 of FIG. 24B, and the prescription view 2304 may be populated after the provider has approved a treatment plan. As shown in FIG. 34B, the user interface 2300 may include a case detail view 2310, which includes details on the user's contact information, payment information, case status, and also includes links to the user's photo assessment and other information. As shown in FIG. 34C, the user interface 2300 may include a journal view 2312, which records events related to the user's case. As shown in FIG. 34D, the user interface 2300 may include a journal entry view 2314, which allows a staff professional or other person to enter events into the journal for the user's case. Each journal entry may be restricted by audience (e.g., staff, provider, user, or other audience). As shown in FIG. 34E, the user interface 2300 may include a case message view 2316, which records all messages sent via the application server 1102 concerning the user's case. The messages may be exchanged, for example, between the provider, staff, and/or the dental lab 1110 for a case. As shown in FIG. 34F, the user interface 2300 may include a case file view 2318 and a case document view 2320. The views 2318, 2320 may provide an interface to secure storage for all images, treatment plans, consent forms, and other documents related to a user's case.

Referring to FIGS. 34-36, another embodiment of a dental tray 200 includes a substantially arched mouth insert 202 that is sized and shaped to be inserted into the user's mouth. Particularly, the insert 202 is sized and shaped to be received into either an upper portion or a lower portion of the user's mouth. The insert 202 includes a cavity 204 defined by a bottom wall 206 and a pair of sidewalls 208 extending upward from the bottom wall 206. The cavity 204 is sized to receive the putty mixture. When the dental tray 200 is inserted into the user's mouth, the user bites down on the dental tray 200 so that the user's teeth are within the cavity 204 and bite into the putty mixture. A flange 210 extends from a front of the dental tray 200. The flange 210 is configured to be gripped by the user to insert and remove the dental tray 200 from the user's mouth.

Figure 39:
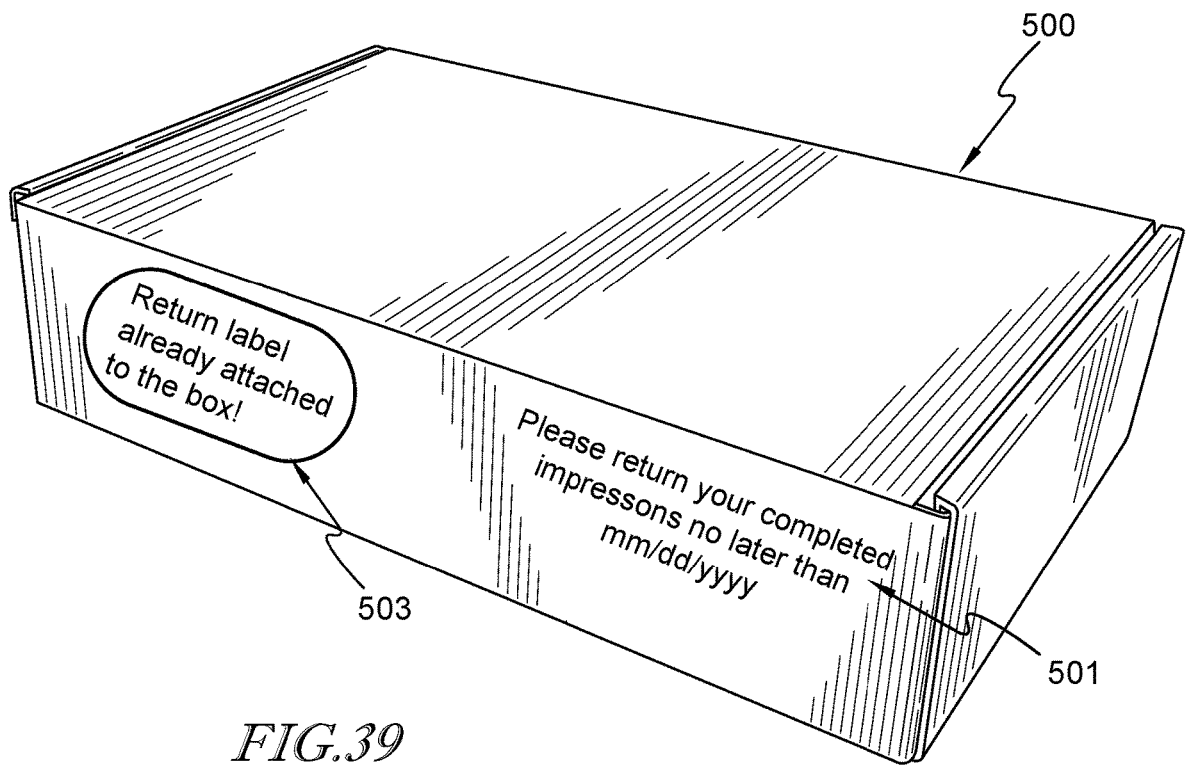
FIGS. 39 and 40 are views of a container containing the contents of a dental impression kit according to another exemplary embodiment.
Figure 40:
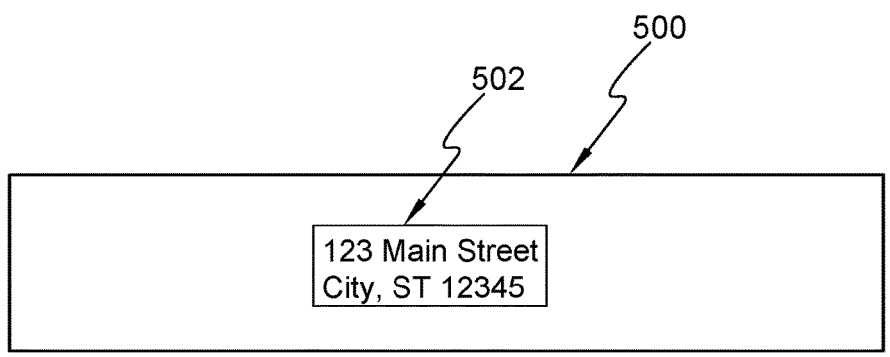

Referring to FIGS. 39 and 40, a container 500 containing the contents of a dental impression kit 300 is shown according to another example embodiment. In some embodiments, the container 500 includes the same contents of the dental impression kit 300 of FIG. 11. For instance, the same container 500 may be used for shipping the contents of the dental impression kit 300, and for returning the contents of the dental impression kit 300 back to the vendor following administration of the contents by the customer as outlined above. As illustrated, the container 500 includes a first label 501, a second label 502, and a third label 503.

Specifically, FIG. 39 shows a perspective view of the container 500 including the first label 501 and the third label 503. In some embodiments, the first label 501 may be a label indicating a predetermined time frame for returning the contents of the dental impression kit 300, as will be discussed in greater detail below. The third label 503 may be a label indicating that the return mailing label is already attached to the container 500. FIG. 40 shows a side view of the container 500 including the second label 502. The second label 502 may be a return mailing label printed or otherwise represented thereon.

In some embodiments, the container 500 may be assigned a predetermined time frame for returning the contents of the dental impression kit 300 to the vendor. The predetermined time frame may be a predetermined number of business days, a predetermined number of weeks (e.g., one week, two weeks, four weeks, etc.), a predetermined number of months (e.g., one month, two months, etc.), etc. The predetermined time frame maybe set by the vendor. The vendor may set the predetermined time frame based on the date in which the customer ordered the dental impression kit 300. For example, the customer may order the dental impression kit 300 on a Friday. The dental impression kit 300 may be shipped out the following Monday. The vendor may set the predetermined time frame from the date of the customer order (e.g., two weeks from the Friday). In other instances, the vendor may set the predetermined time frame from the date of shipment (e.g., two weeks from the Monday). In still other instances, the vendor may set the predetermined time frame from the date of receipt. Continuing the previous example, the order may be shipped overnight and received by the customer on the Tuesday following the Friday order. The vendor may set the predetermined time frame from the date of receipt by the customer (e.g., two weeks from the Tuesday). In still other instances, the vendor may provide a universal predetermined time frame (e.g., "Please return your completed impressions no later than two weeks from receipt of this kit" or "Please return your completed impressions no later than two weeks from your order date").

In some embodiments, the instruction manual 304 may further include instructions for returning the dental impression kit 300. For instance, the instruction manual 304 may include instructions to return the dental impression kit 300 within the predetermined time frame discussed above.

In each of these instances, the customer may be instructed to return the dental impression kit 300 within the predetermined time frame. As stated above, in some embodiments, the predetermined time frame may be represented on a label 501 of the box 302. In other embodiments, the predetermined time frame may be represented in the instruction manual 304 or provided on a separate label included inside of the box 302. In instructing the customer to return the dental impression kit 300 within the predetermined time frame, the customer's experience is improved by expediting the overall process, and specifically the process of receiving aligners from the vendor, and ensuring that delays in the customer receiving aligners from the vendor are not caused by the customer.

The predetermined time frame may ensure that the contents of the dental impression kit 300 are returned at an optimal response rate. For instance, customers may be more likely to return the contents of the dental impression kit 300 in a timely fashion if they are provided with the predetermined time frame, even though the vendor receiving the returned dental impression kit 300 within the predetermined time frame may not be required for the vendor to process and return aligners to the customer. Additionally, the vendor may be able to plan subsequent processes with more accuracy based on the understanding that the customers will return the contents of their dental impression kit 300 within the predetermined time frame. For instance, where a predetermined time frame for returning the contents of the dental impression kit 300 is not provided, the vendor may ship out several dental impression kits 300 over the course of a month and receive all the contents back from the customers at the end of the month. As a result, subsequent processes performed by the vendor may be slowed down or be backed up due to customer delay. In providing the customer a predetermined time frame for returning the contents of the dental impression kit 300, both vendor planning and customer experience may be improved.

In some embodiments, the user may receive one or more messages within the overall process. Such messages may indicate to the user what to expect, what are the next steps, etc. The user may receive these messages as text messages, e-mail messages, phone calls, etc. For instance, the user may receive a kit order confirmation (and/or kit shipment confirmation) when the user orders (or the vendor ships) a dental impression kit 10. In some embodiments, the user may receive a message following expiration of the predetermined time frame described above indicating that the user still has time for returning their dental impressions. The user may also receive a message when the user successfully uploads the required photos. Additionally or alternatively, the user may receive a message indicating receipt of the impressions from the dental impression kit 10. In some embodiments, the message may indicate the next steps following one or more of the above occurrences. As one example, the message following receipt of the impressions from the dental impression kit 10 may indicate the next steps (e.g., impression intake process, scanning the impressions directly [or a model generated based on the impressions], digital sculpting of the 3D model, further sculpting and digital occluding, an orthodontics analysis software, generation of a treatment plan, generation of aligners, etc.). In some embodiments, the user may receive a message following each of these steps (e.g., a message following the impression intake process, a message following generation of a treatment plan, etc.). In each of these embodiments, the user may become engaged in the next steps and excited for their aligners.

In some embodiments, particularly those where the user has a delay in performing one or more steps, the user may receive a message (e.g., an e-mail, a text message, a call, etc.) from a dentist or orthodontist to check up on the user's progress. Such embodiments may alert the user of the delay, thus potentially eliminating bottlenecks and increasing the likelihood that the user will return administered impressions from their dental impression kit 10. Additionally, such embodiments may increase the number of kit orders by providing a personal touch for the user which the user may discuss with friends, relatives, co-workers, etc.

The embodiments described above facilitate the application of a dental impression kit at home. It will be appreciated that the dental impression kit and methods described herein have broad applications. The foregoing embodiments were chosen and described in order to illustrate principles of the methods and apparatuses as well as some practical applications. The preceding description enables others skilled in the art to utilize methods and apparatuses in various embodiments and with various modifications as are suited to the particular use contemplated. In accordance with the provisions of the patent statutes, the principles and modes of operation of this disclosure have been explained and illustrated in exemplary embodiments.

It is intended that the scope of the present methods and apparatuses be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

What is claimed is:

1. A method comprising:
   physically receiving a first set of dental impressions including a dental impression of an upper dental arch of a user and a dental impression of a lower dental arch of the user, the dental impression of the upper dental arch and the dental impression of the lower dental arch having been created using contents from an initial dental impression kit sent to the user and containing a first amount of base putty and a first amount of catalyst putty;
   identifying, based on an observation of the first set of dental impressions after physically receiving the first set of dental impressions from the user, a defective dental impression in the first set of dental impressions physically received from the user, wherein the defective dental impression is identified from among the dental impression of the upper dental arch of the user and the dental impression of the lower dental arch of the user, and wherein the defective dental impression is identified as defective due to the user improperly biting down into a dental tray with a putty mixture or due to the user moving the dental tray while the user was biting down into the dental tray with the putty mixture;

sending a retake dental impression kit to the user based on identifying the defective dental impression, the retake dental impression kit including a set of dental trays, a second amount of base putty, and a second amount of catalyst putty, the set of dental trays consisting of dental trays corresponding to the dental arch associated with the defective dental impression, the base putty and the catalyst putty being mixable to form a putty mixture that can be positioned in the dental trays for creating a second set of dental impressions of the dental arch associated with the defective dental impression;

physically receiving the second set of dental impressions of the dental arch associated with the defective dental impression; and manufacturing, based on the second set of dental impressions, a plurality of dental aligners specific to the user and being configured to reposition one or more teeth of the user.

2. The method of claim 1, further comprising sending the plurality of dental aligners to the user.

3. The method of claim 1, wherein the defective dental impression is the dental impression of the upper dental arch of the user.

4. The method of claim 3, further comprising determining that the dental impression of the lower dental arch of the user is acceptable, wherein manufacturing the plurality of dental aligners is based on the acceptable dental impression of the first set of dental impressions and the second set of dental impressions.

5. The method of claim 3, wherein the set of dental trays of the retake dental impression kit only include upper dental arch trays.

6. The method of claim 5, wherein the second amount of base putty and the second amount of catalyst putty is an amount for taking two impressions of the upper dental arch of the user.

7. The method of claim 1, wherein the defective dental impression is the dental impression of the lower dental arch of the user, and wherein the set of dental trays of the retake dental impression kit only include lower dental arch trays.

8. The method of claim 1, further comprising identifying multiple defective dental impressions from among the first set of dental impressions, wherein the defective dental impressions include at least one dental impression of the upper dental arch of the user and at least one dental impression of the lower dental arch of the user.

9. The method of claim 8, wherein the retake dental impression kit includes a set of dental trays, base putty, and catalyst putty for creating multiple dental impressions of the upper dental arch of the user and the lower dental arch of the user.

10. The method of claim 1, wherein the second amount of base putty and the second amount of catalyst putty of the retake dental impression kit is provided in an amount for creating two dental impressions of the dental arch associated with the defective dental impression.

11. The method of claim 1, further comprising receiving an order for the retake dental impression kit from the user.

12. The method of claim 1, wherein physically receiving the first set of dental impressions comprises physically receiving a first container containing the first set of dental impressions, and wherein physically receiving the second set of dental impressions comprises physically receiving a second container containing the second set of dental impressions.

13. A method comprising:

sending a first dental impression kit to a user, the first dental impression kit including a first set of dental trays, a first amount of base putty, and a first amount of catalyst putty, the base putty and the catalyst putty being mixable to form a putty mixture that can be positioned in the first set of dental trays for creating a first set of dental impressions of the dental arches of the user, the first set of dental impressions including dental impressions of a first dental arch of the user and dental impressions of a second dental arch of the user;

physically receiving the first set of dental impressions;

identifying, based on an observation of the first set of dental impressions after physically receiving the first set of dental impressions from the user, a defective dental impression in the first set of dental impressions physically received from the user, wherein the defective dental impression is identified from among the dental impressions of the first dental arch of the user and the dental impressions of the second dental arch of the user, and wherein the dental impression is defective based on the dental impression misrepresenting the first dental arch of the user or the second dental arch of the user;

sending a second dental impression kit to the user based on identifying the defective dental impression, the second dental impression kit including a second set of dental trays, a second amount of base putty, and a second amount of catalyst putty, the second set of dental trays consisting of dental trays corresponding to the dental arch associated with the defective dental impression, the second amount of base putty and the second amount of catalyst putty being provided in an amount for creating a second set of dental impressions of the dental arch associated with the defective dental impression;

physically receiving the second set of dental impressions of the dental arch associated with the defective dental impression; and manufacturing, based on the second set of dental impressions, a plurality of dental aligners specific to the user and being configured to reposition one or more teeth of the user.

14. The method of claim 13, wherein the defective dental impression is associated with the first dental arch of the user, wherein the second set of dental impressions are of the first dental arch of the user, and wherein manufacturing the plurality of dental aligners is based on the second set of dental impressions and the dental impressions of the second dental arch of the user from the first set of dental impressions.

15. The method of claim 13, wherein physically receiving the first set of dental impressions comprises physically receiving a first container containing the first set of dental impressions, and wherein physically receiving the second set of dental impressions comprises physically receiving a second container containing the second set of dental impressions.

16. A method, comprising:
- physically receiving a first set of dental impressions including a dental impression of an upper dental arch of a user and a dental impression of a lower dental arch of the user, the dental impression of the upper dental arch and the dental impression of the lower dental arch having been created using contents from an initial dental impression kit sent to the user and containing a first amount of base putty and a first amount of catalyst putty;
- identifying, based on an observation of the first set of dental impressions after physically receiving the first set of dental impressions from the user, a defective dental impression in the first set of dental impressions physically received from the user, wherein the defective dental impression is identified from among the dental impression of the upper dental arch of the user and the dental impression of the lower dental arch of the user, and wherein the defective dental impression is identified as defective due to the user improperly biting down into a dental tray with a putty mixture or due to the user moving the dental tray while the user was biting down into the dental tray with the putty mixture;
- providing an indication to the user, via a user account page of a website, that the defective dental impression has been identified;
- sending a retake dental impression kit to the user based on identifying the defective dental impression, the retake dental impression kit including a set of dental trays, a second amount of base putty, and a second amount of catalyst putty, the set of dental trays consisting of dental trays corresponding to the dental arch associated with the defective dental impression, the base putty and the catalyst putty being mixable to form a putty mixture that can be positioned in the dental trays for creating a second set of dental impressions of the dental arch associated with the defective dental impression;
- physically receiving the second set of dental impressions of the dental arch associated with the defective dental impression; and
- manufacturing, based on the second set of dental impressions, a plurality of dental aligners specific to the user and being configured to reposition one or more teeth of the user.

17. The method of claim 16, wherein the retake dental impression kit is automatically sent to the user responsive to the user accessing the user account page of the web site.

18. The method of claim 16, wherein the indication includes a kit rejection message that indicates why the defective dental impression is identified as being defective, and wherein the kit rejection message includes instructions for the user to follow to improve creating the second set of dental impressions.

19. The method of claim 16, wherein the indication indicates that the defective dental impression is identified as being defective and that one or more impressions of the first set of dental impressions have been accepted.

20. A method comprising:
- physically receiving a first container containing a first set of dental impressions including a dental impression of an upper dental arch of a user and a dental impression of a lower dental arch of the user, wherein the first set of dental impressions includes a dental impression that is defective due to a manner in which the user administered contents of an initial dental impression kit;
- identifying, based on an observation of the first set of dental impressions after physically receiving the first container containing the first set of dental impressions from the user, the defective dental impression in the first set of dental impressions included in the first container, wherein the defective dental impression is identified from among the dental impression of the upper dental arch of the user and the dental impression of the lower dental arch of the user;
- sending a retake dental impression kit to the user based on identifying the defective dental impression, the retake dental impression kit including a set of dental trays, a base putty, and a catalyst putty, the set of dental trays consisting of dental trays corresponding to the dental arch associated with the defective dental impression, the base putty and the catalyst putty being mixable to form a putty mixture that can be positioned in the dental trays for creating a second set of dental impressions of the dental arch associated with the defective dental impression;
- physically receiving a second container containing the second set of dental impressions of the dental arch associated with the defective dental impression; and
- manufacturing, based on the second set of dental impressions, a plurality of dental aligners specific to the user and being configured to reposition one or more teeth of the user.

21. The method of claim 20, further comprising:
- sending the first container containing the initial dental impression kit to the user,
- wherein sending the retake dental impression kit comprises sending the second container containing the retake dental impression kit to the user based on identifying the defective dental impression,
- wherein the first container is used both for sending the initial dental impression kit and receiving the first set of dental impressions, and
- wherein the second container is used both for sending the retake dental impression kit and receiving the second set of dental impressions.

* * * * *